United States Patent
Labrosse et al.

(10) Patent No.: US 12,376,677 B1
(45) Date of Patent: Aug. 5, 2025

(54) ERGONOMIC SEATING SYSTEM, TILT-LOCK CONTROL AND REMOTE POWERING METHOD AND APPARATUS

(71) Applicant: Steelcase Inc., Grand Rapids, MI (US)

(72) Inventors: Jean-Paul Labrosse, Altadena, CA (US); Michael Xinjie Chu, Los Angeles, CA (US); Scott Sullivan, San Francisco, CA (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 17/063,893

(22) Filed: Oct. 6, 2020

Related U.S. Application Data

(63) Continuation of application No. 16/810,353, filed on Mar. 5, 2020, now Pat. No. 10,863,825, which is a
(Continued)

(51) Int. Cl.
  *A47B 9/00* (2006.01)
  *A47C 1/024* (2006.01)
  (Continued)

(52) U.S. Cl.
  CPC .............. *A47C 1/0242* (2013.01); *A47B 9/00* (2013.01); *A47C 7/72* (2013.01); *A47C 7/725* (2013.01);
  (Continued)

(58) Field of Classification Search
  CPC .. A47B 9/00; A47B 9/20; A47B 21/02; A47B 17/02; A47B 2200/0061;
  (Continued)

(56) References Cited

U.S. PATENT DOCUMENTS

| | | |
|---|---|---|
| 8,934 A | 5/1852 | Betts |
| 99,246 A | 1/1870 | Shannon |

(Continued)

FOREIGN PATENT DOCUMENTS

| | | |
|---|---|---|
| CA | 2240373 A1 | 12/1999 |
| CN | 1170554 A | 1/1998 |

(Continued)

OTHER PUBLICATIONS

PCT International Search Report, PCT/US2008/064457, Jan. 29, 2009.

(Continued)

*Primary Examiner* — Daniel J Troy
*Assistant Examiner* — Timothy M Ayres
(74) *Attorney, Agent, or Firm* — Quarles & Brady LLP

(57) ABSTRACT

A work environment adjustment system includes multiple instances of controllable office equipment located within an office space, each instance associated with a specific office location and including an activator for controlling states of the instance, at least one presence sensor for detecting user presence within each space associated with each instance, and a master controller linked to each office equipment activator to control activation of each activator to control a current state of each instance. The master controller is programmed to perform the steps of receiving sensor signals from the at least a first presence sensor, determining user presence at each space associated with each instance, controlling states at each of the instances independent of user input when the space associated with the instance is vacant, and enabling user control of the state of each instance associated with a space that is occupied by a user.

44 Claims, 31 Drawing Sheets

Related U.S. Application Data continuation of application No. 16/507,704, filed on Jul. 10, 2019, now Pat. No. 10,631,640, and a continuation of application No. 16/167,234, filed on Oct. 22, 2018, now Pat. No. 10,866,578, said application No. 16/507,704 is a continuation of application No. 16/115,008, filed on Aug. 28, 2018, now Pat. No. 10,390,620, which is a continuation of application No. 15/689,849, filed on Aug. 29, 2017, now Pat. No. 10,085,562, said application No. 16/167,234 is a continuation of application No. 15/430,336, filed on Feb. 10, 2017, now Pat. No. 10,209,705, which is a continuation of application No. 15/285,939, filed on Oct. 5, 2016, now Pat. No. 10,133,261, which is a continuation of application No. 14/035,974, filed on Sep. 25, 2013, now Pat. No. 9,486,070.

(60) Provisional application No. 62/409,041, filed on Oct. 17, 2016, provisional application No. 61/795,222, filed on Oct. 10, 2012.

(51) Int. Cl.
*A47C 7/72* (2006.01)
*A47C 7/74* (2006.01)
G05B 19/402 (2006.01)
G05B 19/406 (2006.01)
*A47B 9/20* (2006.01)
*A47C 3/30* (2006.01)
*A47C 7/00* (2006.01)
*A47C 7/46* (2006.01)
*A47C 7/54* (2006.01)
*A47C 31/00* (2006.01)

(52) U.S. Cl.
CPC .............. *A47C 7/727* (2018.08); *A47C 7/748* (2013.01); G05B 19/402 (2013.01); G05B 19/406 (2013.01); *A47B 9/20* (2013.01); *A47B 2200/0062* (2013.01); *A47C 3/30* (2013.01); *A47C 7/004* (2013.01); *A47C 7/006* (2013.01); *A47C 7/467* (2013.01); *A47C 7/54* (2013.01); *A47C 31/008* (2013.01); *G05B 2219/45022* (2013.01)

(58) Field of Classification Search
CPC .... A47B 2200/0062; A47B 2200/0056; A47B 2200/008
USPC ....................................................... 108/147
See application file for complete search history.

(56) References Cited

U.S. PATENT DOCUMENTS

| | | |
|---|---|---|
| 114,515 A | 5/1871 | Beek |
| 285,995 A | 10/1883 | Gesking |
| 327,413 A | 9/1885 | Rohrbach |
| 418,084 A | 12/1889 | Swinnerton |
| 443,108 A | 12/1890 | Owen |
| 451,599 A | 5/1891 | Meigs |
| 452,971 A | 5/1891 | Kidder |
| 501,935 A | 7/1893 | Harsha |
| 543,053 A | 7/1895 | Ripking |
| 571,652 A | 11/1896 | Dodd |
| 604,215 A | 5/1898 | Quarry |
| 636,548 A | 11/1899 | Owen |
| 654,922 A | 7/1900 | Schipkowsky |
| 658,983 A | 10/1900 | Francis |
| 659,987 A | 10/1900 | Ray |
| 688,104 A | 12/1901 | Lohrman |
| 698,558 A | 4/1902 | Rosenbaum |
| 710,376 A | 9/1902 | Smith |
| 794,809 A | 7/1905 | Marsh |
| 795,957 A | 8/1905 | Cartland |
| 859,982 A | 7/1907 | Smith |
| 860,150 A | 7/1907 | Plym |
| 907,502 A | 12/1908 | Kerr |
| 978,299 A | 12/1910 | Jacobs |
| 983,903 A | 2/1911 | Horton |
| 1,014,848 A | 1/1912 | Reinert |
| 1,050,409 A | 1/1913 | Wadsworth et al. |
| 1,201,305 A | 10/1916 | Jones |
| 1,251,719 A | 1/1918 | Wege |
| 1,258,773 A | 3/1918 | Hoffmann et al. |
| 1,277,550 A | 9/1918 | Connell |
| 1,340,562 A | 5/1920 | Sandmann |
| 1,386,469 A | 8/1921 | Gomoll |
| 1,395,166 A | 10/1921 | Tomlinson |
| 1,398,611 A | 11/1921 | Van Alstyn |
| 1,411,260 A | 4/1922 | Baker et al. |
| 1,421,929 A | 7/1922 | Floreskul |
| 1,448,642 A | 3/1923 | Tomlinson |
| 1,454,462 A | 5/1923 | Crooks |
| 1,514,512 A | 11/1924 | Fisher |
| 1,527,094 A | 2/1925 | Tomlinson |
| 1,542,693 A | 6/1925 | Gordon |
| 1,547,301 A | 7/1925 | Cordes |
| 1,638,612 A | 8/1927 | Baus |
| 1,643,101 A | 9/1927 | Thompson |
| 1,656,868 A | 1/1928 | Davis et al. |
| 1,696,456 A | 12/1928 | Sebring |
| 1,706,388 A | 3/1929 | Ashkenas |
| 1,766,077 A | 6/1930 | Jensen |
| 1,770,167 A | 7/1930 | Hoyer, Jr. et al. |
| 1,780,118 A | 10/1930 | D'Humy |
| 1,785,463 A | 12/1930 | Strongson |
| 1,786,823 A | 12/1930 | Carrington et al. |
| 1,792,406 A | 2/1931 | Tomlinson |
| 1,800,685 A | 4/1931 | Griffis |
| 1,810,618 A | 6/1931 | Nelson |
| 1,831,162 A | 11/1931 | Crowell |
| 1,845,142 A | 2/1932 | Friesner |
| 1,852,749 A | 4/1932 | Hiner |
| 1,854,248 A | 4/1932 | Cairney |
| 1,963,393 A | 6/1934 | Woodall |
| 1,965,785 A | 7/1934 | Vallone |
| 1,992,574 A | 2/1935 | Jenkins |
| D95,588 S | 5/1935 | Holsman |
| 2,002,128 A | 5/1935 | Reidenbaugh |
| 2,005,593 A | 6/1935 | Onions et al. |
| 2,017,844 A | 10/1935 | Ferney |
| 2,018,250 A | 10/1935 | Cohan |
| 2,031,848 A | 2/1936 | Ogden |
| 2,056,356 A | 10/1936 | Logan |
| 2,089,059 A | 8/1937 | Harley |
| 2,110,466 A | 3/1938 | Louis |
| 2,115,239 A | 4/1938 | Strain |
| 2,118,099 A | 5/1938 | Mirk |
| 2,119,319 A | 5/1938 | D'Esopo |
| 2,156,633 A | 5/1939 | La Ducer |
| 2,179,395 A | 11/1939 | Yerrick |
| 2,182,703 A | 12/1939 | Rainwater |
| 2,189,389 A | 2/1940 | Baker |
| 2,191,701 A | 2/1940 | Wood |
| 2,201,435 A | 5/1940 | Guyton |
| 2,202,476 A | 5/1940 | Baker |
| 2,202,684 A | 5/1940 | Baker |
| 2,223,023 A | 11/1940 | Weilemann |
| 2,240,484 A | 5/1941 | Anderson |
| 2,273,203 A | 2/1942 | Carnevali |
| 2,276,635 A | 3/1942 | Weber |
| 2,287,079 A | 6/1942 | Anderson |
| 2,299,443 A | 10/1942 | Walmsley |
| 2,345,913 A | 4/1944 | Bishop |
| 2,359,109 A | 9/1944 | Hormes |
| 2,362,567 A | 11/1944 | La Rue |
| 2,380,379 A | 7/1945 | Attwood |
| D150,242 S | 7/1948 | McDonald |
| 2,479,416 A | 8/1949 | Schnurer |
| 2,497,278 A | 2/1950 | Soderlund |
| 2,506,844 A | 5/1950 | Smith |

(56) References Cited

U.S. PATENT DOCUMENTS

| | | | |
|---|---|---|---|
| 2,511,949 A | 6/1950 | Simon |
| 2,522,149 A | 9/1950 | Tunstall |
| 2,530,474 A | 11/1950 | Lutes |
| 2,557,766 A | 6/1951 | Ronfeldt |
| 2,561,481 A | 7/1951 | Rody |
| 2,570,000 A | 10/1951 | Lowry |
| 2,580,598 A | 1/1952 | Rody |
| 2,605,203 A | 7/1952 | Silver |
| 2,620,024 A | 12/1952 | Rietman |
| 2,640,644 A | 6/1953 | Hennessey et al. |
| 2,640,750 A | 6/1953 | Rohde |
| 2,664,331 A | 12/1953 | Glotfelter |
| 2,675,863 A | 4/1954 | Lee |
| 2,683,639 A | 7/1954 | Brenny |
| 2,735,519 A | 2/1956 | Frischmann |
| D177,215 S | 3/1956 | Collins |
| 2,793,926 A | 5/1957 | Deaton |
| 2,821,450 A | 1/1958 | Knoll |
| 2,825,614 A | 3/1958 | Card |
| 2,834,478 A | 5/1958 | Macdonald |
| 2,840,243 A | 6/1958 | Brinker |
| 2,845,187 A | 7/1958 | Bianchi |
| 2,900,085 A | 8/1959 | Levy |
| 2,903,316 A | 9/1959 | Schmidt |
| 2,905,114 A | 9/1959 | Olson |
| 2,921,607 A | 1/1960 | Caveney |
| 2,930,665 A | 3/1960 | Budai |
| 2,937,765 A | 5/1960 | Shank |
| 2,942,924 A | 6/1960 | Stangert |
| 2,944,861 A | 7/1960 | Lessin |
| 2,963,031 A | 12/1960 | Carroll |
| 2,965,161 A | 12/1960 | Knoll |
| 2,975,908 A | 3/1961 | Huet |
| 2,976,097 A | 3/1961 | Devine |
| 2,981,583 A | 4/1961 | Eisenberg |
| 2,988,412 A | 6/1961 | Vannice |
| 2,993,603 A | 7/1961 | Fohn |
| 3,000,682 A | 9/1961 | Loew et al. |
| 3,001,755 A | 9/1961 | Doyle |
| 3,017,153 A | 1/1962 | Johnson |
| 3,027,212 A | 3/1962 | Pearson |
| 3,027,214 A | 3/1962 | Curatolo |
| 3,031,244 A | 4/1962 | Stopek |
| 3,036,864 A | 5/1962 | Arai |
| 3,041,109 A | 6/1962 | Eames |
| 3,045,961 A | 7/1962 | Cygan |
| 3,059,825 A | 10/1962 | Thomas |
| 3,083,007 A | 3/1963 | Campfield |
| 3,098,239 A | 7/1963 | Nader |
| 3,117,534 A | 1/1964 | Martland |
| 3,127,216 A | 3/1964 | Clouse |
| 3,167,352 A | 1/1965 | Johnson |
| 3,170,742 A | 2/1965 | Berkowitz |
| 3,172,711 A | 3/1965 | Gillotte |
| 3,180,459 A | 4/1965 | Liskey, Jr. |
| 3,181,923 A | 5/1965 | Guillon |
| 3,189,140 A | 6/1965 | Luss |
| 3,197,822 A | 8/1965 | Herrschaft |
| 3,200,962 A | 8/1965 | Davelaar |
| 3,213,580 A | 10/1965 | Mark |
| 3,217,673 A | 11/1965 | Knoblock |
| 3,233,942 A | 2/1966 | Creutz |
| 3,235,218 A | 2/1966 | Graham |
| 3,238,004 A | 3/1966 | Goebel |
| 3,241,885 A | 3/1966 | Deaton |
| 3,249,351 A | 5/1966 | Smith |
| 3,252,469 A | 5/1966 | Peake |
| 3,255,467 A | 6/1966 | Kowalski |
| 3,284,974 A | 11/1966 | Stein |
| 3,289,676 A | 12/1966 | Saunders |
| 3,295,764 A | 1/1967 | Geary |
| 3,298,743 A | 1/1967 | Albinson |
| 3,301,597 A | 1/1967 | Bereday |
| 3,321,253 A | 5/1967 | Everburg |
| 3,326,147 A | 6/1967 | Toney |
| 3,339,502 A | 9/1967 | Fyffe |
| 3,364,882 A | 1/1968 | Merrick |
| 3,367,290 A | 2/1968 | Barecki |
| 3,370,389 A | 2/1968 | Macaluso |
| 3,388,711 A | 6/1968 | Huddle |
| 3,404,930 A | 10/1968 | Cafiero |
| 3,406,645 A | 10/1968 | Monroe |
| 3,413,053 A | 11/1968 | Featherston |
| 3,425,108 A | 2/1969 | Cerutti et al. |
| 3,428,108 A | 2/1969 | Singer |
| 3,428,688 A | 2/1969 | Heiba |
| 3,437,737 A | 4/1969 | Wagner |
| 3,438,687 A | 4/1969 | Wikey |
| 3,441,146 A | 4/1969 | Summers |
| 3,456,833 A | 7/1969 | Cornelius |
| 3,464,372 A | 9/1969 | Fiterman et al. |
| 3,475,769 A | 11/1969 | Fasanella |
| 3,489,290 A | 1/1970 | Larson |
| 3,490,824 A | 1/1970 | Bartlett et al. |
| 3,497,081 A | 2/1970 | Field |
| 3,497,279 A | 2/1970 | Chovanec |
| 3,498,239 A | 3/1970 | Bartlett et al. |
| 3,511,193 A | 5/1970 | Schild |
| 3,514,170 A | 5/1970 | Shewchuk |
| 3,517,822 A | 6/1970 | Wagner |
| 3,517,963 A | 6/1970 | Woods et al. |
| 3,521,579 A | 7/1970 | Stafford |
| 3,528,559 A | 9/1970 | Miller |
| 3,529,880 A | 9/1970 | Christen |
| 3,552,579 A | 1/1971 | Simon et al. |
| 3,556,586 A | 1/1971 | Beardmore |
| 3,563,624 A | 2/1971 | Stice |
| 3,565,152 A | 2/1971 | Cohn, Jr. et al. |
| 3,566,566 A | 3/1971 | Janic |
| 3,570,682 A | 3/1971 | Elliott |
| 3,570,798 A | 3/1971 | Squibb |
| 3,572,874 A | 3/1971 | Hassel |
| 3,574,434 A | 4/1971 | Propst |
| 3,575,465 A | 4/1971 | Dolby et al. |
| 3,584,348 A | 6/1971 | Soltysik |
| 3,584,417 A | 6/1971 | Gatton et al. |
| 3,591,233 A | 7/1971 | Turcksin |
| 3,596,297 A | 8/1971 | James |
| 3,601,825 A | 8/1971 | Moorhead et al. |
| 3,601,912 A | 8/1971 | Dubbs |
| 3,605,650 A | 9/1971 | Hebel et al. |
| 3,608,959 A | 9/1971 | Sarvas |
| 3,612,289 A | 10/1971 | Zink |
| 3,619,004 A | 11/1971 | McKernan et al. |
| 3,620,376 A | 11/1971 | Gingher |
| 3,626,647 A | 12/1971 | Guzelimian |
| 3,635,174 A | 1/1972 | Ball et al. |
| 3,636,661 A | 1/1972 | Strawsine |
| 3,640,445 A | 2/1972 | Durham |
| 3,643,608 A | 2/1972 | DeCesaris |
| 3,654,382 A | 4/1972 | Rubright |
| 3,655,065 A | 4/1972 | Yellin |
| 3,655,253 A | 4/1972 | Deeds et al. |
| 3,663,059 A | 5/1972 | Omlie |
| 3,667,803 A | 6/1972 | Ford |
| 3,674,068 A | 7/1972 | Lucci |
| 3,680,942 A | 8/1972 | Davis |
| 3,682,523 A | 8/1972 | Esposito |
| 3,687,092 A | 8/1972 | Manning |
| 3,688,707 A | 9/1972 | White |
| 3,693,923 A | 9/1972 | Ayoub et al. |
| 3,695,649 A | 10/1972 | Laverone |
| 3,700,282 A | 10/1972 | Rowland |
| 3,712,698 A | 1/1973 | Propst et al. |
| 3,713,257 A | 1/1973 | Beavers |
| 3,713,474 A | 1/1973 | Orlando |
| 3,724,792 A | 4/1973 | Thalenfeld |
| 3,730,601 A | 5/1973 | Misenheimer, III |
| 3,736,035 A | 5/1973 | Brown et al. |
| 3,736,602 A | 6/1973 | Miller |
| 3,741,450 A | 6/1973 | Seastrom |
| 3,741,852 A | 6/1973 | Keener |
| 3,743,332 A | 7/1973 | Sonolet |
| 3,745,936 A | 7/1973 | Bennett |

(56) References Cited

U.S. PATENT DOCUMENTS

| | | |
|---|---|---|
| 3,748,006 A | 7/1973 | Levit et al. |
| 3,749,299 A | 7/1973 | Ingle |
| 3,756,116 A | 9/1973 | Schuplin |
| 3,758,182 A | 9/1973 | Barecki et al. |
| 3,761,971 A | 10/1973 | Behnke |
| 3,774,966 A | 11/1973 | Faulkner et al. |
| 3,778,175 A | 12/1973 | Zimmer |
| 3,786,765 A | 1/1974 | Burr |
| 3,786,932 A | 1/1974 | Smith |
| 3,790,241 A | 2/1974 | Messina |
| 3,797,790 A | 3/1974 | Iseki |
| 3,806,220 A | 4/1974 | Payne |
| 3,808,607 A | 5/1974 | Harder |
| 3,810,430 A | 5/1974 | Siegal |
| 3,811,728 A | 5/1974 | Redemske |
| D231,880 S | 6/1974 | Weinstock |
| 3,814,034 A | 6/1974 | Seiz |
| 3,827,377 A | 8/1974 | Aughtry, Jr. |
| 3,830,168 A | 8/1974 | Crete |
| 3,831,533 A | 8/1974 | Kellogg |
| 3,835,795 A | 9/1974 | Levenberg |
| 3,838,902 A | 10/1974 | Tenani |
| 3,841,725 A | 10/1974 | Dorner |
| 3,845,985 A | 11/1974 | Behrend et al. |
| 3,848,388 A | 11/1974 | Bretche |
| 3,851,936 A | 12/1974 | Muller |
| 3,851,981 A | 12/1974 | Corsi |
| 3,852,916 A | 12/1974 | Laby |
| 3,857,622 A | 12/1974 | Mohr et al. |
| 3,865,429 A | 2/1975 | Barker |
| 3,871,153 A | 3/1975 | Birum, Jr. |
| 3,871,726 A | 3/1975 | Stegner |
| D234,988 S | 4/1975 | Lopez-Benitez |
| 3,875,711 A | 4/1975 | Palmer |
| 3,877,764 A | 4/1975 | Hillier, Jr. |
| 3,881,428 A | 5/1975 | Klecki |
| 3,883,196 A | 5/1975 | Mohr |
| 3,883,202 A | 5/1975 | Konig |
| 3,890,495 A | 6/1975 | Bauer |
| 3,892,189 A | 7/1975 | Killam |
| 3,901,612 A | 8/1975 | Canin |
| 3,910,659 A | 10/1975 | Peterson |
| 3,913,498 A | 10/1975 | Hall |
| 3,915,189 A | 10/1975 | Holbrook |
| 3,916,972 A | 11/1975 | Breiner |
| 3,922,045 A | 11/1975 | Meyer |
| 3,927,481 A | 12/1975 | Safranek |
| 3,944,283 A | 3/1976 | Molzon |
| 3,945,742 A | 3/1976 | Condevaux |
| D239,424 S | 4/1976 | Offredi |
| 3,953,770 A | 4/1976 | Hayashi |
| 3,964,401 A | 6/1976 | Gutmann, Jr. et al. |
| 3,966,158 A | 6/1976 | Boundy |
| 3,966,338 A | 6/1976 | Ghyczy |
| 3,973,800 A | 8/1976 | Kogan |
| 3,974,782 A | 8/1976 | Ruckriegel |
| 3,974,917 A | 8/1976 | Waxmanski |
| 3,978,554 A | 9/1976 | Miller, Jr. |
| 3,984,884 A | 10/1976 | Spitz |
| 3,990,741 A | 11/1976 | Snyder |
| 4,009,796 A | 3/1977 | Schmidt |
| 4,018,167 A | 4/1977 | Spangler |
| 4,021,087 A | 5/1977 | Ferguson |
| 4,022,136 A | 5/1977 | Schott |
| 4,026,508 A | 5/1977 | Ziegler |
| 4,029,024 A | 6/1977 | Klitzky |
| 4,030,748 A | 6/1977 | Brock |
| 4,032,188 A | 6/1977 | Jones |
| 4,034,864 A | 7/1977 | Tyson |
| 4,037,614 A | 7/1977 | Hines |
| 4,040,588 A | 8/1977 | Papsco |
| 4,046,417 A | 9/1977 | Beckley |
| 4,049,230 A | 9/1977 | Minniear |
| 4,049,331 A | 9/1977 | Gutmann, Jr. |
| 4,050,752 A | 9/1977 | Dykstra |
| D245,950 S | 10/1977 | Mathur |
| 4,053,192 A | 10/1977 | Spetner |
| 4,053,701 A | 10/1977 | Ogilvie et al. |
| 4,055,373 A | 10/1977 | Andresen et al. |
| 4,056,196 A | 11/1977 | Brauning |
| 4,059,248 A | 11/1977 | Kuntz |
| 4,062,589 A | 12/1977 | Klein |
| RE29,522 E | 1/1978 | Barecki |
| 4,066,305 A | 1/1978 | Gazarek |
| 4,069,927 A | 1/1978 | Taylor |
| 4,070,013 A | 1/1978 | Sickler |
| 4,070,075 A | 1/1978 | Morgan |
| D247,595 S | 3/1978 | Corson et al. |
| 4,077,335 A | 3/1978 | Luzzani |
| 4,090,335 A | 5/1978 | Curatolo |
| 4,094,256 A | 6/1978 | Holper |
| 4,094,561 A | 6/1978 | Wolff |
| 4,106,736 A | 8/1978 | Becker, III |
| 4,106,738 A | 8/1978 | Kostecky |
| 4,108,086 A | 8/1978 | Yindra |
| 4,109,328 A | 8/1978 | Mason |
| 4,118,061 A | 10/1978 | Atkinson |
| 4,118,084 A | 10/1978 | Sussman |
| 4,118,903 A | 10/1978 | Coulthard |
| 4,121,645 A | 10/1978 | Behr |
| 4,125,787 A | 11/1978 | Ohhinata et al. |
| D250,922 S | 1/1979 | Adkinson |
| 4,136,680 A | 1/1979 | Southworth |
| 4,138,952 A | 2/1979 | Hodson |
| 4,141,612 A | 2/1979 | Rowe |
| 4,145,098 A | 3/1979 | Alexander |
| 4,149,352 A | 4/1979 | Allen |
| 4,156,515 A | 5/1979 | Mochly |
| 4,158,936 A | 6/1979 | Fulton |
| D252,487 S | 7/1979 | Petersilie |
| 4,161,254 A | 7/1979 | Taylor |
| 4,162,113 A | 7/1979 | Pallavicini |
| 4,163,572 A | 8/1979 | Benscoter |
| 4,163,592 A | 8/1979 | Nelson |
| 4,163,929 A | 8/1979 | Janu et al. |
| 4,165,869 A | 8/1979 | Williams |
| 4,165,902 A | 8/1979 | Ehrlich |
| 4,166,195 A | 8/1979 | Schwab |
| 4,185,430 A | 1/1980 | Gartung |
| 4,186,533 A | 2/1980 | Jensen |
| 4,186,666 A | 2/1980 | Honickman |
| 4,188,066 A | 2/1980 | Terenzoni |
| 4,192,562 A | 3/1980 | Bishoff |
| 4,200,254 A | 4/1980 | Nelson |
| 4,205,876 A | 6/1980 | Cetina |
| 4,213,650 A | 7/1980 | Sroub |
| 4,215,840 A | 8/1980 | Babberl |
| 4,219,101 A | 8/1980 | Valsvik |
| D256,829 S | 9/1980 | Qui et al. |
| 4,222,541 A | 9/1980 | Cillis |
| 4,224,769 A | 9/1980 | Ball |
| 4,227,758 A | 10/1980 | Clare |
| 4,230,365 A | 10/1980 | Messinger |
| D257,603 S | 12/1980 | Cyplik |
| 4,236,460 A | 12/1980 | Poupko |
| 4,243,279 A | 1/1981 | Ackeret |
| 4,258,856 A | 3/1981 | Marling |
| 4,263,683 A | 4/1981 | Knoke |
| 4,266,714 A | 5/1981 | Crane |
| 4,272,136 A | 6/1981 | Sengua |
| 4,281,602 A | 8/1981 | Lange |
| D260,826 S | 9/1981 | Steinberger |
| 4,287,837 A | 9/1981 | Bayles |
| 4,290,657 A | 9/1981 | Haas |
| 4,291,999 A | 9/1981 | Vandelanoite |
| 4,295,697 A | 10/1981 | Grime |
| 4,296,981 A | 10/1981 | Hildebrandt |
| 4,297,952 A | 11/1981 | Zagaroli |
| 4,298,291 A | 11/1981 | Ward, Jr. |
| 4,311,101 A | 1/1982 | de Almagro |
| 4,311,337 A | 1/1982 | Brunn |
| 4,312,086 A | 1/1982 | Bianco |
| 4,314,280 A | 2/1982 | Rose |
| 4,318,353 A | 3/1982 | Schier |

(56) References Cited

U.S. PATENT DOCUMENTS

| | | |
|---|---|---|
| 4,320,935 A | 3/1982 | Nagelkirk |
| D263,770 S | 4/1982 | Melchior |
| 4,323,291 A | 4/1982 | Ball |
| 4,324,076 A | 4/1982 | Honickman |
| 4,325,597 A | 4/1982 | Morrison |
| 4,334,483 A | 6/1982 | Kellogg |
| 4,352,432 A | 10/1982 | Smith |
| 4,353,661 A | 10/1982 | Ruther |
| 4,372,629 A | 2/1983 | Propst |
| 4,382,642 A | 5/1983 | Burdick |
| 4,385,850 A | 5/1983 | Bobath |
| D269,237 S | 6/1983 | Burdick |
| 4,387,872 A | 6/1983 | Hogue |
| 4,387,873 A | 6/1983 | Pavlo |
| 4,393,915 A | 7/1983 | Olson |
| 4,401,222 A | 8/1983 | Kulikowski |
| 4,403,677 A | 9/1983 | Messinger |
| 4,407,476 A | 10/1983 | Bohannan |
| 4,418,967 A | 12/1983 | Winkelman, Jr. et al. |
| 4,422,385 A | 12/1983 | Rutsche |
| 4,423,913 A | 1/1984 | Lee |
| 4,429,850 A | 2/1984 | Weber |
| 4,429,934 A | 2/1984 | VandenHoek |
| 4,437,278 A | 3/1984 | Thomas, Jr. |
| 4,437,714 A | 3/1984 | Struck |
| 4,440,096 A | 4/1984 | Rice et al. |
| 4,450,775 A | 5/1984 | Brendle |
| 4,455,102 A | 6/1984 | Baroi et al. |
| 4,457,436 A | 7/1984 | Kelley |
| 4,458,961 A | 7/1984 | Browning |
| 4,463,057 A | 7/1984 | Knurr |
| 4,471,586 A | 9/1984 | Shuch |
| 4,472,009 A | 9/1984 | Bell |
| 4,477,128 A | 10/1984 | Hasbrouck |
| RE31,733 E | 11/1984 | Haworth et al. |
| 4,482,195 A | 11/1984 | Chapin |
| 4,490,064 A | 12/1984 | Ducharme |
| 4,508,231 A | 4/1985 | Honickman |
| 4,516,341 A | 5/1985 | Jenkins |
| 4,516,509 A | 5/1985 | Langenegger |
| 4,516,619 A | 5/1985 | Hasbrouck |
| 4,516,620 A | 5/1985 | Mulhern |
| 4,522,130 A | 6/1985 | Worthington |
| 4,525,093 A | 6/1985 | Moll |
| 4,526,250 A | 7/1985 | Messinger |
| 4,535,577 A | 8/1985 | Tenser et al. |
| 4,535,703 A | 8/1985 | Henriott |
| 4,545,142 A | 10/1985 | Whisnant |
| 4,559,738 A | 12/1985 | Helfman |
| 4,561,229 A | 12/1985 | Gartung |
| 4,570,408 A | 2/1986 | Frascaroli |
| 4,571,682 A | 2/1986 | Silverman et al. |
| 4,572,694 A | 2/1986 | Hoeksema |
| 4,580,854 A | 4/1986 | Hedfeld |
| 4,582,002 A | 4/1986 | Wright |
| D283,855 S | 5/1986 | Kujawski |
| D283,872 S | 5/1986 | Clendinen |
| 4,586,759 A | 5/1986 | Wrobel |
| 4,588,227 A | 5/1986 | Austin |
| 4,590,865 A | 5/1986 | Rutsche |
| 4,591,289 A | 5/1986 | Vickers |
| 4,601,247 A | 7/1986 | Welch |
| 4,602,817 A | 7/1986 | Raftery |
| 4,603,787 A | 8/1986 | Essary |
| 4,610,560 A | 9/1986 | Miller |
| D286,353 S | 10/1986 | Robolin |
| 4,618,192 A | 10/1986 | Kelley |
| 4,619,486 A | 10/1986 | Hannah |
| 4,620,489 A | 11/1986 | Albano |
| 4,621,381 A | 11/1986 | Schramek |
| 4,621,865 A | 11/1986 | Herrera |
| 4,623,088 A | 11/1986 | Holden |
| 4,624,083 A | 11/1986 | Diffrient |
| 4,625,483 A | 12/1986 | Zacky |
| 4,632,040 A | 12/1986 | Sheffer |
| 4,632,459 A | 12/1986 | Herschlag |
| 4,633,789 A | 1/1987 | Kortering |
| 4,637,666 A | 1/1987 | Worrell |
| 4,639,049 A | 1/1987 | Frascaroli |
| 4,645,161 A | 2/1987 | Collins |
| D288,748 S | 3/1987 | Klein |
| 4,646,655 A | 3/1987 | Robolin |
| 4,653,652 A | 3/1987 | Avati |
| 4,653,662 A | 3/1987 | Wise et al. |
| 4,653,713 A | 3/1987 | Hamilton |
| 4,654,756 A * | 3/1987 | Wilson .................. A47B 21/06 312/223.3 |
| 4,662,092 A | 5/1987 | Kim |
| 4,666,115 A | 5/1987 | Schiro |
| 4,678,151 A | 7/1987 | Radek |
| 4,679,510 A | 7/1987 | Veyhl |
| 4,684,094 A | 8/1987 | Everett |
| 4,685,647 A | 8/1987 | Calhoun |
| 4,688,491 A | 8/1987 | Herrera et al. |
| 4,688,869 A | 8/1987 | Kelly |
| 4,698,936 A | 10/1987 | Helfman |
| 4,699,067 A | 10/1987 | Okopny |
| 4,700,993 A | 10/1987 | Fu Long |
| 4,708,132 A | 11/1987 | Silvestrini |
| 4,712,942 A | 12/1987 | Brown |
| 4,713,949 A | 12/1987 | Wilcox |
| 4,714,027 A | 12/1987 | Stern |
| 4,714,373 A | 12/1987 | Heekin |
| 4,717,358 A | 1/1988 | Chaundy |
| 4,718,132 A | 1/1988 | Wirland |
| 4,725,030 A | 2/1988 | Miller |
| 4,730,802 A | 3/1988 | Chatham |
| 4,732,088 A | 3/1988 | Koechlin |
| 4,732,089 A | 3/1988 | Mueller |
| 4,734,826 A | 3/1988 | Wilson |
| 4,735,152 A | 4/1988 | Bricker |
| 4,735,467 A | 4/1988 | Wolters |
| D295,810 S | 5/1988 | Saporiti |
| 4,744,492 A | 5/1988 | Hackmann et al. |
| 4,747,248 A | 5/1988 | Fahs |
| 4,748,913 A | 6/1988 | Favaretto |
| 4,750,432 A | 6/1988 | McNamara |
| 4,761,931 A | 8/1988 | Schrunk |
| 4,762,072 A | 8/1988 | Boundy |
| 4,763,581 A | 8/1988 | Weese |
| 4,765,253 A | 8/1988 | Schappach |
| 4,766,422 A | 8/1988 | Wolters |
| 4,771,583 A | 9/1988 | Ball |
| 4,773,337 A | 9/1988 | Ball |
| 4,774,792 A | 10/1988 | Balance |
| 4,778,487 A | 10/1988 | Chenel |
| 4,779,865 A | 10/1988 | Lieberman et al. |
| 4,779,940 A | 10/1988 | Ralston |
| 4,781,127 A | 11/1988 | Conley |
| 4,782,637 A | 11/1988 | Eriksson et al. |
| 4,784,468 A | 11/1988 | Tierney |
| 4,785,742 A | 11/1988 | Esslinger |
| 4,786,119 A | 11/1988 | Smuda |
| 4,792,881 A | 12/1988 | Wilson et al. |
| 4,795,355 A | 1/1989 | Dorn |
| 4,798,423 A | 1/1989 | LaCour |
| 4,799,432 A | 1/1989 | Rickner |
| 4,805,784 A | 2/1989 | Solheim |
| 4,807,838 A | 2/1989 | Anderson |
| 4,819,986 A | 4/1989 | Markus |
| 4,821,118 A | 4/1989 | Lavaliere |
| 4,821,472 A | 4/1989 | Rydqvist |
| 4,827,849 A | 5/1989 | Vignale |
| 4,828,257 A | 5/1989 | Dyer et al. |
| 4,831,791 A | 5/1989 | Ball |
| 4,832,241 A | 5/1989 | Radcliffe |
| 4,832,421 A | 5/1989 | Shoffner |
| 4,834,450 A | 5/1989 | Stickler |
| 4,838,175 A | 6/1989 | Hauville |
| 4,838,177 A | 6/1989 | Vander Park |
| 4,840,584 A | 6/1989 | Cox |
| 4,846,430 A | 7/1989 | Ke |
| 4,849,733 A | 7/1989 | Conigliaro et al. |
| 4,850,285 A | 7/1989 | Suttles |

(56) References Cited

U.S. PATENT DOCUMENTS

| | | | |
|---|---|---|---|
| 4,852,500 A | 8/1989 | Ryburg | |
| 4,856,242 A | 8/1989 | Baloga | |
| D303,327 S | 9/1989 | Masarotti | |
| 4,869,378 A | 9/1989 | Miller | |
| 4,875,418 A | 10/1989 | Moeckl | |
| 4,879,955 A | 11/1989 | Moll | |
| 4,882,885 A | 11/1989 | Chatterson et al. | |
| 4,884,513 A | 12/1989 | Newhouse | |
| 4,884,702 A | 12/1989 | Rekow | |
| 4,891,922 A | 1/1990 | Hozer | |
| 4,894,600 A | 1/1990 | Kearney | |
| 4,905,428 A | 3/1990 | Sykes | |
| 4,914,873 A | 4/1990 | Newhouse | |
| 4,915,034 A | 4/1990 | Grabe | |
| 4,915,120 A | 4/1990 | Ziolkowski | |
| 4,925,143 A | 5/1990 | Sandmeyer | |
| 4,931,978 A * | 6/1990 | Drake | A47B 21/0314 108/143 |
| 4,934,765 A | 6/1990 | Slifer, Sr. | |
| 4,938,442 A | 7/1990 | Mastrodicasa | |
| 4,941,717 A | 7/1990 | Beaulieu | |
| 4,944,235 A | 7/1990 | Jahnke | |
| 4,945,584 A | 8/1990 | LaMantia | |
| 4,947,601 A | 8/1990 | McGuire | |
| 4,948,205 A | 8/1990 | Kelley | |
| 4,953,696 A | 9/1990 | Huang | |
| 4,957,262 A | 9/1990 | Kemper | |
| 4,957,333 A | 9/1990 | Hsu | |
| 4,966,181 A | 10/1990 | Liberman et al. | |
| 4,971,281 A | 11/1990 | Steinbeck | |
| 4,974,913 A | 12/1990 | Vogt | |
| 4,977,696 A | 12/1990 | Johansson | |
| 4,985,195 A | 1/1991 | Wilson | |
| 4,986,194 A | 1/1991 | Bollman | |
| 4,986,198 A | 1/1991 | Naito | |
| 4,986,330 A | 1/1991 | McGonagle | |
| 4,998,636 A | 3/1991 | Hardigg | |
| 5,004,192 A | 4/1991 | Handler | |
| 5,008,966 A | 4/1991 | Lepow | |
| 5,016,765 A | 5/1991 | Leonardo | |
| 5,018,323 A | 5/1991 | Clausen | |
| 5,019,950 A | 5/1991 | Johnson | |
| 5,022,384 A | 6/1991 | Freels et al. | |
| 5,022,621 A | 6/1991 | Quest | |
| 5,024,167 A | 6/1991 | Hayward | |
| 5,025,603 A | 6/1991 | Johnson | |
| 5,026,614 A | 6/1991 | Itoh | |
| 5,031,683 A | 7/1991 | Marvy | |
| 5,033,624 A | 7/1991 | DeGelder | |
| 5,035,389 A | 7/1991 | Wang | |
| D318,966 S | 8/1991 | Schroff et al. | |
| 5,038,539 A | 8/1991 | Kelley | |
| 5,040,681 A | 8/1991 | Grusin | |
| 5,041,002 A | 8/1991 | Byrne | |
| 5,041,770 A | 8/1991 | Seiler | |
| 5,048,698 A | 9/1991 | Konrad | |
| 5,050,267 A | 9/1991 | Quest | |
| 5,056,746 A | 10/1991 | Parsons | |
| D321,435 S | 11/1991 | Scalisi et al. | |
| 5,069,263 A | 12/1991 | Edwards | |
| 5,069,506 A | 12/1991 | Wieland | |
| 5,070,666 A | 12/1991 | Looman | |
| 5,071,204 A | 12/1991 | Price | |
| 5,074,422 A | 12/1991 | Holtz | |
| D323,437 S | 1/1992 | Hashimoto et al. | |
| 5,078,055 A | 1/1992 | Bellini | |
| 5,080,238 A | 1/1992 | Hochman | |
| 5,080,438 A | 1/1992 | Moyer | |
| 5,082,120 A | 1/1992 | Vega | |
| 5,083,512 A | 1/1992 | Newhouse | |
| 5,085,153 A | 2/1992 | McKee | |
| 5,086,195 A | 2/1992 | Claisse | |
| 5,086,606 A | 2/1992 | Finses | |
| 5,086,958 A | 2/1992 | Nagy | |
| 5,088,420 A | 2/1992 | Russell | |
| 5,089,998 A | 2/1992 | Rund | |
| 5,092,253 A | 3/1992 | Grund et al. | |
| 5,094,174 A | 3/1992 | Grund | |
| 5,094,516 A | 3/1992 | Hunter | |
| 5,101,989 A | 4/1992 | Jones | |
| 5,103,741 A | 4/1992 | Grund | |
| 5,104,080 A | 4/1992 | Berger | |
| 5,109,992 A | 5/1992 | Miller | |
| 5,121,974 A | 6/1992 | Monson | |
| 5,123,549 A | 6/1992 | Finses | |
| 5,125,518 A | 6/1992 | Ward | |
| 5,129,202 A | 7/1992 | Payne | |
| 5,130,494 A | 7/1992 | Simonton | |
| 5,131,620 A | 7/1992 | Boundy | |
| 5,134,826 A | 8/1992 | La Roche | |
| 5,140,977 A | 8/1992 | Raffel | |
| D329,875 S | 9/1992 | Stern et al. | |
| 5,144,888 A | 9/1992 | Heine | |
| 5,144,896 A | 9/1992 | Fortsch | |
| 5,148,646 A | 9/1992 | Lutostanski | |
| 5,154,126 A | 10/1992 | Newhouse | |
| 5,155,955 A | 10/1992 | Ball | |
| 5,158,472 A | 10/1992 | Juhlin | |
| 5,165,614 A | 11/1992 | Fourche | |
| 5,167,047 A | 12/1992 | Plumley | |
| 5,168,889 A | 12/1992 | Diestel | |
| 5,172,641 A | 12/1992 | Auer | |
| 5,173,001 A | 12/1992 | Schunke | |
| 5,174,225 A | 12/1992 | Reise | |
| 5,174,532 A | 12/1992 | Huang | |
| 5,177,899 A | 1/1993 | Powell | |
| 5,177,912 A | 1/1993 | Ball | |
| 5,183,319 A | 2/1993 | Pearson | |
| 5,184,441 A | 2/1993 | Balfanz, Jr. | |
| 5,185,972 A | 2/1993 | Markiewicz | |
| 5,186,425 A | 2/1993 | Keusch | |
| 5,187,641 A | 2/1993 | Muskatello | |
| 5,197,614 A | 3/1993 | Dalton | |
| 5,203,135 A | 4/1993 | Bastian | |
| 5,206,972 A | 5/1993 | Nudelmont | |
| 5,208,731 A | 5/1993 | Blomquist | |
| D336,185 S | 6/1993 | Deinen et al. | |
| 5,214,890 A | 6/1993 | Levitan et al. | |
| 5,215,108 A | 6/1993 | Sprague | |
| 5,217,124 A | 6/1993 | Stone | |
| 5,220,871 A | 6/1993 | Grund | |
| D337,219 S | 7/1993 | Dokoupil et al. | |
| D337,450 S | 7/1993 | Dettinger | |
| 5,224,429 A | 7/1993 | Borgman et al. | |
| 5,224,610 A | 7/1993 | Veazey | |
| 5,226,179 A | 7/1993 | Choi | |
| 5,228,579 A | 7/1993 | Kaufman | |
| 5,230,492 A | 7/1993 | Zwart | |
| 5,230,552 A | 7/1993 | Schipper et al. | |
| 5,231,562 A * | 7/1993 | Pierce | H02B 1/26 108/50.02 |
| D337,911 S | 8/1993 | Gibson | |
| 5,233,707 A | 8/1993 | Perkins | |
| 5,237,935 A | 8/1993 | Newhouse | |
| 5,241,717 A | 9/1993 | Ward | |
| 5,241,796 A | 9/1993 | Hellwig | |
| 5,241,914 A | 9/1993 | Korb | |
| 5,242,048 A | 9/1993 | Ellingsworth | |
| 5,252,086 A | 10/1993 | Russell | |
| 5,255,478 A | 10/1993 | Baranowski | |
| 5,255,966 A | 10/1993 | Newhouse et al. | |
| 5,257,701 A | 11/1993 | Edelson | |
| 5,259,326 A | 11/1993 | Borgman et al. | |
| 5,261,736 A | 11/1993 | Sisbarro | |
| 5,263,772 A | 11/1993 | Ritzow | |
| 5,265,972 A | 11/1993 | Bahr | |
| 5,267,715 A | 12/1993 | Owen | |
| 5,272,988 A | 12/1993 | Kelley | |
| D342,837 S | 1/1994 | Forcolini | |
| 5,277,005 A | 1/1994 | Hellwig et al. | |
| 5,277,007 A | 1/1994 | Hellwig | |
| 5,277,132 A | 1/1994 | Korb | |
| 5,277,512 A | 1/1994 | Dwillies | |
| 5,285,900 A | 2/1994 | Swingler | |

(56) References Cited

U.S. PATENT DOCUMENTS

| | | |
|---|---|---|
| 5,287,666 A | 2/1994 | Frascaroli |
| 5,287,909 A | 2/1994 | King et al. |
| 5,295,594 A | 3/1994 | Melzian |
| 5,297,486 A | 3/1994 | Herrmann |
| 5,305,238 A | 4/1994 | Starr, III et al. |
| 5,305,883 A | 4/1994 | Gage |
| D346,912 S | 5/1994 | Mezger |
| 5,308,031 A | 5/1994 | Evenson |
| 5,308,296 A | 5/1994 | Eckstein |
| 5,314,391 A | 5/1994 | Potash et al. |
| D347,622 S | 6/1994 | Flasz |
| 5,317,977 A | 6/1994 | Omessi |
| 5,321,579 A | 6/1994 | Brown |
| 5,322,022 A | 6/1994 | Burkholder |
| 5,323,695 A | 6/1994 | Borgman et al. |
| D348,432 S | 7/1994 | Dubruco |
| 5,327,838 A | 7/1994 | Beltman |
| 5,328,260 A | 7/1994 | Beirise |
| 5,333,744 A | 8/1994 | LoCicero |
| 5,335,188 A | 8/1994 | Brisson |
| 5,339,576 A | 8/1994 | Fussler |
| 5,339,747 A | 8/1994 | Epps |
| 5,340,326 A | 8/1994 | LeMaster |
| 5,341,615 A | 8/1994 | Hodges |
| 5,341,749 A | 8/1994 | Noakes |
| 5,346,296 A | 9/1994 | Kelley |
| 5,347,778 A | 9/1994 | Bray |
| 5,349,135 A | 9/1994 | Mollenkopf et al. |
| 5,353,566 A | 10/1994 | Boon et al. |
| 5,354,025 A | 10/1994 | McCaffrey |
| 5,354,027 A | 10/1994 | Cox |
| 5,357,874 A | 10/1994 | Palmer |
| 5,359,826 A | 11/1994 | Grearson |
| 5,360,121 A | 11/1994 | Sothman |
| 5,362,923 A | 11/1994 | Newhouse |
| 5,371,693 A | 12/1994 | Nakazoe |
| 5,378,077 A | 1/1995 | Paulsen |
| 5,380,034 A | 1/1995 | Wilson |
| 5,381,908 A | 1/1995 | Hepp |
| 5,386,787 A | 2/1995 | Hall |
| 5,392,934 A | 2/1995 | Fox |
| 5,394,658 A | 3/1995 | Schreiner et al. |
| 5,394,809 A | 3/1995 | Feldpausch |
| 5,398,622 A | 3/1995 | Lubinskas et al. |
| 5,400,719 A | 3/1995 | Santapa |
| 5,402,988 A | 4/1995 | Eisele |
| 5,403,082 A | 4/1995 | Kramer |
| 5,406,894 A | 4/1995 | Herrmann |
| 5,412,297 A | 5/1995 | Clark et al. |
| 5,415,454 A | 5/1995 | Fu Tsung |
| 5,415,461 A | 5/1995 | Sakamoto |
| D359,161 S | 6/1995 | Byrne |
| D359,631 S | 6/1995 | Bubb |
| 5,423,151 A | 6/1995 | Caro et al. |
| D360,310 S | 7/1995 | Stamberg et al. |
| 5,428,928 A | 7/1995 | Hellwig |
| 5,429,431 A | 7/1995 | Olson |
| 5,433,152 A | 7/1995 | Henry |
| 5,435,799 A | 7/1995 | Lundin |
| 5,437,235 A | 8/1995 | Randolph |
| 5,437,426 A | 8/1995 | MacDonald |
| 5,438,937 A | 8/1995 | Ball |
| 5,441,151 A | 8/1995 | Billingham |
| 5,441,338 A | 8/1995 | Kane |
| 5,443,017 A | 8/1995 | Wacker |
| 5,451,101 A | 9/1995 | Ellison |
| 5,454,638 A | 10/1995 | Bird |
| 5,456,648 A | 10/1995 | Edinburg et al. |
| 5,466,058 A | 11/1995 | Chan |
| 5,467,703 A | 11/1995 | Crinion |
| 5,469,794 A | 11/1995 | Laderoute |
| 5,472,164 A | 12/1995 | Contee, Jr. |
| 5,473,994 A | 12/1995 | Foley |
| 5,479,733 A | 1/1996 | Kusina |
| 5,483,904 A | 1/1996 | Kelly |
| 5,485,376 A | 1/1996 | Oike et al. |
| 5,486,042 A | 1/1996 | Heisler |
| D366,978 S | 2/1996 | Mariol |
| D367,364 S | 2/1996 | Lewis |
| 5,490,357 A | 2/1996 | Lin |
| D368,177 S | 3/1996 | Mourgue |
| D368,314 S | 3/1996 | Lin |
| 5,499,868 A | 3/1996 | Schainholz |
| 5,511,348 A | 4/1996 | Cornell |
| 5,516,298 A * | 5/1996 | Smith ............... A47B 21/06 439/31 |
| 5,522,324 A | 6/1996 | van Gelder |
| D371,687 S | 7/1996 | Sims |
| D371,699 S | 7/1996 | Muller-Deisig et al. |
| D371,703 S | 7/1996 | Muller-Deisig et al. |
| 5,535,972 A | 7/1996 | Fallago |
| 5,537,290 A | 7/1996 | Brown |
| 5,542,553 A | 8/1996 | Penniman |
| 5,544,593 A | 8/1996 | Canfield |
| 5,546,873 A | 8/1996 | Conner |
| 5,547,080 A | 8/1996 | Klimas |
| 5,549,055 A | 8/1996 | Kusch |
| 5,553,551 A | 9/1996 | Crombie |
| 5,555,694 A | 9/1996 | Commins |
| 5,556,067 A | 9/1996 | Konig |
| 5,556,181 A | 9/1996 | Bertrand |
| 5,560,302 A | 10/1996 | Diffrient |
| 5,560,303 A | 10/1996 | Severin |
| 5,564,784 A | 10/1996 | Felling |
| 5,568,773 A | 10/1996 | Hung |
| D375,845 S | 11/1996 | Mourgue |
| 5,572,751 A | 11/1996 | Brandt |
| 5,573,320 A | 11/1996 | Shearer |
| 5,575,668 A * | 11/1996 | Timmerman ........ A47B 21/06 439/131 |
| 5,583,831 A | 12/1996 | Churchill et al. |
| 5,586,593 A | 12/1996 | Schwartz |
| 5,588,376 A | 12/1996 | Seidl |
| 5,592,884 A | 1/1997 | Glick |
| 5,595,494 A | 1/1997 | Wiebe |
| D378,028 S | 2/1997 | Schefcik |
| 5,598,678 A | 2/1997 | Reynolds |
| 5,603,405 A | 2/1997 | Smith |
| 5,606,920 A | 3/1997 | Meyer |
| 5,609,112 A | 3/1997 | Meyer |
| 5,609,402 A | 3/1997 | Kemp |
| 5,611,608 A | 3/1997 | Clausen |
| 5,612,869 A | 3/1997 | Letzt et al. |
| 5,615,783 A | 4/1997 | Warnken |
| 5,621,994 A | 4/1997 | Cobb et al. |
| 5,622,197 A | 4/1997 | Valaire |
| 5,623,880 A | 4/1997 | Kuntz |
| 5,623,882 A | 4/1997 | Price |
| 5,628,257 A | 5/1997 | Conner |
| 5,628,759 A | 5/1997 | McCool |
| D379,987 S | 6/1997 | Scheid et al. |
| D380,095 S | 6/1997 | Diaz-Azcuy |
| 5,634,300 A | 6/1997 | Huebner |
| 5,638,759 A * | 6/1997 | Klugkist ............. A47B 13/003 108/23 |
| D381,216 S | 7/1997 | Paus |
| 5,642,557 A | 7/1997 | Clews |
| 5,644,995 A | 7/1997 | Gurwell |
| 5,649,742 A | 7/1997 | Liu |
| D382,123 S | 8/1997 | Pimental et al. |
| D382,736 S | 8/1997 | Kopish |
| 5,658,635 A | 8/1997 | Davis et al. |
| 5,662,132 A | 9/1997 | Larsen |
| 5,662,298 A | 9/1997 | Collins |
| 5,663,620 A | 9/1997 | Mizuno et al. |
| 5,666,426 A | 9/1997 | Helms |
| 5,666,713 A | 9/1997 | Kubota |
| 5,669,498 A | 9/1997 | Fierek |
| 5,673,632 A | 10/1997 | Sykes |
| 5,678,491 A | 10/1997 | Price |
| 5,678,792 A | 10/1997 | Arguin et al. |
| 5,678,907 A | 10/1997 | Schainholz |
| 5,680,820 A | 10/1997 | Randolph |
| 5,683,154 A | 11/1997 | Chang |

(56) References Cited

U.S. PATENT DOCUMENTS

| | | |
|---|---|---|
| 5,683,198 A | 11/1997 | Leutenegger |
| 5,686,884 A | 11/1997 | Larkin et al. |
| D387,583 S | 12/1997 | Shear |
| 5,697,686 A | 12/1997 | Miller |
| 5,698,759 A | 12/1997 | Fray |
| 5,704,683 A | 1/1998 | Cooper |
| 5,709,156 A | 1/1998 | Gevaert |
| 5,711,121 A | 1/1998 | Garver |
| 5,715,760 A | 2/1998 | Frascaroli et al. |
| 5,715,761 A | 2/1998 | Frattini |
| 5,718,179 A | 2/1998 | Johnson |
| 5,718,492 A | 2/1998 | Ellison |
| 5,720,547 A | 2/1998 | Baird |
| D392,470 S | 3/1998 | Smith |
| D392,775 S | 3/1998 | McMahon |
| 5,724,778 A | 3/1998 | Cornell |
| 5,730,414 A | 3/1998 | Wenger et al. |
| 5,738,422 A | 4/1998 | Welborn, Jr. et al. |
| 5,738,462 A | 4/1998 | Petersen |
| 5,740,650 A | 4/1998 | Seiber et al. |
| 5,740,743 A | 4/1998 | Schairbaum |
| 5,746,488 A | 5/1998 | LaCour |
| 5,752,449 A | 5/1998 | Simon |
| 5,752,450 A | 5/1998 | Roesner |
| 5,754,995 A | 5/1998 | Behrendt |
| 5,755,321 A | 5/1998 | Wang |
| 5,756,539 A | 5/1998 | Skrumsager |
| 5,765,910 A | 6/1998 | Larkin et al. |
| 5,765,932 A | 6/1998 | Domina et al. |
| 5,769,755 A | 6/1998 | Henry et al. |
| 5,771,954 A | 6/1998 | Benner |
| 5,775,778 A | 7/1998 | Riley |
| 5,778,804 A | 7/1998 | Read |
| 5,791,259 A | 8/1998 | Mansfield |
| 5,791,265 A | 8/1998 | Ellsworth et al. |
| 5,791,751 A | 8/1998 | Meyer et al. |
| 5,794,545 A | 8/1998 | McDaniel |
| 5,794,902 A | 8/1998 | Henry |
| 5,795,028 A | 8/1998 | Dussia, Jr. |
| 5,799,430 A | 9/1998 | Fremstad |
| 5,802,672 A | 9/1998 | Rohder |
| 5,802,778 A | 9/1998 | Thorp |
| 5,802,789 A | 9/1998 | Goodman |
| 5,803,561 A | 9/1998 | Puehlhorn |
| 5,806,258 A | 9/1998 | Miedema |
| 5,809,708 A | 9/1998 | Greer |
| D399,661 S | 10/1998 | Smith |
| 5,816,001 A | 10/1998 | Goodman |
| 5,823,624 A | 10/1998 | Dahlbacka |
| 5,826,955 A | 10/1998 | Sanders |
| 5,831,211 A | 11/1998 | Gartung |
| 5,833,065 A | 11/1998 | Burgess |
| 5,833,332 A | 11/1998 | Marshall |
| 5,836,112 A | 11/1998 | Lindale |
| 5,839,240 A | 11/1998 | Elsholz |
| 5,839,462 A | 11/1998 | Randall |
| 5,853,005 A | 12/1998 | Scanlon |
| 5,853,236 A | 12/1998 | Rogers et al. |
| 5,857,415 A | 1/1999 | Richard |
| 5,857,986 A | 1/1999 | Moriyasu |
| 5,860,713 A | 1/1999 | Richardson |
| D405,976 S | 2/1999 | Beall |
| D405,979 S | 2/1999 | Kramer et al. |
| 5,865,409 A | 2/1999 | Nimer |
| 5,867,955 A | 2/1999 | Russell |
| 5,870,647 A | 2/1999 | Nada et al. |
| 5,870,868 A | 2/1999 | Kita et al. |
| 5,876,002 A | 3/1999 | White |
| 5,881,500 A | 3/1999 | Latino |
| 5,886,295 A | 3/1999 | Carino |
| 5,890,325 A | 4/1999 | Corcorran |
| 5,890,614 A | 4/1999 | Dancyger |
| 5,890,782 A | 4/1999 | Alberts |
| 5,890,997 A | 4/1999 | Roth |
| 5,893,606 A | 4/1999 | Chiang |
| 5,894,614 A | 4/1999 | Stroud |
| 5,896,817 A | 4/1999 | Hancock |
| 5,896,995 A | 4/1999 | Murray |
| 5,897,178 A | 4/1999 | Ohara |
| 5,901,513 A | 5/1999 | Mollenkopf |
| 5,904,104 A | 5/1999 | Yu |
| 5,906,035 A | 5/1999 | Atkins |
| 5,906,420 A | 5/1999 | Rozier, Jr. |
| D410,800 S | 6/1999 | Gomez |
| 5,908,002 A | 6/1999 | Alexander |
| 5,911,178 A | 6/1999 | Alexander |
| 5,917,420 A | 6/1999 | Gonzalez |
| D411,926 S | 7/1999 | Brown et al. |
| 5,921,042 A | 7/1999 | Ashton |
| 5,921,052 A | 7/1999 | Kemp |
| 5,921,411 A | 7/1999 | Merl |
| 5,927,311 A | 7/1999 | Jager |
| D413,306 S | 8/1999 | Scherer et al. |
| 5,934,201 A | 8/1999 | Diffrient |
| 5,934,203 A | 8/1999 | Glass |
| 5,934,679 A | 8/1999 | Strain et al. |
| 5,937,924 A | 8/1999 | Cooper |
| 5,941,397 A | 8/1999 | Buchanan |
| 5,943,834 A | 8/1999 | Jeffers |
| 5,943,966 A | 8/1999 | Machado |
| 5,944,633 A | 8/1999 | Wittrock |
| 5,947,302 A | 9/1999 | Battaglia |
| 5,947,742 A | 9/1999 | Katayama |
| 5,950,371 A | 9/1999 | Rives |
| 5,950,649 A | 9/1999 | Gerig |
| 5,954,409 A | 9/1999 | LaCour |
| 5,957,556 A | 9/1999 | Singer |
| 5,967,631 A | 10/1999 | Ko |
| 5,970,662 A | 10/1999 | Corcorran |
| 5,971,508 A | 10/1999 | Deimen |
| 5,971,509 A | 10/1999 | Deimen |
| D415,901 S | 11/1999 | Arko et al. |
| 5,974,985 A | 11/1999 | Flototto |
| 5,975,657 A | 11/1999 | LaCour |
| 5,976,663 A | 11/1999 | Davis |
| 5,979,988 A | 11/1999 | Heidmann |
| 5,983,420 A | 11/1999 | Tilley |
| 5,986,212 A | 11/1999 | Lhota |
| 5,988,076 A | 11/1999 | Vander Park |
| 5,988,383 A | 11/1999 | Armstrong |
| 5,988,755 A | 11/1999 | Fastelli |
| 5,993,216 A | 11/1999 | Stogner |
| 5,994,644 A | 11/1999 | Rindoks |
| 5,996,145 A | 12/1999 | Taylor |
| 6,000,179 A | 12/1999 | Musculus |
| 6,000,343 A | 12/1999 | Laney |
| 6,000,750 A | 12/1999 | Rossman |
| 6,003,446 A | 12/1999 | Leibowitz |
| 6,003,447 A | 12/1999 | Cox |
| 6,004,065 A | 12/1999 | Higdon |
| D418,611 S | 1/2000 | Montague, III |
| 6,012,690 A | 1/2000 | Cohen |
| 6,013,008 A | 1/2000 | Fukushima |
| 6,014,572 A | 1/2000 | Takahashi |
| 6,015,124 A | 1/2000 | Loy |
| 6,024,024 A | 2/2000 | Favaretto |
| 6,024,599 A | 2/2000 | Stathis |
| 6,029,580 A | 2/2000 | Alfonso |
| 6,030,351 A | 2/2000 | Schmidt et al. |
| 6,032,108 A | 2/2000 | Sciple et al. |
| 6,036,150 A | 3/2000 | Lehrman |
| 6,036,516 A | 3/2000 | Byrne |
| 6,037,538 A | 3/2000 | Brooks |
| 6,039,420 A | 3/2000 | Besserer et al. |
| 6,041,722 A | 3/2000 | Baker |
| 6,047,508 A | 4/2000 | Goodman et al. |
| 6,050,426 A | 4/2000 | Leurdijk |
| 6,050,646 A | 4/2000 | Stenzel et al. |
| 6,050,659 A | 4/2000 | LaCour |
| D423,808 S | 5/2000 | Natuzzi et al. |
| 6,055,912 A | 5/2000 | Doud |
| 6,059,109 A | 5/2000 | Stein |
| 6,061,972 A | 5/2000 | Thorp |
| 6,070,956 A | 6/2000 | Yates |

(56) References Cited

U.S. PATENT DOCUMENTS

| | | | |
|---|---|---|---|
| 6,075,755 A | 6/2000 | Zarchan | |
| 6,076,308 A | 6/2000 | Lyon | |
| 6,076,317 A | 6/2000 | Hellwig | |
| 6,076,474 A | 6/2000 | Grabowski | |
| 6,076,903 A | 6/2000 | Vander Park | |
| 6,079,803 A | 6/2000 | West | |
| D427,783 S | 7/2000 | Luedke | |
| D428,557 S | 7/2000 | Chang | |
| 6,082,838 A | 7/2000 | Bissu | |
| 6,082,840 A | 7/2000 | Chau | |
| 6,086,028 A | 7/2000 | Pfister | |
| D429,081 S | 8/2000 | Gomez | |
| 6,098,349 A | 8/2000 | Zheng | |
| 6,098,821 A | 8/2000 | Dube | |
| 6,107,576 A | 8/2000 | Morton | |
| 6,109,280 A | 8/2000 | Custer | |
| D430,543 S | 9/2000 | Rohder | |
| 6,119,317 A | 9/2000 | Pfister | |
| 6,119,878 A | 9/2000 | Zen | |
| 6,119,989 A | 9/2000 | Hollington | |
| 6,120,097 A | 9/2000 | Perry et al. | |
| 6,120,207 A | 9/2000 | Goto | |
| D432,807 S | 10/2000 | Gollinucci | |
| 6,125,600 A | 10/2000 | Bastian | |
| 6,132,666 A | 10/2000 | Foley et al. | |
| 6,133,528 A | 10/2000 | Henriott et al. | |
| 6,134,852 A | 10/2000 | Shipman et al. | |
| 6,135,545 A | 10/2000 | Liao | |
| 6,135,583 A | 10/2000 | Simon | |
| 6,135,951 A | 10/2000 | Richardson et al. | |
| 6,138,827 A | 10/2000 | Marshall | |
| 6,138,831 A | 10/2000 | Agostinelli | |
| 6,138,841 A | 10/2000 | Klein | |
| 6,142,910 A | 11/2000 | Heuvelman | |
| 6,146,047 A | 11/2000 | Saito | |
| 6,148,958 A | 11/2000 | Ahl et al. | |
| 6,152,047 A | 11/2000 | Mac Namara | |
| 6,152,048 A | 11/2000 | Vander Park | |
| 6,152,312 A | 11/2000 | Nava | |
| 6,158,178 A | 12/2000 | Jeffers et al. | |
| 6,161,095 A | 12/2000 | Brown | |
| 6,161,486 A | 12/2000 | Boots | |
| 6,164,467 A | 12/2000 | DePottey | |
| 6,167,579 B1 | 1/2001 | Kopish | |
| 6,167,676 B1 | 1/2001 | Shipman | |
| 6,170,200 B1 | 1/2001 | Cornell | |
| 6,170,410 B1 | 1/2001 | Gioacchini | |
| 6,176,561 B1 | 1/2001 | Roels | |
| 6,180,884 B1 | 1/2001 | Tokunaga | |
| 6,182,579 B1 | 2/2001 | Chang | |
| 6,182,580 B1 | 2/2001 | Barrett | |
| 6,183,280 B1 * | 2/2001 | Laukhuf | A47B 21/06 439/214 |
| 6,189,268 B1 | 2/2001 | Carr | |
| D438,402 S | 3/2001 | Walsh | |
| D439,624 S | 3/2001 | Webb | |
| 6,196,648 B1 | 3/2001 | Henriott | |
| 6,199,321 B1 | 3/2001 | Ginzel | |
| 6,202,567 B1 * | 3/2001 | Funk | A47B 21/06 108/50.01 |
| 6,205,716 B1 | 3/2001 | Peltz | |
| 6,206,206 B1 | 3/2001 | Saylor | |
| D440,448 S | 4/2001 | Horsten | |
| 6,213,191 B1 | 4/2001 | Nitzsche | |
| 6,213,919 B1 | 4/2001 | Wang | |
| 6,216,397 B1 | 4/2001 | Chang | |
| 6,216,606 B1 | 4/2001 | Kathardekar et al. | |
| 6,220,186 B1 | 4/2001 | Scharer | |
| 6,224,029 B1 | 5/2001 | Marble | |
| 6,233,900 B1 | 5/2001 | Gill | |
| 6,234,385 B1 | 5/2001 | Espinoza | |
| 6,234,812 B1 * | 5/2001 | Ivers | H01R 25/006 439/378 |
| D443,157 S | 6/2001 | Linder | |
| 6,240,587 B1 | 6/2001 | Meichtry et al. | |
| 6,240,687 B1 | 6/2001 | Chong | |
| 6,241,317 B1 | 6/2001 | Wu | |
| 6,244,988 B1 | 6/2001 | Delman | |
| 6,250,020 B1 | 6/2001 | Shipman | |
| 6,253,509 B1 | 7/2001 | Hellwig et al. | |
| 6,254,206 B1 | 7/2001 | Petrick | |
| 6,254,427 B1 * | 7/2001 | Stathis | H01R 13/60 439/535 |
| 6,267,064 B1 | 7/2001 | Ostertag | |
| 6,267,338 B1 | 7/2001 | Saylor | |
| D446,039 S | 8/2001 | Gomez | |
| 6,270,162 B1 | 8/2001 | Jeny | |
| 6,276,382 B1 | 8/2001 | Bindschatel et al. | |
| 6,282,854 B1 | 9/2001 | Vos | |
| 6,283,043 B1 | 9/2001 | Stern | |
| 6,283,564 B1 | 9/2001 | Corson | |
| 6,285,544 B1 | 9/2001 | Chandramohan | |
| 6,286,192 B2 | 9/2001 | Pfister | |
| 6,286,441 B1 | 9/2001 | Burdi et al. | |
| 6,289,826 B1 | 9/2001 | Waisbrod | |
| 6,293,506 B1 | 9/2001 | Gutgsell | |
| D448,946 S | 10/2001 | Goetz | |
| 6,296,002 B1 | 10/2001 | Tashchyan | |
| 6,296,408 B1 | 10/2001 | Larkin et al. | |
| 6,302,035 B1 | 10/2001 | Frenkler | |
| 6,302,053 B1 | 10/2001 | Tomczak et al. | |
| 6,302,366 B1 | 10/2001 | Saylor | |
| 6,308,641 B1 | 10/2001 | Kingbury | |
| D450,959 S | 11/2001 | Birsel et al. | |
| 6,312,363 B1 | 11/2001 | Watterson et al. | |
| 6,318,276 B1 | 11/2001 | Reinecke | |
| 6,324,997 B1 | 12/2001 | Baker | |
| 6,327,983 B1 | 12/2001 | Cronk | |
| 6,329,960 B1 | 12/2001 | Andrew | |
| 6,330,773 B1 | 12/2001 | MacDonald | |
| 6,336,414 B1 | 1/2002 | Stewart | |
| 6,338,172 B1 | 1/2002 | Taylor | |
| 6,338,226 B1 | 1/2002 | Gauthier | |
| 6,340,145 B1 | 1/2002 | Tagami | |
| 6,341,666 B1 | 1/2002 | Allen | |
| 6,341,822 B2 | 1/2002 | Apissomian | |
| 6,347,591 B1 | 2/2002 | Karpa | |
| 6,347,592 B1 | 2/2002 | Gessert | |
| 6,349,507 B1 | 2/2002 | Muellerleile | |
| 6,354,043 B1 | 3/2002 | Simon | |
| 6,357,616 B1 | 3/2002 | Harris | |
| 6,360,675 B1 | 3/2002 | Jones | |
| 6,362,420 B1 | 3/2002 | Bacouelle et al. | |
| 6,363,414 B1 | 3/2002 | Nicholls | |
| D455,302 S | 4/2002 | Minami | |
| D455,576 S | 4/2002 | Tzeng | |
| D456,293 S | 4/2002 | Tsumura et al. | |
| 6,364,128 B1 | 4/2002 | Wohlford | |
| 6,367,874 B2 | 4/2002 | Casini | |
| 6,367,880 B1 | 4/2002 | Niederman | |
| 6,370,741 B1 | 4/2002 | Lu | |
| 6,371,309 B1 | 4/2002 | Smith | |
| 6,372,560 B1 | 4/2002 | Jen | |
| 6,374,455 B1 | 4/2002 | Regele et al. | |
| 6,374,548 B1 | 4/2002 | Ruedinger et al. | |
| D457,017 S | 5/2002 | Muller | |
| D457,359 S | 5/2002 | Chan | |
| D457,736 S | 5/2002 | Simons, Jr. et al. | |
| D457,737 S | 5/2002 | Citterio | |
| 6,382,747 B1 | 5/2002 | Catta | |
| 6,384,329 B2 | 5/2002 | Buard | |
| 6,393,658 B1 | 5/2002 | Chong | |
| 6,394,001 B1 | 5/2002 | Giesey | |
| D458,040 S | 6/2002 | Stannis et al. | |
| D458,041 S | 6/2002 | Couture et al. | |
| D458,463 S | 6/2002 | Citterio | |
| 6,397,762 B1 | 6/2002 | Goldberg | |
| 6,398,326 B1 | 6/2002 | Wang | |
| 6,401,862 B1 | 6/2002 | Caron | |
| 6,402,111 B1 | 6/2002 | Stewart | |
| 6,402,233 B1 | 6/2002 | Tseng | |
| 6,410,855 B1 | 6/2002 | Berkowitz | |
| 6,415,723 B1 * | 7/2002 | Kopish | A47B 21/06 108/50.02 |

(56) References Cited

U.S. PATENT DOCUMENTS

| | | |
|---|---|---|
| 6,422,398 B2 | 7/2002 | LaFontaine |
| 6,425,219 B1 | 7/2002 | Barmak |
| 6,427,608 B1 | 8/2002 | Crinion |
| 6,427,609 B1 | 8/2002 | Grant |
| 6,430,049 B1 | 8/2002 | Lai et al. |
| 6,431,436 B1 | 8/2002 | Evers |
| 6,435,106 B2 | 8/2002 | Funk |
| 6,435,461 B1 | 8/2002 | Saylor |
| 6,442,909 B2 | 9/2002 | Waalkes et al. |
| 6,446,981 B1 | 9/2002 | Wise |
| 6,447,067 B1 | 9/2002 | Williams et al. |
| 6,447,080 B1 | 9/2002 | Rheault |
| 6,447,424 B1 | 9/2002 | Ashby et al. |
| 6,454,358 B1 | 9/2002 | Benincasa |
| D464,502 S | 10/2002 | Chen |
| 6,457,422 B1 | 10/2002 | Saul |
| 6,458,060 B1 | 10/2002 | Watterson et al. |
| 6,463,701 B1 | 10/2002 | Baloga |
| 6,469,747 B1 | 10/2002 | Rai |
| D465,201 S | 11/2002 | Gershfeld |
| 6,474,025 B1 | 11/2002 | Faiks |
| 6,480,243 B2 | 11/2002 | Yamamoto |
| 6,481,163 B1 | 11/2002 | King et al. |
| 6,481,177 B1 | 11/2002 | Wood |
| 6,481,678 B1 | 11/2002 | Chong |
| 6,483,027 B1 | 11/2002 | Howard |
| 6,484,360 B1 | 11/2002 | DeBartolo, Jr. |
| D467,092 S | 12/2002 | Vu |
| 6,488,347 B1 | 12/2002 | Bienick |
| 6,490,829 B1 | 12/2002 | Schreiner |
| 6,490,981 B2 | 12/2002 | Isensee |
| 6,494,335 B1 | 12/2002 | Kellogg et al. |
| 6,497,184 B1 | 12/2002 | Whitesitt |
| 6,497,268 B1 | 12/2002 | Peppett |
| 6,499,608 B1 | 12/2002 | Sterling |
| D468,837 S | 1/2003 | Shilling et al. |
| 6,510,663 B2 | 1/2003 | Jourden |
| 6,516,571 B1 | 2/2003 | Overthun et al. |
| 6,520,353 B2 | 2/2003 | Fulbright |
| 6,523,795 B2 | 2/2003 | Gutgsell |
| 6,527,235 B1 | 3/2003 | Cotterill |
| 6,527,674 B1 | 3/2003 | Clem |
| 6,530,181 B1 | 3/2003 | Seiber |
| 6,533,019 B1 | 3/2003 | King |
| 6,536,147 B1 | 3/2003 | Funk et al. |
| 6,536,858 B1 | 3/2003 | Heidmann |
| D473,723 S | 4/2003 | Pesso |
| D473,850 S | 4/2003 | Rouleau et al. |
| 6,540,549 B2 | 4/2003 | Rupert |
| 6,547,086 B1 | 4/2003 | Harvey |
| 6,550,875 B1 | 4/2003 | Compton |
| 6,553,731 B2 | 4/2003 | Hsueh |
| 6,553,919 B1 | 4/2003 | Nevin |
| D474,287 S | 5/2003 | Gresham et al. |
| 6,557,191 B2 | 5/2003 | Bellows |
| 6,557,310 B2 | 5/2003 | Marshall |
| 6,559,829 B1 | 5/2003 | Matsuo |
| 6,560,094 B2 | 5/2003 | Schmidt |
| 6,564,941 B2 | 5/2003 | Hedges |
| 6,568,335 B2 | 5/2003 | Hamilton |
| 6,571,519 B1 | 6/2003 | Diffrient et al. |
| 6,578,498 B1 | 6/2003 | Draudt |
| 6,581,344 B1 | 6/2003 | Niewiadomski |
| 6,588,346 B1 | 7/2003 | Bockheim |
| 6,595,144 B1 | 7/2003 | Doyle |
| 6,595,227 B2 | 7/2003 | Le Gette |
| 6,609,465 B2 | 8/2003 | Kolavo |
| 6,615,550 B2 | 9/2003 | Reuschel |
| 6,617,676 B1 | 9/2003 | Oddou |
| 6,622,116 B2 | 9/2003 | Skinner et al. |
| 6,622,771 B2 | 9/2003 | Plockmeyer |
| D480,883 S | 10/2003 | Williams et al. |
| 6,629,505 B1 | 10/2003 | Cronk |
| D482,535 S | 11/2003 | Williams et al. |
| 6,644,329 B2 | 11/2003 | Tomason |
| 6,659,023 B2 | 12/2003 | Saltzman et al. |
| 6,659,546 B2 | 12/2003 | Schmeing et al. |
| 6,662,731 B2 | 12/2003 | Teppo |
| 6,662,732 B2 | 12/2003 | Birsel |
| 6,663,201 B2 | 12/2003 | Herron, III |
| 6,666,342 B1 | 12/2003 | House |
| 6,669,286 B2 | 12/2003 | Iusim |
| D484,709 S | 1/2004 | Cronk et al. |
| D485,086 S | 1/2004 | Gomez |
| 6,672,011 B2 | 1/2004 | Garner |
| 6,676,231 B1 | 1/2004 | Kelley et al. |
| 6,682,256 B1 | 1/2004 | Hor |
| 6,687,930 B1 | 2/2004 | Eads |
| 6,702,719 B1 | 3/2004 | Brown et al. |
| 6,712,008 B1 | 3/2004 | Habenicht |
| 6,712,433 B2 | 3/2004 | Hellwig |
| 6,715,837 B2 | 4/2004 | Niederman |
| 6,716,139 B1 | 4/2004 | Hosseinzadeh-Dolkhani et al. |
| 6,725,784 B2 | 4/2004 | Crinion |
| 6,726,277 B1 | 4/2004 | Samaha |
| 6,729,085 B2 | 5/2004 | Newhouse |
| 6,736,076 B2 | 5/2004 | Kaltenmark |
| 6,739,096 B2 | 5/2004 | Feldpausch |
| 6,742,307 B2 | 6/2004 | Briskman |
| 6,742,461 B1 | 6/2004 | Sen |
| 6,746,371 B1 | 6/2004 | Brown et al. |
| 6,748,710 B2 | 6/2004 | Gresham |
| 6,749,001 B2 | 6/2004 | Peppett |
| 6,749,074 B1 | 6/2004 | Hileman |
| 6,749,161 B1 | 6/2004 | Will |
| 6,749,537 B1 | 6/2004 | Hickman |
| 6,751,914 B2 | 6/2004 | Zeh |
| 6,754,998 B2 | 6/2004 | Diffrient et al. |
| 6,758,355 B2 | 7/2004 | Zidek |
| 6,764,245 B2 | 7/2004 | Popovski |
| 6,765,148 B2 | 7/2004 | Rix |
| 6,766,748 B2 | 7/2004 | Insalaco |
| 6,769,747 B2 | 8/2004 | Chan |
| 6,783,482 B2 | 8/2004 | Oglesby et al. |
| D495,514 S | 9/2004 | Ricci |
| D495,518 S | 9/2004 | Ricci |
| 6,786,161 B2 | 9/2004 | Fischer |
| 6,786,340 B2 | 9/2004 | Ford |
| 6,790,178 B1 | 9/2004 | Mault et al. |
| 6,792,876 B2 | 9/2004 | Lin |
| 6,793,607 B2 | 9/2004 | Neil |
| 6,796,443 B2 | 9/2004 | Lippman |
| 6,802,264 B2 | 10/2004 | Kasak |
| 6,802,715 B1 | 10/2004 | Wotton |
| 6,805,060 B2 | 10/2004 | Nicoletti |
| 6,806,664 B2 | 10/2004 | Beishline |
| 6,807,776 B2 | 10/2004 | Girdwood |
| D498,074 S | 11/2004 | Gomez |
| 6,812,833 B2 | 11/2004 | Rothkop et al. |
| 6,818,305 B2 | 11/2004 | Murar |
| 6,820,388 B2 | 11/2004 | Newhouse |
| 6,827,028 B1 | 12/2004 | Callaway |
| 6,827,320 B2 | 12/2004 | Yeh |
| 6,829,792 B2 | 12/2004 | Braly |
| 6,837,384 B2 | 1/2005 | Secondino |
| 6,845,723 B2 | 1/2005 | Kottman |
| D501,330 S | 2/2005 | Gomez |
| 6,851,140 B2 | 2/2005 | Polevoy |
| 6,851,226 B2 | 2/2005 | MacGregor |
| 6,854,217 B2 | 2/2005 | Bockheim et al. |
| 6,854,233 B2 | 2/2005 | Pitsch et al. |
| 6,857,712 B1 | 2/2005 | Haberman |
| 6,866,890 B2 | 3/2005 | Kiryu |
| 6,870,477 B2 | 3/2005 | Gruteser et al. |
| 6,877,731 B1 | 4/2005 | Corley, Sr. |
| 6,877,824 B2 | 4/2005 | Winkless |
| 6,880,185 B1 | 4/2005 | McAdams |
| D505,456 S | 5/2005 | Green |
| 6,886,890 B2 | 5/2005 | Rowland |
| 6,895,634 B2 | 5/2005 | Tisbo |
| 6,895,868 B1 | 5/2005 | Cronk et al. |
| 6,895,869 B2 | 5/2005 | Lai |
| 6,899,404 B1 | 5/2005 | King |
| 6,901,940 B2 | 6/2005 | Zheng |

(56) References Cited

U.S. PATENT DOCUMENTS

| | | | |
|---|---|---|---|
| 6,904,719 | B2 | 6/2005 | Braun |
| 6,908,148 | B2 | 6/2005 | Wang et al. |
| 6,910,306 | B2 | 6/2005 | Waalkes et al. |
| 6,912,960 | B2 | 7/2005 | Tsai |
| D508,455 | S | 8/2005 | Oakley et al. |
| 6,928,785 | B2 | 8/2005 | Shipman |
| 6,931,795 | B1 | 8/2005 | Baloga |
| 6,935,247 | B2 | 8/2005 | Schaefers |
| 6,935,517 | B1 | 8/2005 | Reed |
| 6,942,306 | B2 | 9/2005 | Youngs |
| D510,699 | S | 10/2005 | Crain et al. |
| 6,951,085 | B2 | 10/2005 | Hodges |
| 6,957,878 | B2 | 10/2005 | Greenwald |
| 6,960,098 | B1 * | 11/2005 | Tseng ............ H01R 13/73 439/502 |
| 6,964,370 | B1 | 11/2005 | Hagale et al. |
| 6,968,957 | B2 | 11/2005 | Fynn |
| 6,972,367 | B2 | 12/2005 | Federspiel |
| 6,976,732 | B2 | 12/2005 | Thomas |
| 6,977,476 | B2 | 12/2005 | Koch |
| 6,980,259 | B2 | 12/2005 | Strollo |
| 6,986,491 | B2 | 1/2006 | Anderson |
| 6,986,556 | B2 | 1/2006 | Haberman |
| 6,987,221 | B2 | 1/2006 | Platt |
| 6,990,909 | B2 | 1/2006 | Gosling |
| D516,101 | S | 2/2006 | Vardon |
| D516,227 | S | 2/2006 | Price |
| 7,004,081 | B2 | 2/2006 | Chang |
| 7,005,884 | B2 | 2/2006 | Gunton |
| 7,007,903 | B2 | 3/2006 | Turner |
| 7,008,031 | B2 | 3/2006 | Doerflinger |
| 7,014,052 | B2 | 3/2006 | Dettorre |
| 7,020,911 | B2 | 4/2006 | Oldham |
| 7,025,424 | B2 | 4/2006 | Harley |
| 7,030,735 | B2 | 4/2006 | Chen |
| 7,032,523 | B2 | 4/2006 | Forslund, III |
| D520,263 | S | 5/2006 | Nobles et al. |
| 7,036,438 | B2 | 5/2006 | Okamoto |
| 7,040,700 | B2 | 5/2006 | Duncan |
| 7,048,333 | B2 | 5/2006 | Martinez |
| 7,048,346 | B2 | 5/2006 | Saravis |
| 7,049,728 | B2 | 5/2006 | Bastholm |
| 7,051,482 | B2 | 5/2006 | MacDonald et al. |
| 7,063,644 | B2 | 6/2006 | Albert et al. |
| 7,066,097 | B2 | 6/2006 | Gayhart et al. |
| 7,066,098 | B2 | 6/2006 | Blasen |
| 7,066,435 | B2 | 6/2006 | Oddsen, Jr |
| 7,070,156 | B2 | 7/2006 | Liao |
| 7,070,539 | B2 | 7/2006 | Brown et al. |
| 7,075,101 | B2 | 7/2006 | Iiyama |
| 7,077,068 | B1 | 7/2006 | Agee |
| 7,083,421 | B1 * | 8/2006 | Mori ............ H01R 25/006 439/574 |
| 7,096,560 | B2 | 8/2006 | Oddsen, Jr. |
| 7,097,588 | B2 | 8/2006 | Watterson et al. |
| 7,100,999 | B2 | 9/2006 | Stravitz |
| D530,929 | S | 10/2006 | Resterhouse et al. |
| D531,225 | S | 10/2006 | Kent et al. |
| 7,114,972 | B1 | 10/2006 | Riner |
| 7,117,802 | B1 | 10/2006 | Hoke, Jr. |
| 7,125,088 | B2 | 10/2006 | Haberman |
| 7,128,693 | B2 | 10/2006 | Brown et al. |
| 7,140,134 | B1 | 11/2006 | Flagg |
| 7,141,026 | B2 | 11/2006 | Aminian et al. |
| D533,365 | S | 12/2006 | Martin |
| 7,152,918 | B2 | 12/2006 | Berkes |
| 7,159,053 | B1 | 1/2007 | Lakin |
| 7,161,490 | B2 | 1/2007 | Huiban |
| D537,532 | S | 2/2007 | Takeuchi et al. |
| 7,172,166 | B2 | 2/2007 | Wang |
| 7,172,530 | B1 | 2/2007 | Hercules |
| 7,175,152 | B2 | 2/2007 | Dittmer |
| 7,182,415 | B2 | 2/2007 | Yamada |
| D538,054 | S | 3/2007 | Lissoni |
| D539,047 | S | 3/2007 | Auberger |
| 7,185,767 | B2 | 3/2007 | Phillips |
| 7,191,713 | B2 * | 3/2007 | Gayhart ............ A47B 21/06 108/50.02 |
| 7,195,119 | B2 | 3/2007 | Lungo |
| 7,201,107 | B1 | 4/2007 | Ruiter |
| D543,404 | S | 5/2007 | Watkins et al. |
| 7,210,593 | B2 | 5/2007 | Stull |
| D544,062 | S | 6/2007 | Baker |
| 7,225,822 | B1 | 6/2007 | Zheng |
| 7,228,977 | B2 | 6/2007 | Perkins |
| 7,237,855 | B2 | 7/2007 | Vardon |
| 7,241,981 | B2 | 7/2007 | Hofmann |
| 7,249,624 | B2 | 7/2007 | Zeh |
| D547,974 | S | 8/2007 | Daniel |
| D549,470 | S | 8/2007 | Hutton |
| 7,252,339 | B2 | 8/2007 | Owens |
| 7,270,309 | B2 | 9/2007 | Burns |
| 7,278,360 | B2 | 10/2007 | Griepentrog |
| D554,387 | S | 11/2007 | Nicoletti |
| 7,290,651 | B2 | 11/2007 | Irwin |
| 7,300,029 | B2 | 11/2007 | Petrick |
| 7,301,463 | B1 | 11/2007 | Paterno |
| 7,303,417 | B2 | 12/2007 | Lubkert |
| 7,325,343 | B2 | 2/2008 | Seiber |
| 7,327,442 | B1 | 2/2008 | Fear et al. |
| 7,334,762 | B2 | 2/2008 | Dittmer |
| D564,764 | S | 3/2008 | Springer et al. |
| 7,343,864 | B2 | 3/2008 | Canin |
| D565,849 | S | 4/2008 | Newhouse |
| 7,357,086 | B2 | 4/2008 | Petrick |
| D568,344 | S | 5/2008 | Baacke et al. |
| D569,105 | S | 5/2008 | Van Hoom |
| D569,142 | S | 5/2008 | Burak |
| 7,369,401 | B1 | 5/2008 | Floersch |
| 7,370,907 | B2 | 5/2008 | Leong |
| 7,377,078 | B2 | 5/2008 | Golino |
| 7,389,564 | B2 | 6/2008 | Lautenschläger |
| D573,820 | S | 7/2008 | Burak |
| 7,406,803 | B2 | 8/2008 | Haberman |
| 7,408,114 | B2 | 8/2008 | VanderVelde |
| 7,411,126 | B2 | 8/2008 | Herzog |
| 7,428,872 | B2 | 9/2008 | Strong |
| 7,433,618 | B2 | 10/2008 | Bartley |
| 7,434,304 | B2 | 10/2008 | Owens |
| 7,439,694 | B2 | 10/2008 | Atlas et al. |
| 7,439,956 | B1 | 10/2008 | Albouyeh et al. |
| 7,441,739 | B2 | 10/2008 | Huang |
| 7,461,484 | B2 | 12/2008 | Battey |
| 7,469,090 | B2 | 12/2008 | Ferris |
| D584,074 | S | 1/2009 | Gadzinski et al. |
| D584,524 | S | 1/2009 | Ricci |
| D584,900 | S | 1/2009 | Hackethal et al. |
| D585,218 | S | 1/2009 | Hamilton et al. |
| 7,472,656 | B2 | 1/2009 | Riach |
| 7,481,502 | B2 | 1/2009 | Ortiz |
| 7,510,508 | B2 | 3/2009 | Santomassimo et al. |
| 7,513,470 | B2 | 4/2009 | Lomberk |
| 7,516,708 | B2 | 4/2009 | Willy |
| 7,516,854 | B2 | 4/2009 | Brown |
| 7,516,929 | B2 | 4/2009 | Brustein |
| 7,517,029 | B2 | 4/2009 | Cvek |
| 7,520,076 | B2 | 4/2009 | Flagg |
| 7,523,903 | B1 | 4/2009 | Rindoks |
| 7,523,905 | B2 | 4/2009 | Timm et al. |
| 7,527,331 | B2 | 5/2009 | Fargason, III |
| 7,530,651 | B2 | 5/2009 | Ho |
| 7,538,284 | B2 | 5/2009 | Nielsen et al. |
| 7,544,893 | B2 | 6/2009 | Wallgren |
| D595,865 | S | 7/2009 | Magnusson |
| D596,876 | S | 7/2009 | Oshinomi et al. |
| D596,878 | S | 7/2009 | Oshinomi |
| D597,345 | S | 8/2009 | Oshinomi et al. |
| 7,575,011 | B2 | 8/2009 | Zheng |
| 7,578,399 | B1 | 8/2009 | Mulaw |
| D599,122 | S | 9/2009 | Feldpausch et al. |
| 7,586,041 | B2 | 9/2009 | VanderVelde |
| 7,591,385 | B2 | 9/2009 | Brooks |
| 7,594,700 | B2 | 9/2009 | Stumpf |
| 7,594,823 | B2 | 9/2009 | Moscovitch |

(56) References Cited

U.S. PATENT DOCUMENTS

| | | | |
|---|---|---|---|
| 7,594,873 B2 | 9/2009 | Terao et al. |
| D602,706 S | 10/2009 | Cramer et al. |
| D603,065 S | 10/2009 | Hamilton et al. |
| 7,605,330 B1 * | 10/2009 | Black | H02G 3/185 |
| | | | 174/53 |
| 7,607,625 B2 | 10/2009 | Wang |
| D603,617 S | 11/2009 | Weiss |
| 7,614,001 B2 | 11/2009 | Abbott et al. |
| 7,614,350 B2 | 11/2009 | Tuttle |
| 7,621,421 B2 | 11/2009 | Ohayon |
| 7,621,489 B2 | 11/2009 | Cvek |
| 7,621,500 B2 | 11/2009 | Ishizaki |
| 7,624,959 B2 | 12/2009 | Dozier |
| 7,628,737 B2 | 12/2009 | Kowallis et al. |
| 7,635,324 B2 | 12/2009 | Balis |
| 7,637,847 B1 | 12/2009 | Hickman |
| D608,407 S | 1/2010 | Medlock |
| 7,640,866 B1 * | 1/2010 | Schermerhorn | A47B 21/00 |
| | | | 108/50.02 |
| 7,641,056 B2 | 1/2010 | Schulman |
| 7,644,456 B2 | 1/2010 | Polevoy |
| 7,645,212 B2 | 1/2010 | Ashby et al. |
| 7,652,230 B2 | 1/2010 | Baier |
| 7,658,199 B2 | 2/2010 | Ayers |
| 7,661,292 B2 | 2/2010 | Buitmann et al. |
| 7,665,255 B2 * | 2/2010 | Dressendorfer | H02G 3/0456 |
| | | | 108/50.02 |
| 7,665,709 B2 | 2/2010 | Cvek |
| D612,174 S | 3/2010 | Dingjian et al. |
| 7,673,838 B2 | 3/2010 | Oddsen, Jr. |
| 7,676,992 B2 | 3/2010 | Burns |
| 7,677,182 B2 | 3/2010 | Mueller |
| 7,681,949 B2 | 3/2010 | Nathan et al. |
| 7,686,172 B2 | 3/2010 | Wisnoski |
| 7,694,925 B2 | 4/2010 | Kokenge |
| 7,697,268 B2 | 4/2010 | Johnson |
| 7,703,398 B2 | 4/2010 | Bräuning |
| 7,703,469 B2 | 4/2010 | Danziger |
| D614,844 S | 5/2010 | Trunfio |
| D615,308 S | 5/2010 | Serra Sola et al. |
| 7,713,172 B2 | 5/2010 | Watterson et al. |
| 7,717,827 B2 | 5/2010 | Kurunmaki et al. |
| 7,721,361 B1 | 5/2010 | Shubert |
| 7,722,503 B1 | 5/2010 | Smith et al. |
| D616,663 S | 6/2010 | Natuzzi |
| D617,112 S | 6/2010 | Tsai |
| 7,726,617 B2 | 6/2010 | Zambelli |
| 7,735,167 B2 | 6/2010 | Kline |
| 7,735,918 B2 | 6/2010 | Beck |
| 7,740,048 B2 | 6/2010 | Wilson |
| 7,740,310 B1 | 6/2010 | Forster |
| 7,753,063 B1 | 7/2010 | Laws |
| 7,757,869 B2 | 7/2010 | Lawson |
| 7,765,651 B2 | 8/2010 | Seth |
| D624,084 S | 9/2010 | Scheper et al. |
| 7,798,463 B2 | 9/2010 | Morgenroth |
| 7,802,407 B2 | 9/2010 | Haberman |
| 7,810,654 B1 | 10/2010 | Wang |
| 7,827,920 B2 | 11/2010 | Beck |
| 7,832,147 B2 | 11/2010 | Weast |
| D628,403 S | 12/2010 | Starck |
| 7,856,756 B1 | 12/2010 | Caruso |
| 7,857,731 B2 | 12/2010 | Hickman et al. |
| 7,871,048 B2 | 1/2011 | Sculler |
| 7,871,131 B2 | 1/2011 | Rowland |
| 7,871,280 B2 * | 1/2011 | Henriott | A47B 21/06 |
| | | | 439/215 |
| 7,878,476 B2 | 2/2011 | Carson |
| 7,884,808 B2 | 2/2011 | Joo |
| 7,891,617 B2 | 2/2011 | Tisbo |
| 7,892,148 B1 | 2/2011 | Stauffer et al. |
| 7,896,015 B2 | 3/2011 | Milano, Jr. |
| 7,900,781 B2 | 3/2011 | Baine |
| 7,900,783 B2 | 3/2011 | Fernandez |
| 7,901,224 B1 * | 3/2011 | Black | H02G 3/123 |
| | | | 439/142 |
| 7,905,242 B2 | 3/2011 | Kline |
| 7,909,400 B1 | 3/2011 | Delaney |
| 7,909,737 B2 | 3/2011 | Ellis et al. |
| 7,914,468 B2 | 3/2011 | Shalon et al. |
| 7,921,615 B2 | 4/2011 | Picchio |
| 7,931,563 B2 | 4/2011 | Shaw et al. |
| 7,942,100 B2 | 5/2011 | Grove |
| 7,955,219 B2 | 6/2011 | Birrell et al. |
| 8,001,472 B2 | 8/2011 | Gilley et al. |
| 8,015,765 B2 | 9/2011 | Stackenwalt |
| 8,024,202 B2 | 9/2011 | Carroll et al. |
| 8,047,914 B2 | 11/2011 | Morrow |
| 8,047,966 B2 | 11/2011 | Dorogusker et al. |
| 8,051,782 B2 | 11/2011 | Nethken et al. |
| 8,052,580 B2 | 11/2011 | Saalasti et al. |
| D649,807 S | 12/2011 | Stoepker |
| D651,416 S | 1/2012 | Martin et al. |
| 8,092,346 B2 | 1/2012 | Shea |
| 8,105,209 B2 | 1/2012 | Lannon et al. |
| 8,109,215 B2 | 2/2012 | Kitada et al. |
| 8,109,858 B2 | 2/2012 | Redmann |
| 8,113,990 B2 | 2/2012 | Kolman et al. |
| D655,541 S | 3/2012 | Zemel |
| 8,141,947 B2 | 3/2012 | Nathan et al. |
| 8,146,229 B2 * | 4/2012 | Henriott | A47B 21/06 |
| | | | 29/455.1 |
| 8,159,335 B2 | 4/2012 | Cox, Jr. |
| 8,167,776 B2 | 5/2012 | Lannon et al. |
| 8,196,526 B2 | 6/2012 | Rheault |
| 8,206,325 B1 | 6/2012 | Najafi et al. |
| 8,225,723 B2 | 7/2012 | Nakamura et al. |
| 8,257,228 B2 | 9/2012 | Quatrochi et al. |
| 8,276,523 B2 | 10/2012 | Miller et al. |
| 8,361,000 B2 | 1/2013 | Gaspard |
| 8,381,603 B2 | 2/2013 | Peng et al. |
| 8,432,356 B2 | 4/2013 | Chase |
| 8,462,921 B2 | 6/2013 | Parker |
| 8,477,039 B2 | 7/2013 | Gleckler et al. |
| 8,522,695 B2 | 9/2013 | Ellegaard |
| 8,534,752 B2 | 9/2013 | Martin et al. |
| 8,540,641 B2 | 9/2013 | Kroll et al. |
| 8,550,820 B2 | 10/2013 | Soltanoff |
| 8,560,336 B2 | 10/2013 | Schwarzberg et al. |
| 8,593,286 B2 | 11/2013 | Razoumov et al. |
| 8,595,023 B2 | 11/2013 | Kirchhoff et al. |
| 8,596,716 B1 | 12/2013 | Caruso |
| 8,620,617 B2 | 12/2013 | Yuen et al. |
| 8,667,908 B2 | 3/2014 | Martin et al. |
| 8,668,045 B2 | 3/2014 | Cohen |
| 8,688,467 B2 | 4/2014 | Harrison et al. |
| 8,689,705 B2 | 4/2014 | Martin et al. |
| 8,690,578 B1 | 4/2014 | Nusbaum et al. |
| 8,690,735 B2 | 4/2014 | Watterson et al. |
| 8,700,690 B2 | 4/2014 | Raghav et al. |
| 8,771,222 B2 | 7/2014 | Kanderian, Jr. et al. |
| 8,812,096 B2 | 8/2014 | Flaherty et al. |
| 8,814,754 B2 | 8/2014 | Weast et al. |
| 8,818,782 B2 | 8/2014 | Thukral et al. |
| 8,821,350 B2 | 9/2014 | Maertz |
| 8,825,482 B2 | 9/2014 | Hernandez-Abrego et al. |
| 8,836,500 B2 | 9/2014 | Houvener et al. |
| 8,847,988 B2 | 9/2014 | Geisner et al. |
| 8,947,215 B2 | 2/2015 | Mandel et al. |
| 8,960,102 B2 | 2/2015 | Rheault et al. |
| 8,965,541 B2 | 2/2015 | Martinez et al. |
| 8,984,685 B2 | 3/2015 | Robertson et al. |
| 8,997,588 B2 | 4/2015 | Taylor |
| 9,049,923 B1 | 6/2015 | Delagey et al. |
| 9,084,475 B2 | 7/2015 | Hjelm |
| 9,089,209 B2 * | 7/2015 | Matthai | A47B 21/0314 |
| D739,165 S | 9/2015 | Momeny |
| 9,119,568 B2 | 9/2015 | Yin et al. |
| 9,125,486 B2 | 9/2015 | Rheault et al. |
| 9,167,894 B2 | 10/2015 | DesRoches et al. |
| 9,185,974 B2 | 11/2015 | Martin et al. |
| 9,196,175 B2 | 11/2015 | Walsh et al. |
| 9,210,999 B2 | 12/2015 | Martin et al. |

(56) References Cited

U.S. PATENT DOCUMENTS

| | | |
|---|---|---|
| 9,236,817 B2 | 1/2016 | Strothmann et al. |
| 9,326,597 B2 | 5/2016 | Lukas et al. |
| 9,486,070 B2 | 11/2016 | Labrosse et al. |
| D785,375 S | 5/2017 | Flaherty et al. |
| 9,681,747 B1* | 6/2017 | Pectol ................ A47B 13/083 |
| 9,795,322 B1 | 10/2017 | Karunaratne et al. |
| 9,905,106 B2 | 2/2018 | Yang et al. |
| 9,907,396 B1 | 3/2018 | Labrosse et al. |
| 9,971,340 B1 | 5/2018 | Labrosse et al. |
| 10,028,576 B1* | 7/2018 | Yao ........................ A47B 9/20 |
| 10,038,952 B2 | 7/2018 | Labrosse et al. |
| 10,039,374 B2 | 8/2018 | Abraham et al. |
| 10,085,562 B1 | 10/2018 | Labrosse et al. |
| 10,130,169 B1 | 11/2018 | Labrosse et al. |
| 10,130,170 B1 | 11/2018 | Labrosse et al. |
| 10,133,261 B2 | 11/2018 | Labrosse et al. |
| 10,159,337 B2 | 12/2018 | Abernethy et al. |
| 10,206,498 B1 | 2/2019 | Labrosse et al. |
| 10,209,705 B1 | 2/2019 | Labrosse et al. |
| 10,271,643 B2* | 4/2019 | Yamamoto .............. F16L 3/015 |
| 10,381,808 B2* | 8/2019 | Byrne ..................... H02B 1/06 |
| 10,390,620 B2 | 8/2019 | Labrosse et al. |
| 10,419,842 B2 | 9/2019 | Labrosse et al. |
| 10,631,640 B2 | 4/2020 | Labrosse et al. |
| 10,691,108 B1 | 6/2020 | Labrosse et al. |
| 10,719,064 B1 | 7/2020 | Labrosse et al. |
| 10,802,473 B2 | 10/2020 | Labrosse et al. |
| 2001/0013305 A1 | 8/2001 | Funk et al. |
| 2001/0013307 A1 | 8/2001 | Stone |
| 2001/0028308 A1 | 10/2001 | De La Huerga |
| 2002/0055419 A1 | 5/2002 | Hinnebusch |
| 2002/0062933 A1 | 5/2002 | Insalaco et al. |
| 2002/0069794 A1 | 6/2002 | Dame et al. |
| 2002/0145512 A1 | 10/2002 | Sleichter, III et al. |
| 2002/0153812 A1* | 10/2002 | Hellwig ................ A47B 21/00 312/223.6 |
| 2002/0189170 A1 | 12/2002 | Reuschel et al. |
| 2003/0005863 A1 | 1/2003 | Chen |
| 2003/0056817 A1 | 3/2003 | Miller et al. |
| 2003/0070595 A1 | 4/2003 | Crinion |
| 2003/0089283 A1 | 5/2003 | Okamoto et al. |
| 2003/0122459 A1 | 7/2003 | Huber et al. |
| 2003/0136313 A1 | 7/2003 | Griepentrog |
| 2003/0140985 A1 | 7/2003 | Wang |
| 2003/0182871 A1 | 10/2003 | Gersham et al. |
| 2003/0182885 A1 | 10/2003 | Gersham et al. |
| 2003/0213415 A1 | 11/2003 | Ross et al. |
| 2003/0222545 A1 | 12/2003 | Stravitz |
| 2004/0010328 A1 | 1/2004 | Carson et al. |
| 2004/0014014 A1 | 1/2004 | Hess |
| 2004/0052053 A1 | 3/2004 | Lee et al. |
| 2004/0060485 A1 | 4/2004 | Chang |
| 2004/0066626 A1 | 4/2004 | Lee et al. |
| 2004/0149177 A1 | 8/2004 | Gayhart et al. |
| 2004/0194669 A1 | 10/2004 | Forslund, III et al. |
| 2004/0229729 A1 | 11/2004 | Albert et al. |
| 2004/0231570 A1 | 11/2004 | Landa |
| 2004/0239161 A1 | 12/2004 | Lee |
| 2004/0239217 A1 | 12/2004 | Patel |
| 2004/0250480 A1 | 12/2004 | Matthai |
| 2004/0250739 A1 | 12/2004 | Yang |
| 2005/0028272 A1 | 2/2005 | Kanthasamy |
| 2005/0045073 A1 | 3/2005 | Wasley |
| 2005/0056308 A1 | 3/2005 | Birchenough |
| 2005/0058970 A1 | 3/2005 | Perlman et al. |
| 2005/0075213 A1 | 4/2005 | Arick |
| 2005/0113649 A1 | 5/2005 | Bergantino |
| 2005/0115178 A1 | 6/2005 | Schmidt |
| 2005/0126447 A1 | 6/2005 | Smith et al. |
| 2005/0165626 A1 | 7/2005 | Karpf |
| 2005/0172311 A1 | 8/2005 | Hjelt et al. |
| 2005/0182653 A1 | 8/2005 | Urban et al. |
| 2005/0202934 A1 | 9/2005 | Olrik et al. |
| 2005/0209051 A1 | 9/2005 | Santomassimo et al. |
| 2005/0263041 A1 | 12/2005 | Mueller et al. |
| 2005/0268823 A1 | 12/2005 | Bakker et al. |
| 2005/0280339 A1 | 12/2005 | Perkins et al. |
| 2005/0284341 A1 | 12/2005 | Klassy et al. |
| 2005/0288154 A1 | 12/2005 | Lee et al. |
| 2006/0010787 A1 | 1/2006 | Hand et al. |
| 2006/0042520 A1 | 3/2006 | Stevens et al. |
| 2006/0063980 A1 | 3/2006 | Hwang et al. |
| 2006/0080817 A1 | 4/2006 | Klinker |
| 2006/0081157 A1* | 4/2006 | Gayhart ................ A47B 21/06 108/50.02 |
| 2006/0089238 A1 | 4/2006 | Huang et al. |
| 2006/0096506 A1 | 5/2006 | Brauning et al. |
| 2006/0108299 A1 | 5/2006 | Menard |
| 2006/0162065 A1 | 7/2006 | Glattstein et al. |
| 2006/0162626 A1 | 7/2006 | Brauning et al. |
| 2006/0163003 A1 | 7/2006 | Wigstrom, Sr. |
| 2006/0179792 A1 | 8/2006 | Shaw et al. |
| 2006/0205564 A1 | 9/2006 | Peterson |
| 2006/0241520 A1 | 10/2006 | Robertson |
| 2006/0250524 A1 | 11/2006 | Roche |
| 2006/0266791 A1 | 11/2006 | Koch et al. |
| 2006/0266900 A1 | 11/2006 | May et al. |
| 2006/0278777 A1 | 12/2006 | Atkinson et al. |
| 2007/0017888 A1 | 1/2007 | Falvey et al. |
| 2007/0018486 A1 | 1/2007 | Ayers et al. |
| 2007/0018543 A1 | 1/2007 | Cribbs |
| 2007/0022918 A1* | 2/2007 | Sweet ................ A47B 21/06 108/50.02 |
| 2007/0039150 A1 | 2/2007 | Thomas et al. |
| 2007/0057000 A1 | 3/2007 | Webster |
| 2007/0062992 A1 | 3/2007 | Hepworth et al. |
| 2007/0074617 A1 | 4/2007 | Vergo |
| 2007/0095374 A1 | 5/2007 | Gendriesch et al. |
| 2007/0114350 A1 | 5/2007 | Sorci |
| 2007/0114892 A1 | 5/2007 | Boxenbaum et al. |
| 2007/0135264 A1 | 6/2007 | Rosenberg |
| 2007/0146116 A1 | 6/2007 | Kimbrell |
| 2007/0170823 A1 | 7/2007 | Stannis et al. |
| 2007/0179355 A1 | 8/2007 | Rosen |
| 2007/0200396 A1 | 8/2007 | Baumann et al. |
| 2007/0204537 A1 | 9/2007 | Bastian et al. |
| 2007/0219059 A1 | 9/2007 | Schwartz et al. |
| 2007/0221795 A1 | 9/2007 | Cutty |
| 2007/0251428 A1 | 11/2007 | Mead et al. |
| 2007/0265138 A1 | 11/2007 | Ashby |
| 2007/0277710 A1 | 12/2007 | Gray et al. |
| 2007/0277711 A1 | 12/2007 | Grant |
| 2007/0283631 A1 | 12/2007 | Grandin et al. |
| 2008/0010935 A1 | 1/2008 | Nagel et al. |
| 2008/0015088 A1 | 1/2008 | Del Monaco |
| 2008/0030317 A1 | 2/2008 | Bryant |
| 2008/0035031 A1 | 2/2008 | Yamanishi et al. |
| 2008/0041281 A1 | 2/2008 | Griepentrog |
| 2008/0045384 A1 | 2/2008 | Matsubara et al. |
| 2008/0050173 A1 | 2/2008 | Bruder et al. |
| 2008/0051256 A1 | 2/2008 | Ashby et al. |
| 2008/0053931 A1 | 3/2008 | Newbould et al. |
| 2008/0055055 A1 | 3/2008 | Powell et al. |
| 2008/0074014 A1 | 3/2008 | Ho |
| 2008/0077620 A1 | 3/2008 | Gilley et al. |
| 2008/0078310 A1 | 4/2008 | VanNimwegen et al. |
| 2008/0098525 A1 | 5/2008 | Doleschal et al. |
| 2008/0099279 A1 | 5/2008 | Griswold et al. |
| 2008/0132383 A1 | 6/2008 | Einav et al. |
| 2008/0149001 A1 | 6/2008 | Hodges et al. |
| 2008/0223658 A1 | 9/2008 | Michalec |
| 2008/0224580 A1 | 9/2008 | Gibbs et al. |
| 2008/0245279 A1 | 10/2008 | Pan |
| 2008/0255794 A1 | 10/2008 | Levine |
| 2008/0256445 A1 | 10/2008 | Olch et al. |
| 2008/0276841 A1 | 11/2008 | Brauning et al. |
| 2008/0289545 A1 | 11/2008 | Picchio |
| 2008/0290768 A1 | 11/2008 | Haberman |
| 2008/0295745 A1 | 12/2008 | Hamilton et al. |
| 2008/0296245 A1 | 12/2008 | Punzel et al. |
| 2008/0296457 A1 | 12/2008 | Hager et al. |
| 2008/0300110 A1 | 12/2008 | Smith et al. |
| 2008/0300914 A1 | 12/2008 | Karkanias et al. |
| 2008/0304365 A1 | 12/2008 | Jarvis et al. |

(56) References Cited

U.S. PATENT DOCUMENTS

| | | |
|---|---|---|
| 2008/0306351 A1 | 12/2008 | Izumi |
| 2009/0001859 A1 | 1/2009 | Compton et al. |
| 2009/0013908 A1 | 1/2009 | Grove et al. |
| 2009/0014401 A1 | 1/2009 | Tallman |
| 2009/0039685 A1 | 2/2009 | Zernov |
| 2009/0042428 A1 | 2/2009 | Henriott et al. |
| 2009/0044332 A1 | 2/2009 | Parsell et al. |
| 2009/0051254 A1 | 2/2009 | Grove |
| 2009/0076335 A1 | 3/2009 | Schwarzberg et al. |
| 2009/0078167 A1 | 3/2009 | Ellegaard |
| 2009/0132579 A1 | 5/2009 | Kwang |
| 2009/0133609 A1* | 5/2009 | Nethken ............... A47B 21/02 108/50.02 |
| 2009/0156363 A1 | 6/2009 | Guidi et al. |
| 2009/0165680 A1 | 7/2009 | Bakker et al. |
| 2009/0195393 A1 | 8/2009 | Tegeler |
| 2009/0212974 A1 | 8/2009 | Chiba et al. |
| 2009/0229475 A1 | 9/2009 | Bally et al. |
| 2009/0260547 A1 | 10/2009 | Epstein et al. |
| 2009/0270227 A1 | 10/2009 | Ashby et al. |
| 2009/0273260 A1 | 11/2009 | Kemp |
| 2009/0273441 A1 | 11/2009 | Mukherjee |
| 2009/0282663 A1 | 11/2009 | Martin et al. |
| 2009/0284111 A1 | 11/2009 | Hazzard et al. |
| 2009/0293391 A1 | 12/2009 | DeVore |
| 2009/0293402 A1 | 12/2009 | Hamilton et al. |
| 2009/0293773 A1* | 12/2009 | Miller ................... A47B 21/00 108/28 |
| 2009/0309464 A1 | 12/2009 | Schwartz |
| 2009/0314913 A1 | 12/2009 | Gillis |
| 2010/0000449 A1 | 1/2010 | Botkin |
| 2010/0045081 A1 | 2/2010 | Efthimiou |
| 2010/0049008 A1 | 2/2010 | Doherty et al. |
| 2010/0073162 A1 | 3/2010 | Johnson et al. |
| 2010/0073919 A1 | 3/2010 | Sharpe |
| 2010/0096349 A1 | 4/2010 | Schulman |
| 2010/0126394 A1 | 5/2010 | Burak et al. |
| 2010/0135502 A1 | 6/2010 | Keady et al. |
| 2010/0181030 A1 | 7/2010 | Smoyer et al. |
| 2010/0185398 A1 | 7/2010 | Berns et al. |
| 2010/0187785 A1 | 7/2010 | Knappe et al. |
| 2010/0198374 A1 | 8/2010 | Carson et al. |
| 2010/0201201 A1 | 8/2010 | Mobarhan et al. |
| 2010/0205542 A1 | 8/2010 | Walman |
| 2010/0212139 A1 | 8/2010 | Oddsen, Jr. et al. |
| 2010/0234184 A1 | 9/2010 | Le Page et al. |
| 2010/0270246 A1 | 10/2010 | Rodriguez |
| 2010/0323846 A1 | 12/2010 | Komatsu et al. |
| 2010/0326930 A1 | 12/2010 | Chiang |
| 2010/0327134 A1 | 12/2010 | Lundrigan et al. |
| 2011/0015041 A1 | 1/2011 | Shea |
| 2011/0015495 A1 | 1/2011 | Dothie et al. |
| 2011/0033830 A1 | 2/2011 | Cherian |
| 2011/0054359 A1 | 3/2011 | Sazonov et al. |
| 2011/0080290 A1 | 4/2011 | Baxi et al. |
| 2011/0104649 A1 | 5/2011 | Young et al. |
| 2011/0120351 A1 | 5/2011 | Shoenfeld |
| 2011/0168064 A1 | 7/2011 | Jahnsen et al. |
| 2011/0182438 A1 | 7/2011 | Koike et al. |
| 2011/0184748 A1 | 7/2011 | Fierro et al. |
| 2011/0245979 A1 | 10/2011 | Koch |
| 2011/0275939 A1 | 11/2011 | Walsh et al. |
| 2011/0281248 A1 | 11/2011 | Feenstra et al. |
| 2011/0281687 A1 | 11/2011 | Gilley et al. |
| 2011/0296306 A1 | 12/2011 | Oddsson et al. |
| 2011/0297051 A1 | 12/2011 | Martin et al. |
| 2011/0297053 A1 | 12/2011 | Martin et al. |
| 2012/0015779 A1 | 1/2012 | Powch et al. |
| 2012/0051579 A1 | 3/2012 | Cohen |
| 2012/0103726 A1 | 5/2012 | Morfidis et al. |
| 2012/0116550 A1 | 5/2012 | Hoffman et al. |
| 2012/0173319 A1 | 7/2012 | Ferrara |
| 2012/0298017 A1 | 11/2012 | Chen |
| 2012/0316661 A1 | 12/2012 | Rahman et al. |
| 2013/0002533 A1 | 1/2013 | Burroughs et al. |
| 2013/0012788 A1 | 1/2013 | Horseman |
| 2013/0086841 A1 | 4/2013 | Luper et al. |
| 2013/0116092 A1 | 5/2013 | Martinez et al. |
| 2013/0144470 A1 | 6/2013 | Ricci |
| 2013/0199419 A1 | 8/2013 | Hjelm |
| 2013/0199420 A1 | 8/2013 | Hjelm |
| 2013/0207889 A1 | 8/2013 | Chang et al. |
| 2013/0218309 A1 | 8/2013 | Napolitano |
| 2013/0307790 A1 | 11/2013 | Konttori et al. |
| 2013/0316316 A1 | 11/2013 | Flavell et al. |
| 2013/0331993 A1 | 12/2013 | Detsch et al. |
| 2014/0096706 A1 | 4/2014 | Labrosse et al. |
| 2014/0109802 A1 | 4/2014 | Dienes et al. |
| 2014/0137773 A1 | 5/2014 | Mandel et al. |
| 2014/0156645 A1 | 6/2014 | Brust et al. |
| 2014/0238277 A1 | 8/2014 | Fishman et al. |
| 2014/0245932 A1 | 9/2014 | McKenzie, III et al. |
| 2014/0249853 A1 | 9/2014 | Proud et al. |
| 2014/0270254 A1 | 9/2014 | Oishi et al. |
| 2014/0312754 A1 | 10/2014 | Hecht et al. |
| 2014/0360413 A1 | 12/2014 | Schenk et al. |
| 2015/0015399 A1 | 1/2015 | Gleckler et al. |
| 2015/0064671 A1 | 3/2015 | Murville et al. |
| 2015/0071453 A1 | 3/2015 | Po et al. |
| 2015/0142381 A1 | 5/2015 | Fitzsimmons et al. |
| 2015/0302150 A1 | 10/2015 | Mazar et al. |
| 2016/0051042 A1 | 2/2016 | Koch |
| 2016/0106205 A1 | 4/2016 | Hall et al. |
| 2016/0128467 A1 | 5/2016 | Sigal et al. |
| 2016/0213140 A1 | 7/2016 | Koch |
| 2016/0309889 A1 | 10/2016 | Lin et al. |
| 2017/0052517 A1 | 2/2017 | Tsai et al. |
| 2017/0135636 A1 | 5/2017 | Park et al. |
| 2019/0155253 A1 | 5/2019 | Labrosse et al. |

FOREIGN PATENT DOCUMENTS

| | | |
|---|---|---|
| CN | 2919992 Y | 7/2007 |
| CN | 101301147 A | 11/2008 |
| CN | 101420882 A | 4/2009 |
| CN | 202286910 U | 7/2012 |
| DE | 1764779 U | 4/1958 |
| DE | 8623882 U1 | 11/1986 |
| DE | 8707366 U1 | 7/1987 |
| DE | 3625137 C1 | 10/1987 |
| DE | 9412469 U1 | 10/1994 |
| DE | 19604329 A1 | 8/1997 |
| DE | 19733435 A1 | 2/1999 |
| DE | 19848392 C1 | 12/1999 |
| DE | 10260478 A1 | 7/2004 |
| DE | 202006016372 U1 | 11/2007 |
| DE | 102006038558 A1 | 4/2008 |
| DE | 102008044848 A1 | 3/2010 |
| DE | 202014005160 U1 | 7/2014 |
| EP | 0096272 A2 | 12/1983 |
| EP | 0145410 A2 | 6/1985 |
| EP | 0147902 A2 | 7/1985 |
| EP | 0164041 A2 | 12/1985 |
| EP | 0244582 A2 | 11/1987 |
| EP | 0447961 A2 | 9/1991 |
| EP | 0462920 A1 | 12/1991 |
| EP | 0594939 A1 | 5/1994 |
| EP | 0791311 A1 | 8/1997 |
| EP | 0815775 A2 | 1/1998 |
| EP | 0830825 A2 | 3/1998 |
| EP | 0903139 A1 | 3/1999 |
| EP | 0949394 A1 | 10/1999 |
| EP | 1159989 A1 | 12/2001 |
| EP | 1470766 A1 | 10/2004 |
| EP | 1647205 A1 | 4/2006 |
| FR | 1232788 A | 10/1960 |
| FR | 2636511 A1 | 3/1990 |
| FR | 2865486 A1 | 7/2005 |
| GB | 2048351 A | 12/1980 |
| GB | 2100121 A | 12/1982 |
| GB | 2246801 A | 2/1992 |
| GB | 2323781 A | 10/1998 |
| GB | 2424084 A | 9/2006 |
| JP | H11178798 A | 7/1999 |

(56) References Cited

FOREIGN PATENT DOCUMENTS

| | | | |
|---|---|---|---|
| JP | 2001289975 A | 10/2001 | |
| JP | 2002100889 A | 4/2002 | |
| JP | 2003111623 A | 4/2003 | |
| JP | 2004237398 A | 8/2004 | |
| JP | 2004275314 A | 10/2004 | |
| JP | 2004313251 A | 11/2004 | |
| JP | 2005087625 A | 4/2005 | |
| JP | 2005267491 A | 9/2005 | |
| JP | 2005287620 A | 10/2005 | |
| JP | 2008023195 A | 2/2008 | |
| JP | 2008142337 A | 6/2008 | |
| JP | 2008289634 A | 12/2008 | |
| JP | 2009082528 A | 4/2009 | |
| JP | 2009095360 A | 5/2009 | |
| SE | 516479 C2 | 1/2002 | |
| WO | 9609782 A1 | 4/1996 | |
| WO | 9713431 A1 | 4/1997 | |
| WO | 9719617 A2 | 6/1997 | |
| WO | 9801056 A1 | 1/1998 | |
| WO | 9807357 A1 | 2/1998 | |
| WO | 9902071 A1 | 1/1999 | |
| WO | 9960889 A2 | 12/1999 | |
| WO | 0219603 A2 | 3/2002 | |
| WO | 02062425 A1 | 8/2002 | |
| WO | 03047400 A2 | 6/2003 | |
| WO | 2004021830 A1 | 3/2004 | |
| WO | 2005032363 A1 | 4/2005 | |
| WO | 2005074754 A1 | 8/2005 | |
| WO | 2005093197 A1 | 10/2005 | |
| WO | 2005098159 A2 | 10/2005 | |
| WO | 2005120288 A1 | 12/2005 | |
| WO | 2006029895 A1 | 3/2006 | |
| WO | 2006042415 A1 | 4/2006 | |
| WO | 2006042420 A1 | 4/2006 | |
| WO | 2006065679 A2 | 6/2006 | |
| WO | 2007099206 A1 | 9/2007 | |
| WO | 2008008729 A2 | 1/2008 | |
| WO | 2008050590 A1 | 2/2008 | |
| WO | 2008041873 A2 | 4/2008 | |
| WO | 2008101085 A2 | 8/2008 | |
| WO | 2008150717 A2 | 12/2008 | |
| WO | 2009052656 A1 | 4/2009 | |
| WO | 2009154983 A2 | 12/2009 | |
| WO | 2010019644 A2 | 2/2010 | |
| WO | 2010023414 A1 | 3/2010 | |
| WO | 2011133628 A1 | 10/2011 | |
| WO | 2012061438 A2 | 5/2012 | |
| WO | 2012108938 A1 | 8/2012 | |
| WO | 2013033788 A1 | 3/2013 | |

OTHER PUBLICATIONS

PCT International Preliminary Report on Patentability, PCT/US2008/064457, Dec. 1, 2009.
PCT International Search Report and Written Opinion, PCT/US2011/038904, Nov. 23, 2011.
PCT International Search Report and Written Opinion, PCT/US2011/038899, Nov. 23, 2011.
PCT International Search Report and Written Opinion, PCT/US2011/038892, Nov. 24, 2011.
PCT International Search Report and Written Opinion, PCT/US2017/032700, Aug. 18, 2017.
The State Intellectual Property Office of the People's Republic of China, First Office Action and Search Report, Application No. 201180027125.8, Jul. 30, 2014, 16 pages.
The State Intellectual Property Office of the People's Republic of China, Second Office Action, Application No. 201180027125.8, May 6, 2015, 2014, 7 pages.
The State Intellectual Property Office of the People's Republic of China, Third Office Action, Application No. 201180027125.8, Sep. 28, 2015, 5 pages.
The State Intellectual Property Office of the People's Republic of China, First Office Action and Search Report, Application No. 201180026938.5, Jun. 20, 2014, 14 pages.
The State Intellectual Property Office of the People's Republic of China, Second Office Action, Application No. 201180026938.5, Jan. 29, 2015, 7 pages.
European Patent Office, Examination Report, Application No. 11725579.4, Oct. 9, 2013.
European Patent Office, Further Examination Report, Application No. 11725579.4, Mar. 17, 2014.
European Patent Office, Further Examination Report, Application No. 11725579.4, Feb. 5, 2015.
European Patent Office, Examination Report, Application No. 11726566.0, Sep. 24, 2013.
European Patent Office, Further Examination Report, Application No. 11726566.0, Mar. 31, 2014.
European Patent Office, Extended European Search Report, Application No. 14157546.4, May 15, 2014.
European Patent Office, Examination Report, Application No. 14157546.4, Feb. 26, 2015.
European Patent Office, Summons to Attend Oral Proceedings with Accompanying Communication, Application No. 14157546.4, Sep. 2, 2015.
European Patent Office, Extended European Search Report, Application No. 14162832.1, Apr. 24, 2014.
European Patent Office, Examination Report, Application No. 14162832.1, Apr. 23, 2015.
European Patent Office, Examination Report, Application No. 14162832.1, Nov. 25, 2015.
European Patent Office, Communication, Application No. 14162832.1, Apr. 13, 2016.
European Patent Office, Extended European Search Report, Application No. 14166432.6, May 26, 2014.
Unifor Misura St Catalog, 1986.
Unifor Luca Meda Catalog.
Unifor Pannelli PL Catalog.
Unifor Progetto 25.90 Catalog, 1991.
Canadian Intellectual Property Office, Office Action, Application No. 2,799,938, Mar. 20, 2017.
Canadian Intellectual Property Office, Office Action, Application No. 2,799,962, Mar. 24, 2017.
Canadian Intellectual Property Office, Office Action, Application No. 2,800,009, Mar. 24, 2017.
Canadian Intellectual Property Office, Office Action, Application No. 2,741,905, Apr. 5, 2017.
Canadian Intellectual Property Office, Office Action, Application No. 2,741,905, Nov. 23, 2017.
Canadian Intellectual Property Office, Office Action, Application No. 2,741,884, Apr. 6, 2017.
Canadian Intellectual Property Office, Office Action, Application No. 2,741,884, Nov. 22, 2017.
Anthro Corporation, Can Anthro "Walk the Talk"?: Employees Embark on a 30-Day Sit-Stand Challenge, Press Release Oct. 11, 2010, www.anthro.com/press-releases/2010/employees-embark-on-a-30-day-sit-stand-challenge, Copyright 2016, 4 pages.
Benallal, et al., A Simple Algorithm for Object Location from a Single Image Without Camera Calibration, In International Conference on Computational Science and Its Applications, pp. 99-104. Springer Berlin Heidelberg, 2003.
Bendixen, et al., Pattern of Ventilation in Young Adults, Journal of Applied Physiology, 1964, 19(2):195-198.
BrianLaF, ASP.NET 4.0 TimePicker User Control, www.codeproject.com/articles/329011/asp-net-timepicker-user-control, Feb. 25, 2012, 5 pages.
Ejaz, Time Picker Ajax Extender Control, www.codeproject.com/articles/213311/time-picker-ajax-extender-control, Jun. 22, 2011, 8 pages.
Heddings, Stop Hitting Snooze: Change the Default Reminder Time for Outlook Appointments, www.howtogeek.com/howto/microsoft-office/stop-hitting-snooze-change-the-default-reminder-time-for-outlook-appointments, Apr. 25, 2008, 2 pages.
Hopkins Medicine, Vital Signs (Body Temperature, Pulse Rate, Respiration Rate, Blood Pressure). Source: Johns Hopkins Medicine Health Library, 2016, pp. 1-4.

(56) References Cited

OTHER PUBLICATIONS

Kriebel, How to Create a Two-Panel col. Chart in Tableau (And Save Lots of Time Compared to Excel), www.vizwiz.com/2012/02/how-to-create-two-panel-column-chart-in.html, 2012, 14 pages.
Linak, Deskline Deskpower DB4/DL4 Systems User Manual, Copyright Linak 2007.
Linak, Deskline DL9/DB9/DL 11 System User Manual, Copyright Linak 2007.
Linak, Deskline Controls/Handsets User Manual, Copyright Linak 2017.
Linak, DPG Desk Panels—A New Way to Adjust Your Office Desk, Product News, May 19, 2017.
Microsoft, Automatically Adjust the Start and Finish Dates for New Projects, Applies To: Project 2007, Project Standard 2007, https://support.office.com/en-us/article/Automatically-adjust-the-start-and-finish-dates-for-new-projects-27c57cd1-44f3-4ea8-941a-dc5d56bdc540?ui=en-US&rs=en-us&ad=US&fromAR=1, Copyright 2017 Microsoft.
MREXCEL.COM, Forum: How to Calculate Percentage of Total Used Time, www.mrexcel.com/forum/excel-qestions/192521-how-calculate-percentage-total-used-time.html., Post Date: Mar. 20, 2006, 4 pages.
Office Details, Inc., Height-AdjusTable Worksurfaces User Instructions, Copyright 2004 Office Details, Inc.
Paolo, Arduino Forum, Measuring Point To Point Distances With Accelerometer, http://forum.arduino.cc/index.php?action=printpage;topic=49902.0;images, Post Date: Jan. 26, 2011, 5 pages.
Process Dash, Using the Task & Schedule Tool, www.processdash.com/static/help/Topics/Planning/UsingTaskSchedule.html, Mar. 4, 2011.
Steelcase, Inc., Airtouch Height-Adjustable Tables, Brochure, Copyright 2015 Steelcase Inc.
Steelcase, Inc., Migration Height-Adjustable Desk, Brochure, Copyright 2015 Steelcase Inc.
Steelcase, Inc., Ology Height-Adjustable Desk, Brochure, Copyright 2016 Steelcase Inc.
Steelcase, Inc., Series 5 Sit-To-Stand Height-Adjustable Tables, Brochure, Copyright 2015 Steelcase Inc.
Steelcase, Inc., Series 7 Enhanced Sit-To-Stand Height-Adjustable Tables, Brochure, Copyright 2015 Steelcase Inc.
Sun Microsystems, Lights Out Management Module, https://docs.oracle.com/cd/E19585-01/819-0445-10/lights_out.html, Copyright 2004, Sun Microsystems, Inc.
Wideman, Issues Regarding Total Time and Stage 1 Time, http://maxwideman.com/papers/resource/issues.html, 1994.

\* cited by examiner

ERGONOMIC SEATING SYSTEM, TILT-LOCK CONTROL AND REMOTE POWERING METHOD AND APPARATUS

CROSS-REFERENCE TO RELATED APPLICATIONS

This application is a continuation of U.S. patent application Ser. No. 16/810,353, filed on Mar. 5, 2020, and issued as U.S. Pat. No. 10,863,825 on Dec. 15, 2020, which is a continuation of U.S. patent application Ser. No. 16/507,704, filed on Jul. 10, 2019, and issued as U.S. Pat. No. 10,631,640 on Apr. 28, 2020, which is a continuation of U.S. patent application Ser. No. 16/115,008, filed on Aug. 28, 2018, and issued as U.S. Pat. No. 10,390,620 on Aug. 27, 2019, which is a continuation of U.S. patent application Ser. No. 15/689,849, filed on Aug. 29, 2017, and issued as U.S. Pat. No. 10,085,562 on Oct. 2, 2018, which claims priority to U.S. provisional patent application No. 62/409,041, filed Oct. 17, 2016, all of the contents of which are incorporated herein in their entirety by reference.

This application is also a continuation of U.S. patent application Ser. No. 16/167,234, filed on Oct. 22, 2018, and issued as U.S. Pat. No. 10,866,578 on Dec. 15, 2020, which is a continuation of U.S. patent application Ser. No. 15/430,336, filed on Feb. 10, 2017, and issued as U.S. Pat. No. 10,209,705 on Feb. 19, 2019, which is a continuation of U.S. patent application Ser. No. 15/285,939, filed on Oct. 5, 2016, and issued as U.S. Pat. No. 10,133,261 on Nov. 20, 2018, which is a continuation of U.S. patent application Ser. No. 14/035,974, filed on Sep. 25, 2013, and issued as U.S. Pat. No. 9,486,070 on Nov. 8, 2016, which claims priority to U.S. provisional patent application No. 61/795,222, filed Oct. 10, 2012, all of the contents of which are incorporated herein in their entirety by reference.

BACKGROUND OF THE DISCLOSURE

Field

The present disclosure relates generally to powered furniture. More particularly, the present disclosure relates to powered rolling chairs that include electrical components and systems for providing such onboard components with remote power. The present disclosure also generally relates to devices and systems for benefiting the health and efficiency of workers in a workplace, and more particularly, to height-adjustable support surfaces and other devices to encourage health-benefiting movement by the worker.
Chair Movement:

A common misunderstanding is that sitting upright and straight in an office chair is the right way to sit at all times. To the contrary, many ergonomics experts have said "your best position is your next position" indicating that alternating between sitting upright and reclining slightly and other positions is ideal. This is because staying fixed in any one position can cause fatigue, lead to slouching, discomfort or other negative consequences. Sitting in an upright posture for a long period with the person's thigh to trunk angle at or near 90 degrees can cause a person's pelvis to rotate backwards, which in turn, flattens the normal lumbar curve of the user's spine. Changing the curvature of the spine in this manner has been found to significantly increase the lumbar disc pressure by as much as 40% compared to the disc pressure when standing. This increase in disc pressure can cause fatigue and lower back pain, and even pinched nerves.

Lower back pain continues to be among the most common complaints for adults, and is one of the most common reasons given for doctor visits:

According to a University of Missouri-Columbia School of Health Professions report, there is an 80% lifetime prevalence of low back pain for adults. At any given time, 20-30% of people will have back pain, and back pain is usually recurrent and often progressive.

A spinehealth.com poll showed that 70% of all respondents report increased lower back pain after sitting at work (15% report no change and 15% report improved back pain—i.e., less).

There are important benefits to change position while seated. The simple act of moving allows the user's muscles to effectively help pump b!ood throughout the user's body. Also, movement of the user's spine (for instance when reclining) can nourish and support health of discs of the user's vertebrae, and body movement of a user's joints is generally positive for joints and ligaments. All of this can support comfort and a reduction in the likelihood or incidence of back pain.

In order to support users in changing positions regularly while seated, many current ergonomic chairs are designed with several different adjustments. However, once a chair is initially adjusted to fit a user, many users forget, or simply do not make use of the adjustment features for the purposes of changing the position during the day, due to lack of knowledge on how to make the adjustments, a lack of understanding of the benefits or due to being preoccupied with other priorities.

Interestingly, often seated people seek to achieve different posture variations without adjusting the chair which can also have negative consequences because the chair is not properly supporting their body as designed. A typical seated user may try to position him or herself to any of the following three distinct modes of sitting while performing work at a desk:

Forward sitting: leaning slightly forward in the chair, often used for performing work on the plane of a desk or for interacting with office equipment, Sitting upright: with the back supported by the back of the chair, which is a general purpose position accommodating most tasks Slightly reclined sitting: used for instance in conversation, telephoning, keyboarding, and mousing. Surveys indicate that it is a preferred work posture for many people; and Deeply reclined sitting: often used for resting, reading, and, in some cases, keyboarding.

Many ergonomic chairs require activation of levers and buttons to change most aspects of a seated position. Even reclining typically requires activation of a lever to release the recline-lock so that a user has solid back support when seated upright. The need for knowledge of how to adjust the chair and the requirement of the user's active management of the process all reduce the likelihood of a changes being made frequently.

U.S. Pat. No. 5,556,163 of Rogers, III, et al. discloses a chair that employs several actuators for selectively moving several different components, such as height, and recline, etc. The main intent of the powered drivers is to provide ease for the user to quickly make fine adjustment to his or her chair. This reference does further mention that the actuators may be automatically driven either randomly or following a schedule to make minor movements to each component to avoid user fatigue.

Although the chair disclosed by U.S. Pat. No. 5,556,163 does introduce automatically moving the different components of a chair to avoid fatigue, the movements are only meant to be minor and such movements would not be sufficient to prevent back strain that stems from elevated pressure on the user's spine nor correct a flattened lumbar curve.

U.S. Pat. No. 7,896,436 of Kurrasch et al. discloses a chair that includes powered actuators and sensors to automatically sense the weight of a user and to use this information to adjust the chair components for the best fit. This chair also includes provisions for recognizing different users and automatically adjusting the different settings based on the identity of a seated user.

Although the chair of Kurrasch et al. does utilize powered actuators to move various chair components, it moves the components based on the user's weight for comfort and correct fit and does not automatically move the components for the purpose of alleviating spinal pressure and correcting a flattened lumbar curve to mitigate back strain and associated pain.

Reclining Seating Movement:

Generally, conventional adjustable seating includes a seat and a pivotally attached backrest which can be reclined, as desired. The recline feature is usually spring-biased up to a hard stop so that when selected, the user may lean back against the backrest and gently recline, continuously supported by the spring-bias, up to the hard stop. How far back the backrest reclines (i.e., the angular location of the hard stop) is usually adjustable from a vertical position (or approximately vertical), where the user does not want the backrest to recline at all and prefers to have full support when he or she leans back (sitting up straight). At which recline angle the hard stop occurs is sometimes adjustable by the user, to different degrees of recline (usually maxing out at around 40 degrees from the vertical).

A problem with the recline feature is that many people don't end up using it. They want to be able to lean back and remain solidly upright. To this end, applicants have found that many users prefer to just lock off the recline feature, leaving the backrest effectively fixed in the full upright position. This is problematic because many ergonomics experts have said that one's "best position is his/her next position" indicating that alternating between sitting upright and reclining slightly and other positions is ideal. This is because staying fixed in any one position can cause fatigue, lead to slouching, discomfort or other negative consequences. Sitting in an upright posture for a long period with the person's thigh to trunk angle at or near 90 degrees can cause a person's pelvis to rotate backwards, which in turn, flattens the normal lumbar curve of the user's spine. Changing the curvature of the spine in this manner has been indicated to significantly increase the lumbar disc pressure by as much as 40% compared to the disc pressure when standing. This increase in disc pressure can cause fatigue and lower back pain, and even pinched nerves.

Lower back pain continues to be among the most common complaints for adults, and is one of the most common reasons given for doctor visits:

a. According to a University of Missouri-Columbia School of Health Professions report, there is an 80% lifetime prevalence of low back pain for adults. At any given time, 20-30% of people will have back pain, and back pain is usually recurrent and often progressive.

b. A spinehealth.com poll showed that 70% of all respondents report increased lower back pain after sitting at work (15% report no change and 15<}{, report improved back pain—i.e., less).

There are important benefits to changing position while seated. The simple act of moving can allow the user's muscles to effectively help pump blood throughout the user's body. Also, movement of the user's spine (for instance when reclining) can nourish and support health of discs of the user's vertebrae, and body movement of a user's joints is generally positive for joints and ligaments. All of this can support comfort and a reduction in the likelihood or incidence of back pain.

In order to support users in changing positions regularly while seated, many current ergonomic seating structures of the type used in an office environment are designed with several different adjustments and features. However, once a seating structure is initially adjusted, many users forget, or simply do not make use of the adjustment features for the purposes of changing the position during the day, due to lack of knowledge on how to make the adjustments, a lack of understanding of the benefits or due to being preoccupied with other priorities.

Removable Feature-Module:

Conventional adjustable seating structures usually include many features and are quite expensive. Some of these seating structures may be somewhat customizable, allowing the customer certain choices when ordering, such as fabric type and color, adjustable hand rests, adjustable recline. The Aeron® chair by Herman Miller of Zeeland, MI includes a lumbar support insert which is designed to provide two levels of firmness and support, depending on the orientation it is secured to the rear of the backrest.

Applicants have recognized a need to easily provide additional features to an adjustable seating structure, even as an after-market item.

Sit-Stand Desk with Remote Height Management:

Sit stand desks are getting more and more popular. Large companies are recognizing the health benefits and associated health-related cost savings in encouraging their employees to follow healthy lifestyles, including the use of sit/stand desks while at work.

Although it has been proven that use of such sit/stand desks are beneficial to one's health, it is not uncommon for the average user to use the standing feature of these height-adjustable desks less over time. In some cases, the user never uses the standing feature. This can be attributed to various reasons including that some users never knew the desk could move up and down and just use it as a sit-only desk and that some users are not being reminded to stand, forget to stand, or just do not break the habit of sitting. Most sit/stand desks are considered "non-intelligent" in that they are just mechanical structures that include a worktop that can be raised or lowered as desired by its user. In such desks, there is no intelligent system tracking when and tor how long the worktop is positioned at a sitting height or a standing height and therefore health status and benefits cannot be meaningfully tracked. Some new versions of sit/stand desks are classified as "smart" desks because they do keep track of exact height usage, facilitate, motivate and remind users to change positions and some even make the height changes automatically to follow a health-schedule customized tor each user. One such desk is sold by a company called Stirworks, located in Pasadena, CA 91103. However, even with smart sit/stand desks, some users do not respond to the software effectively losing the associated health benefits, or respond less frequently over time.

System for Charging Seat Structures:

There has been a strong effort in the furniture industry to provide electrically powered accessories to rolling-type office chairs. Lights, buzzers, vibration, heaters, etc. have been suggested and in some cases, developed to a commercial product. A common problem shared by all of these developments is how to provide power to a mobile chair.

It is well known that the human body is designed to move and that we do benefit from regular and frequent motion throughout all our activities during each day. The efficiency and health of our circulatory system and our digestive system relies on almost constant movement throughout the day and night—even during our sleep. If a person sits in a chair at a desk for prolonged periods of time without stretching or standing his head will tend to lean forward naturally to try to maintain core balance, which will cause a muscle tone imbalance between the front and rear sides of the body. This results in a high risk of an increase of spinal shrinkage and an increase of intra-disc pressure within the user's spine. This can lead to muscle strain, muscle compression, nerve compression, tendon injury and ligament sprain at the shoulder, the neck, the upper limbs, and the back. This can further result in general musculoskeletal discomfort in the short term and more chronic upper and lower back pain and nerve-damage symptoms in the shoulder, the neck, arms and throughout the back (called: "repetitive strain injury") in the long term. Other health problems linked to a person regularly sitting for long periods of time include the blocking of the returning flow of venous blood causing blood to accumulate in the legs, in particular in the calves and ankles. Continued strain to such blood vessels will often lead to food edema, muscular discomfort in the legs, and varicosity.

Regardless of the specific injury that may result from sitting for extended periods of time, there is general consensus among physicians and ergonomists that there are clear health benefits to a person who breaks up their day with both periods of standing and periods of sitting at regular intervals.

For over two decades, a number of studies support this. For example, a study by Paul and Helander (1995) found office workers with sedentary jobs showing significantly more spinal shrinkage throughout the day compared to those with less sedentary jobs. They also compared spinal shrinkage with office workers who stood in thirty minute sessions with those who stood for fifteen minute periods. When the spine of each of these test subject workers was measured there was considerably less shrinkage in those who stood for thirty minute intervals. Also, workers in the test that had spinal disorders prior to the test showed a greater variability in the shrinkage pattern.

Another study by Winkle and Oxenburgh (1990) determined the benefits of providing active breaks (standing/moving) versus passive rest breaks (sitting) from the point of view of maintaining the health of muscles and the health of the spine. They found that alternating between sitting and standing was the most effective way to maintain a productive workflow and a healthy spine. The posterior wall of the inter-vertebral disc sustains cumulative degenerative changes when exposed to prolonged periods of high intra-disc pressure associated with flexed or semi-flexed seated postures. In other words, if you sit for long periods of time, you will be more likely to impart stress on your spine and, as a result, be uncomfortable. If you sit and then stand at regular intervals, you will not impart as much stress on your spine.

Nerhood and Thomson (1994) studied the introduction of sit-stand workstations at United Parcel Service (UPS). Results showed workers averaged 3.6 adjustments to standing position per day and spent an average 23% of the time per day in a standing position. They found body discomfort decreased by an average of 62% and the occurrence of injuries and illnesses decreased by more than half.

Unfortunately for their health, a typical office worker is forced to spend most of their day working in an environment that demands very little body movement. Sitting in a chair at a desk for hours at a time is not uncommon here and quite often the only movement such a worker will experience while at work will stem from the rapid, albeit slight movement of their fingers, hands and wrists as they operate their computers and phones while "comfortably" seated. A typical worker will not only sit most of their day while at work, but also will sit during their commute between work and home and also when eating their lunch. This may lead to them being in a seated position for upwards to 9-11 hours each day, and often for long uninterrupted periods of time.

This health concern was addressed decades ago with the introduction of a so-called "Sit-Stand" desk—an electrically-powered desk whose working surface can be power-raised and lowered as desired by the user. Unfortunately, these early electric sit-stand desks were cost prohibitive and not sufficiently commercially attractive for most companies to adopt. Eventually however, these powered desks did find their way into the workplace in limited quantities to a select few companies, such as high-end design firms and law firms.

A major problem with the early sit-stand desks and even those currently available today is that they lack intelligence. Yes, they can move up and down and up again, but only when commanded to do so by the user. Human nature prevails rather quickly and soon after the initial novelty and fun wears off of having such a "cool" desk, the user either forgets to raise or lower their desk at regular intervals throughout the day or simply loses interest, typically ending up sitting the whole day, once again. Therefore in short time, the very expensive high-tech sit-stand desk becomes just a sit-desk, and apart from the cost, essentially no different from the very desks it just replaced.

This problem was addressed to some degree in US Patent Publication No.: 2008/0245279 of Chun Ming Pan, published Oct. 9, 2008, now abandoned and also U.S. Pat. No. 5,323,695 of Borgman et al. Both of these patent references disclose height-adjustable workstations (so-called "sit-stand desks") that have a working platform (a top) that can be selectively raised and lowered as desired by the user in a manual mode, and also raised and lowered automatically at predetermined intervals. The devices disclosed in these references do allow for a reminder to the user to sit and stand regularly, but the devices are still considered basic in operation and lack intelligent operational software Like prior art height-adjustable workstations, these workstations do not "read" biometrics of the user or take into account other environment conditions that can provide specific and meaningful data. Such data would enable the up-down schedule of the height-adjustable workstation to adapt to the user, both throughout the day and over time.

Applicants of the present application understand that the user's fitness and habits will invariably change over time. Furthermore, Applicants of the present application have recognized a need for a "smart" height-adjustable workstation that responds to user-changes and other conditions and parameters by adapting or modifying its operation accordingly.

SUMMARY OF THE DISCLOSURE

It is therefore a primary object of the present disclosure to overcome the deficiencies of the prior art.

It is another object of the disclosure to provide a chair that allows the user to quickly and easily reposition.

It is another object of the disclosure to provide a chair that reminds the user to reposition while seated in the chair.

It is another object of the disclosure to provide a powered chair that automatically repositions components of the chair to alleviate spinal pressure and correct a flattened lumbar curve at prescribed times to mitigate back strain and associated pain.

Some aspects of the present disclosure also relate generally to powered furniture. More particularly, the present disclosure relates to powered adjustable seating that includes moveable components.

It is therefore a primary object of the present disclosure to overcome the deficiencies of the prior art.

It is another object of the disclosure to provide a seating structure that allows the user to quickly and easily reposition.

It is another object of the disclosure to provide a seating structure that reminds the user to reposition while seated in the seating structure.

It is another object of the disclosure to provide a powered seating structure that automatically repositions components of the seating structure to alleviate spinal pressure and correct a flattened lumbar curve at prescribed times to mitigate back strain and associated pain.

It is therefore a primary object of the present disclosure to overcome the deficiencies of the prior art.

Some aspects of the present disclosure further relate generally to improvements to powered furniture. More particularly, the present disclosure relates to powered adjustable seating and powered height-adjustable sit-stand desks.

It is therefore a first object of this disclosure to overcome the deficiencies of the prior art.

It is a second object of the disclosure to provide a means to help encourage continued use of a sit/stand desk.

1) Batteries:

Batteries can, in most cases, be used to power such features of a chair, but of course these batteries eventually need to be replaced or recharged. Regularly changing batteries would usually be considered impractical and a burden, especially in a large company with many desks and chairs. Such regular maintenance requirements would likely result in the powered features to be eventually ignored and unused.

Alternatively, a chair requiring power could be tethered with a power cord to continuously provide the required power, but such a cord would likely become entangled and damaged during normal use of the chair, or look unsightly. Similar to changing batteries, plugging in a power cord each night would usually be considered a burden and impractical.

2) Generators and Solar Panels:

Another method to bring power to a mobile powered chair is to use the movement of the chair itself to generate power. U.S. Pat. No. 8,016,351 discloses such as system wherein electric generators are mechanically connected to at least one of the several caster wheels.

In use, as the user moves the chair on the floor, the rotating casters will in turn rotate the generators, which will generate power to charge onboard batteries. Unfortunately, a typical user seated in a chair does not roll the chair around enough during normal use to generate sufficient power to be effective or practical. Also, reverse EMF created in a generator generating power would create noticeable breaking torque making it very difficult and awkward for the user to move the chair around. The U.S. Pat. No. 8,016,351 patent also suggests using a solar panel on the back of the chair to help charge onboard batteries. This may help provide some or all required power for the chair, but such panels are expensive, fragile and require strong direct or ambient light to work effectively and generally are less efficient in environments that use low-power fluorescent lighting or indirect lighting (reflected light).

US Patent Publication No. 2013/0106155 discloses a chair having a seating structure that is supported by a central vertically disposed piston. The seating structure is designed to vertically displace in response to a seated person's weight, leveraging the up and down linear movement to generate electricity. It is also known to convert other chair-movements by a seated user into electricity, such as the reclining movement. This generated power is then used to power onboard electronics and/or batteries. Such methods often do not deliver enough power to consistently power desired functions.

3) Wireless Charging:

Power can also be transmitted wirelessly. Wireless technologies are those in which energy is transferred between components without wired connections such as sockets and plugs.

These wireless technologies generally include radio frequency (RF) transfer, induction, conduction and acoustic energy transmission technology. Exemplary wireless energy sources are disclosed in U.S. Pat. Publ. Nos. 2007/0182367, 2009/0072782, 2008/0246215, 2007/0194526, and 2004/0195767, which are incorporated herein by reference. In RF transfer technology, a source circuit generates an RF signal which is received by a second circuit. Energy is absorbed from the signal by the second circuit. RF energy can be transferred over a distance of several feet although the RF signal degrades rapidly as the distance from the source increases. Acoustic energy is similar to RF energy in that energy propagates multi-directionally.

In induction technology, a source, or primary, coil generates a magnetic field which induces current in a second, or secondary, coil. The area in which inductive energy may be received, referred to as a "hot-spot," is fairly localized adjacent the primary coil. Typically, in the embodiments disclosed herein, the primary coil will be integrated into an article of furniture, such as a desk, or a floor mat. A wireless device including the secondary coil may receive power from the primary coil by induction of electrical current in the secondary coil when the secondary coil is brought into proximity with the primary coil. The current generated in the secondary coil may be used to power the electronic device, or charge batteries in the electronic device. A controller produces a signal to power the primary coil at a modulated frequency. Information may be transferred by the signal to the secondary coil and then extracted by the electronic device being charged. The electronic device may include passive circuits and/or wireless communication circuits to transmit information back to the controller, thus establishing a "hand-shake" connection, which the controller may use to modulate the signal.

The use of induction technology is indeed promising, but a common problem with this otherwise elegant system is that the secondary coil must be accurately aligned over the primary coil for the system to be effective and the two coils must be positioned immediately adjacent to each other for effective power transmission to occur. This would require the office worker to carefully roll their office chair to a specific spot on their chair-mat each night before leaving so that the two coils align. It is not likely that a typical office worker would perform this task each day with any confidence or accuracy, especially when they are tired and must hurry to catch their train home. If the chair is not regularly charged, the onboard batteries will quickly lose their charge and the electrically powered features of the chair will cease to operate. If this happens, the user will quickly become frustrated and would likely lose interest in using the otherwise beneficial features of the chair.

4) Conductive Systems:

In conduction technology, an electrically conductive contact pad is mounted at a stationary location and another is secured to the mobile chair. The two contact pads are arranged so that they can be selectively aligned during a charging event. In such instance, the two contact pads are positioned so that they make contact and so that power can be transferred across the connection. The contact pads are typically flat elongate rectangular-shaped plates positioned in parallel. The polarity of each pad may be selected by controlling circuitry based in part on feedback from the contacts. Such controlling circuitry typically includes voltage and current regulators and features designed to protect the electronic devices and the controllers.

It is therefore a primary object of the present disclosure to overcome the deficiencies of the prior art.

It is another object of the disclosure to provide a system that effectively and efficiently provides power to a rolling-type chair without compromising the free-movement and function of the chair.

It is another object of the disclosure to provide a useful, affordable power-assisted sit-stand desk that encourages and motivates regular use.

It is another object of the disclosure to provide such a power-assisted sit-stand desk that is able to measure or otherwise detect select biometrics of the user to help control current and future operation and functions.

It is another object of the disclosure to provide such a power-assisted sit-stand desk that senses and collects user data over time and communicates the same to a local display and to a second location for secondary use.

It is another object of the disclosure to provide such a power-assisted sit-stand desk that controls its operation in response to the detection of a user's presence.

It is another object of the disclosure to provide such a power-assisted sit-stand desk that controls operation in response to detection of sound within the immediate area of the desk.

It is another object of the disclosure to provide such a power-assisted sit-stand desk that allows height control in response to a single touch command by the user.

A sit/stand workstation includes a worktop that has a powered drive and is moveable between a sitting height and a standing height. An electronic controller offers a user different operating modes, each with varying levels of automation. In one such mode, the user inputs a value that represents a desired percentage of standing time over a given period of time. The controller then uses user-profile information and the inputted value to create an initial custom height-adjustment schedule for the user. During use, the controller moves the worktop up and down following the schedule and uses sensors, such as a pressure mat, to detect how well the user follows the schedule and biometric indicators that convey fatigue and also energy. In response to this monitored user-information, the controller changes time, duration, and/or frequency of the schedule to better meet the abilities and fitness of the user and also to help encourage the user to continue regular use. Sounds, voice, lights, colors, and numerical information, as well as displacement of the worktop are used to help encourage the user.

The features of this disclosure, and the manner of attaining them, will become more apparent and the disclosure itself will be better understood by reference to the following description of the disclosed embodiments taken in conjunction with the accompanying drawings.

BRIEF DESCRIPTION OF THE SEVERAL VIEWS OF THE DRAWINGS

The disclosure can be more fully understood from the following detailed description taken in conjunction with the accompanying drawings, in which.

DETAILED DESCRIPTION OF THE DISCLOSURE

Figure 1:
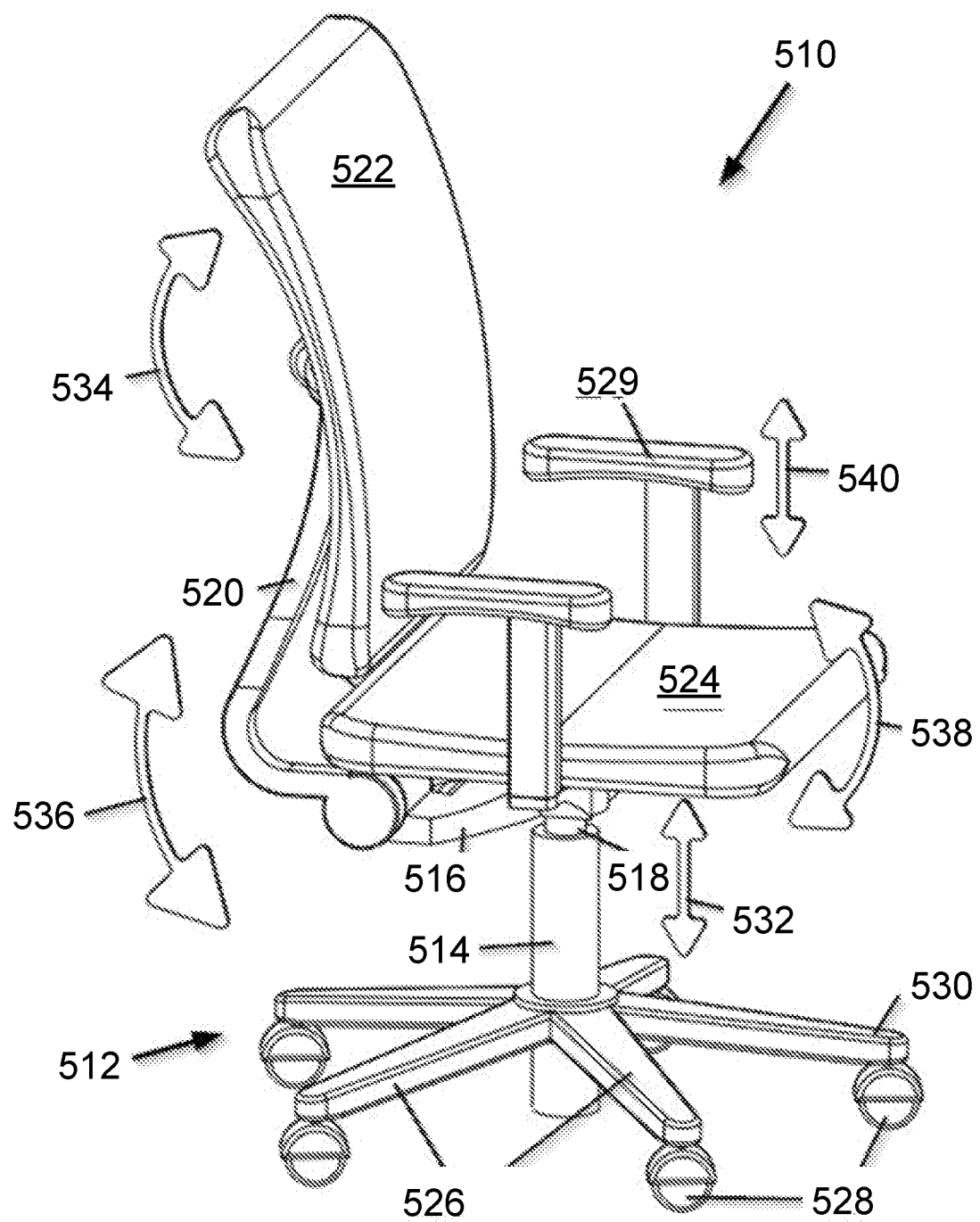
FIG. 1 is a front perspective view of an exemplary ergonomic chair, showing various components and movement arrows, in accordance with the present disclosure.

The various aspects of the subject disclosure are now described with reference to the drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

In the following detailed description, reference is made to the accompanying drawings which form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular method, device, or system, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Chair Movement:

By way of overview, applicants have realized that it is desirable for an office chair to allow its user freedom of movement with little to no effort, while providing the user required support for health and, of course sufficient comfort to encourage continued use. There are several embodiments to this disclosure that improve upon the prior art and offer unique features to the rolling-type office chair.

The embodiments detailed below are preferably directed to ergonomic type chairs, typically used in offices and usually including wheels. Applicants have determined from research that a seated user should move regularly while seated to encourage a healthy disposition. As part of these regular movements, the user should:

a) Reduce lumbar strain by reclining in the chair;
b) Sitting upright with lowered thighs (provided by tilting the front edge of the seat down);
c) Sitting upright with raised thighs; and
d) Standing at their desk.

The user should ideally cycle through the above positions every 20 to 30 minutes to assist in preventing lower back pain and encourage a healthier disposition. When the user reclines, the spine is allowed to more easily return to a more normal curvature. This reduces or removes pressure on the discs of the user's vertebrae, which greatly reduces the chance of lower back pain. Of course, the user may not be able to as effectively work while fully reclined so other positions are necessary. Sitting upright with lowered thighs also increases the thigh-to-torso angle, which again helps the spine more easily attain a more normal curvature, which like reclining reduces disc pressure, but not as much as when fully reclined. Sitting upright with raised thighs may provide the most upright support for the user to work at a desk, but this position should not be used exclusively due to higher strain on discs. Finally, standing at regular and controlled intervals improves one's health.

Referring to FIG. 1, and according to a first embodiment of the present disclosure, a chair 510 is provided having a dolly structure 512, from which a post 514 upwardly extends. A yoke assembly 516 includes a vertically disposed piston 518 which is slidably secured to post 514, as understood by those of skill in the art. A back support assembly 520 is pivotally secured to a portion of yoke assembly 516. A back cushion 522 is pivotally secured to a portion of back support assembly 520. A seat cushion 524 is pivotally secured to a portion of yoke assembly 516. As is well known by those skilled in the art, dolly structure 512 includes 5 radially disposed legs 526, each having a caster wheel 528 pivotally attached to a remote end 530. A left and right side armrest 529 are mounted to yoke assembly 516 by a telescoping connection and are selectively vertically displaceable.

According to the disclosure, post 514 is slidably vertically displaceable (as shown by arrow 532 in FIG. 1) between a predetermined low position and a predetermined high position and is used as in conventional ergonomic chairs to raise and lower seat cushion 524 and all other connected parts, as desired by the user. According to the disclosure, post 514 is selectively movable to any point between low and high position using an electrically powered drive, such as an appropriate high-torque motor (not shown) or a magnetic linear drive, a digital high-torque stepper motor, and any required gearing or torque multiplier, as required to provide sufficient force to raise and lower the expected load safely and efficiently.

Figure 2:
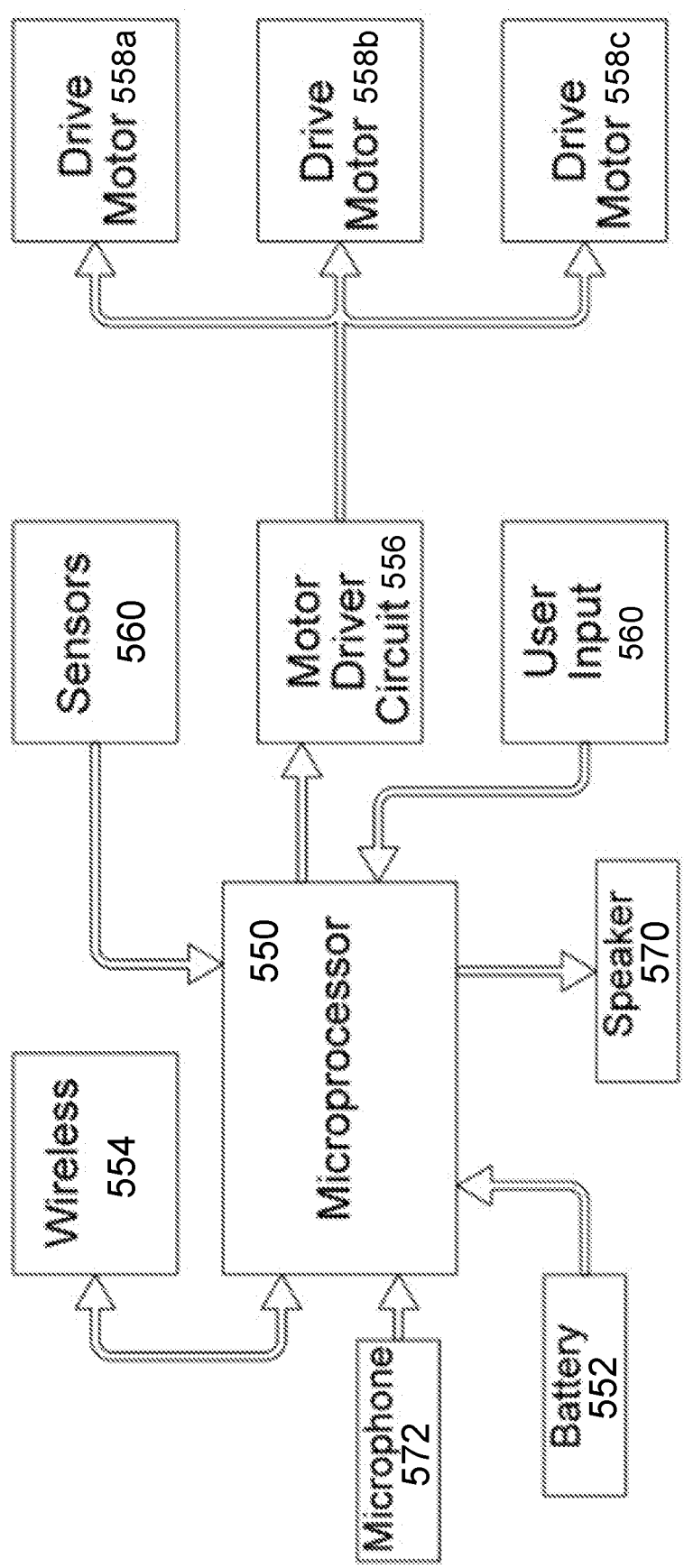
FIG. 2 is an operational schematic of the control system of the chair of FIG. 1, in accordance with the present disclosure.
Figure 3:
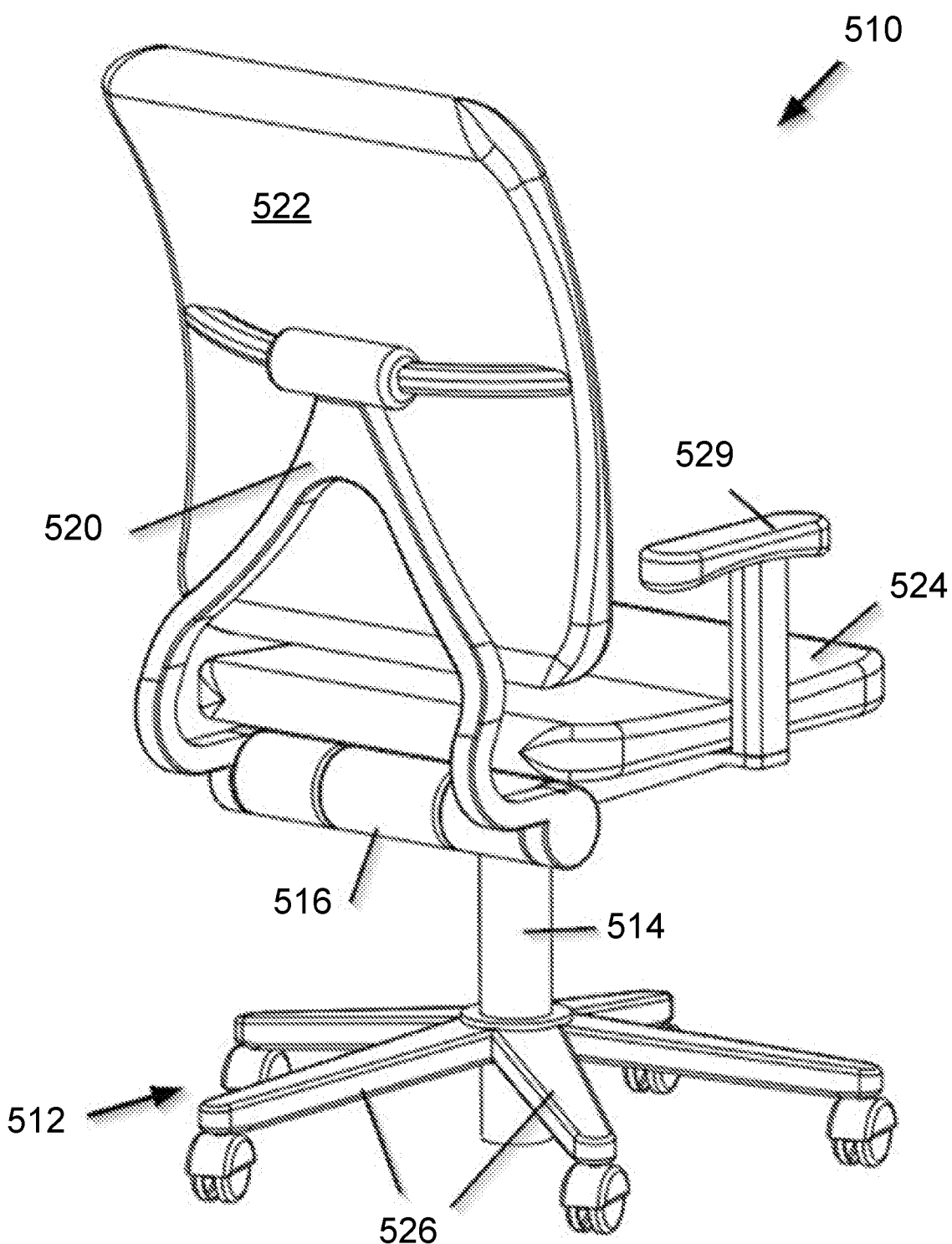
FIG. 3 is a rear perspective view of the exemplary ergonomic chair, showing various components and movement arrows, in accordance with the present disclosure.

An important aspect of this disclosure is that electrically powered motor drives, not shown in FIG. 1, but referred to in FIG. 2 as "558a, 558b, 558c, such as high-torque motors, servo motors with optical encoder feedback, electromagnetic linear drives, screw jack actuators or rotary actuators with hall sensor position feedback, a digital high-torque stepper motor or other such devices are used to selectively power all linear, tilting, and pivotal movements used throughout chair 510, including pivotal movement of back support assembly 520, indicated in FIG. 1 by arrow 534, pivotal movement of back cushion 522, indicated by arrow 536 in FIG. 1, tilting of lower seat cushion 524, indicated in FIG. 1 by arrow 538, lumbar support movement of back cushion 522, not shown by an arrow, and vertical displacement of either left or right side armrest 529, indicated by a single arrow 540, in FIG. 1.

Referring to FIG. 2, a schematic shows controller components used in accordance with the present disclosure, including a microprocessor 550, a battery 552, wireless communication 554, a motor driver circuit 556, drive motors 558a, 558b, 558c sensors 560 and user input 562. Microprocessor 550 is electrically connected to wireless communication 554, motor drive circuit 556, sensors 560 and user input 562. Battery 552 is shown connected to microprocessor 550 in FIG. 2 to provide power to that component, but it should be understood that battery 552 is effectively electrically connected to and powers all components, as necessary, and as understood by those skilled in the art.

Wireless communication 554 may be any type, such as Wi-Fi_____33, or Bluetooth® and is used to communicate information between chair 510 and a remote location. According to one aspect of this embodiment of the disclosure, chair position type and duration information (called "use-information") over a period of time can be collected, stored in onboard memory (not shown) and transmitted (following a schedule) to a remote location for review and storage. This use information will help determine how well the user is using his or her chair, establishing a "use-history profile." This information could be used, for example to ensure that the user is following a position-variation schedule with the highest health benefits and comfort. If not, a particular user could be sent encouragements, reminders, and instructions regarding how to properly set up and operate their chair. Wireless communication 554 can also be used to connect (or pair) to other smart devices, such as a smart phone, or an adjacent sit/stand desk, such as the one sold by a company called Stirworks Inc, located in Pasadena, CA 915103. In doing so, the sit/stand desk controller could merge the sit-position variation schedule with the sit/stand desk position schedule. Currently, sit/stand desks, if they are "smart," do not know what the user is doing once they are in the sit mode. By linking the control system of the chair, according to this disclosure, to the control system of a smart desk, such as the Stir Kinetic Desk, a much larger picture of the posture and health habits of each user at a workplace may be realized and used to benefit both the user and the company. Applicants' herein incorporate by reference patent application, publication number: US20140096706 A1, published Apr. 10, 2014 with a priority filing of Oct. 10, 2010, entitled: "Height-Adjustable Support Surface and System for Encouraging Human Movement and Promoting Wellness" discloses such a smart sit/stand desk. The content of this publication is incorporated by reference in its entirety as if the entire patent publication content were reprinted in this current application.

As explained in greater detail below, microprocessor 550 controls motor driver circuit 556, which in turn controls the operation of any of several motors 558a, b, c, as required by either a preset position variation schedule, stored in on-board memory (not shown), or as instructed by user input controls 562 (buttons pressed by a user)—manual control mode.

According to this embodiment of the disclosure, sensors 560 are used to communicate accurate motor drive positional information to microprocessor 550. For example, should a drive motor 558a, b, c be activated to vertically displace armrests 529 from a first height to a desired second height, sensors 560 would "read" exact position information and would send a signal to microprocessor 550 when motor drive 558a, b, c reaches the desired height, in this example. Of course, a variety of different types of sensors could be used to provide such accurate positional information, a preferred type would be the use of actuator/motors with Hall Effect sensor, whose operation is well known by those skilled in the art and therefore not explained in any great detail here. Briefly, as the motor rotates, magnets mounted asymmetrically pass by a sensor and the incremental change in magnetic field is detected and occurrences counted. This information is then used to very accurately control the displacement of any component (such as an armrest 529) attached to the drive mechanism. Also, sensor 560 could include a safety shutoff that indicates that the mechanical movement has physically reached the end of its travel and any further movement could cause damage. Sensor 560 could also include switches and sensors that detect user presence on the chair and its components, such as a strategically positioned pressure switches could be used to detect not only that a user is simply sitting on seat cushion 524, but how the person is actually sitting. For example, sensor information could learn that the user is seated on seat cushion 524 and leaning forward since a sensor located in the front of the seat is reading a high-than normal pressure reading and that the back cushion 522 is not reading any pressure. The microprocessor 550 could compare the incoming sensor readings with known (and stored in memory, not shown) pressure ranges to determine how a particular "sensor signature" conveys a particular seated position. Alternatively, microprocessor 550 could learn "normal" positional information by reading sensor information as the user is instructed to sit in chair 510 as microprocessor 550 instructs motors 558 to cause the different displaceable components of chair 510 to change positions, which in turn would cause the seated user to follow the different seated positions (lean forward without touching the backrest, sit back and upright, sit back with a slight recline, then more recline until full recline is reached, and then stand up from the chair without using the armrests for support and then stand up using the armrests for support. During this initial set up procedure, sensors 560 would be carefully measuring pressure and microprocessor 550 would be recording the incoming pressure information at the different pressure sensors throughout the chair for each chair component position, as conveyed by the different motors.

According to another feature of the present disclosure, as shown in FIG. 2, microphone 572 and speaker 570 are electrically connected to microprocessor 550 in a manner that is well known by those skilled in the art. Microphone 572 can be used to pick up audible commands by the user or to pick up useful sounds in the environment, such as an audible control sound that allows chair 510 to be controlled remotely, using sounds at set frequencies. For example, microphone 572 could "hear" and discern the unique sound of a person typing and microprocessor 550 could use this information to hold off a scheduled reclining event until the user finishes typing (since the user may not be able or want to type while reclined).

The above feature of using pressure sensors 560 to establish a pressure-signature for the user at different chair orientations may function with or without the use of motors 558a, 558b, 558c. If motors are not used, the movable components of a chair would move similar to how these components move in conventional adjustable chairs. Such "manual" movements are made by the user activating levers to release mechanical locks and relying on the user's weight to force movement of a component against the action of a return spring. For example, should a user lean back in a chair, pressure sensors 560 would sense this (through a measured increase in pressure or force) and pressure sensors 560 could record these pressure or force readings when the user is at the reclined position.

It should be noted that pressure sensor is a term that includes any of a variety of sensors that measure applied force or pressure. A preferred type of pressure sensor is a load cell, or strain gauge. A strain-gauge is a transducer that is used to create an electrical signal whose magnitude is directly proportional to the force being measured. Some load cells operate by measuring a change in resistance when a load is applied and then generating an electric signal that is proportional to the applied load. Other types, such as Piezoelectric load cells work on the same principle of deformation as the strain gauge load cells, but a voltage output is generated by the basic piezoelectric material itself and the voltage output is proportional to the deformation of load cell and therefore also to the applied load. Regardless of the type of pressure or load sensor that is used in the chair, the sensor must be sensitive enough to reliably measure relatively slight changes in applied load, as a user sits in chair 510.

Regardless if each or certain chair component movements are motor driven or user driven, the inclusion of pressure sensors and a supporting control circuit in a chair, as shown in FIG. 2 and as described above could be used to:
e) Create a digital signature for each user;
f) Keep track of the weight of the user over time;
g) Keep track of the user's posture overtime;
h) Determine the user's chair-position history; and
i) Determine if the user is accurately following a assigned chair-position schedule;

By creating a digital signature for each user, the control circuit would be able to understand if the current user sitting in the chair has a pressure-sensor profile stored in memory. If so, then the chair components (when motor driven) could be automatically positioned to that user's preferred and desired chair positioning (overall height, backrest recline lock or level of spring bias, seat cushion tilt, armrest height, etc.). Also, once the user is known, his or her personal chair-position schedule could be uploaded and followed.

In use, and referring again to FIGS. 1 and 2, a purpose of the present chair 510 is to encourage the user of the chair to sit in a manner that prevents or discourages poor posture and related back pain, joint and circulatory problems and improves the health and posture of the user.

According to the preferred embodiment, as described above, chair 510 includes several displaceable components that can be moved to change position (within a range of movement).

Chair 510 preferably includes three modes of operation, automatic, semi-automatic and manual modes.
Automatic Mode:

In automatic mode, the displaceable components of chair 510 are automatically moved at prescribed times following a schedule to best maximize the health, posture, and comfort of the user. By way of example of this operational mode, the user could be seated in chair 510 for 510 minutes typing on the computer. An internal clock within microprocessor 550 would indicate that a scheduled chair position is due. According to the disclosure, the user would be notified that a change is imminent by causing the component that will be changing position to gently undulate back and forth, or up and down with at a gradual and non-disturbing, non-vibration, rate, such as within 5 and 30 cycles per minute and at an amplitude of less than 5 inches of movement, depending on the component (this undulation is called a "whisper-breath"). Illumination from LEDs (not shown) and/or sounds generated by speaker 570 could also be used to function as an alert to the user, but the gentle undulation type alert is preferred. If the position schedule requires that the user recline in their chair for 5 minutes, then the backrest would gently undulate for one or two full oscillations prior to the movement occurring, preferably between 5 and 20 seconds prior. The user will feel this undulation and understand that the chair's backrest is about to recline to a prescribed angle 30-40 degrees from vertical, for example. During the undulating alert and thereafter (including during and after the backrest pivots back to recline), the user can cancel the scheduled event in one of several ways, including:
j) By rotating the chair back and forth about the post;
k) By rolling the chair on the floor mat;
l) By bouncing one or both legs up and down (lifted up by flexing his or her foot of the floor);
m) By tapping either armrest once or twice (depending how the system is set up).
n) By leaning back against the backrest and then leaning forward;
o) By tapping on the smart sit/stand desk (assuming the desk and chair are paired to each other through wireless connection);
p) By tapping onto a remote device that has been paired to chair 510, such as the user's smart phone, or another such device; and
q) By announcing a "Cancel" command verbally to the chair directly, or through the user's smart phone.

In this automatic mode, microprocessor 550 will follow a prescribed chair movement schedule that will try to get the user of the chair to cycle through chair body movements including reclining back, sitting upright with lower thighs, sitting upright with a raised thighs and standing upright, every 20 to 30 minutes, as described above. If the user cancels a particular chair-movement event, microprocessor 550 will revise the schedule for that particular user to try to get the user to move more while seated. The schedule will mesh with the sit/stand schedule is a smart desk is also being used.

According to another feature of the disclosure, chair 510 is adaptive and will learn the user's behavior and physical ability and will continuously adjust the positioning schedule accordingly. For example, chair 510 will keep track how close the user keeps to the preferred positioning schedule. If the user tends to sit more often than stand, then the schedule will adjust to provide more sit time at first and then slowly decrease the permitted sit duration so that the user can adjust to the new positioning and hopefully adapt too. Also, chair 510 can keep track of the user's schedule and seating habits, such as encouraging more standing earlier in the morning and providing more sit upright time later in the day. It should be noted, however, that although there is some room to adjust the positioning schedule, it is still important that the user moves to different positions, as described above regularly and if he or she cannot, then a manager may have to intervene and provide the user with additional help and support, as necessary.

If a stepper motor 558*a, b, c*, is being used instead of smoother servo-type or rotary type motors, the resulting movement of each displaceable component will be a bit jerky, since a stepper motor is more like a rotary solenoid divided up into degrees of a rotation. The jerky motion would be noticeable and subtle, but not annoying. Applicants' contemplate using this subtle jerky motion as a non-annoying alert that a movement event is about to occur.
Semi-Automatic Mode:

In semi-automatic mode, a user operates user input 562 (buttons on an accessible control panel, not shown) to instruct microprocessor 550 to activate select motors 558*a-c* to move a select chair component, as desired by the user until the desired new position of the particular chair component is reached. For example, the user may decide to raise their armrest 529 and can push a button located on the armrest itself, or push a button located on a control panel (not shown), which will cause motor 558*a, b, c,* that is associated with that armrest displacement mechanism to activate and displace the armrest to the desired point in movement. Semi-auto mode means that the user initiates the move of a particular component, but electric motors 558*a-c* perform the actual movement. A contemplated variation here is that pressure sensors located at various locations within chair 510, such as in lower seat cushion 524 and backrest cushion 522 will sense sudden increased pressure one, two or three times in a row, evenly spaced apart which is caused by the user pushing back, for example, against the backrest. This movement acts as instructions for the control circuit to electrically drive the backrest back to a prescribed angle, or until the user instructs the control circuit to stop. Alternatively, the user can tap onto their Stir sit/stand smart desk controller which is embedded in the surface of the desktop. This action (or similar tapping action sequence) will cause the control circuit of chair 510 to perform the action, receiving the instructions from the desk by wireless communication 554. Another variation of this would include an image of the desk chair 510 on either the display of the Stir sit/stand smart desk, their smart phone display, or on the user's laptop/PC computer display. The user can either tap the part (component) of the chair that they wish to displace or hold their finger on their touch screen, on the chair part they want to move. This action will translate into an instruction to move that part, sent to chair 510 and received by wireless communication 554. The user simple releases the touch screen to stop the movement. If the screen is not a touch screen, the user can use their mouse and cursor.

Manual Mode:

Manual mode means the user both initiates the move of a particular component of the chair and then makes the actual move of the component. In manual mode, the components are mechanically disengaged from the motor and motor drive mechanism. Manual mode is similar to the movement of conventional chairs. This mode is preferably used only when battery 552 depletes or another electrical failure occurs and the user requires movement before the battery is recharged, or the failure is corrected.

Monitors and Postural Rotation:

Applicants' acknowledge that if the user is using a computer with a display on their desktop, the viewing angle may be compromised by the movement of a part of chair 510, such as if the chair reclines. In this instance, the user could have difficulty viewing the display and work efficiency could decrease. Applicants' propose a display mount (not shown) that would be mounted on the user's desktop and would support the user's monitor. The display mount would include two motors (or drives) that would allow the display to move up or down (closer or farther away from the table top), and tilt up and down. The display mount, according to this disclosure, would be powered remotely and would include onboard controlling circuitry and wireless communication (or would be hard-wire communication connected to the smart desk). The display mount would be paired with the smart desk, is one is being used, and chair 510. In use, as chair 510 moves, the chair's control circuit would send instructions by way of wireless communication 554 to move the supported display up or down or tilt up or down in an effort to reposition the display to align with the newly repositioned user's head.

In a further enhancement the monitor mount can periodically adjust (ideally automatically or semi-automatically) when a user is sitting upright in their chair between straight ahead of user which is often comfortable for the neck but can cause eye strain, and a second lower tilted position which is more ideal for the eyes but can cause some neck strain. As noted it has been suggested by ergonomists that one's "next position in his or her best position" suggesting that there is not one single good position for a monitor.

In a further enhancement the monitor mount would adjust to result in the user looking slightly to the left and slightly to the right (ideally automatically or semi-automatically) to support periodic healthy position changes of the neck and spine. Additional actuators would be added to enable this motion.

Conference Room Application:

The above-described disclosures directed to Chair 510 can be applied to many different types of chairs, but a primary intended chair type is the office chair used at desks within an office setting. However, these chairs can also be used in a conference room setting wherein several chairs populate the perimeter of a large conference table. In this application, all the desks and chairs used in the entire office could be connected wirelessly to the company's server wherein all individual chair positioning and use information can be stored. Chair 510 can further include a simple reader (not shown), such as optical, magnetic, Bluetooth® or RFID, etc. This reader may be used to sense or otherwise read information, preferably automatically, from an employee's security card (or other ID type card), or phone when the user sits at any chair within the company, including the chairs positioned around the conference table. In use, once the employee sits in any of the chairs, the selected chair will automatically identify the user and the onboard control system will activate the various motors 558*a-c* of the chair to position all moveable chair components to align with the seated user's stored preferences. This approach may also be applied in other instances when many people use the same chair at different times such as in "desk sharing," which is also referred to as "hot-desking" in the furniture industry Using Chair Movement for Alerts:

According to yet another feature of the present disclosure, different motors 558*a-c* are selectively activated to move select chair components in preset movement patterns which could be single movement, slow or quick, or oscillatory and can repeat at spaced intervals. This allows chair 510, working with wireless connection to the company's server, the user's smart phone, the user's computer, the user's smart desk, or other similar devices to communicate upcoming or current events to the seated user in a non-disturbing manner. The user could assign (during setup) different types of chair component movements with specific types of event alerts. For example, microprocessor 550 could be instructed to activate the chair's seat cushion motor 558*a-c* in an up and down undulating movement with an amplitude of 2 inches peak-to-peak and a period of 4 seconds in response to an upcoming meeting, as listed in an appointment program operating on the user's smart phone, such as MS Outlook® provided by the Microsoft company of Redmond, WA 98052. The first movement could indicate a 15 minute reminder prior to the particular meeting. At 5 minutes, microprocessor 550 would interrogate sensors 560 and would learn, in this example, that the user is still seated, and would then confirm that the meeting appointment remains active. Microprocessor 550 would then move the same component up and down, but now at a quicker frequency, such as 2 second cycles and with an amplitude of just 1 inch and would increase the duration for 5 seconds. This action provides the user of an alert of higher urgency. The user may cancel the alert sequence for the particular appointment either on his or her smart phone or by moving in a preset manner in the chair within a preset time limit after the start of the alert, such as by rotating the chair about post 514 clockwise and counterclockwise twice within 510 seconds after the beginning of the alert sequence. Sensors 560 would detect this rotation and microprocessor 550 would cancel further alerts for this scheduled appointment.

Other chair components can be moved in a similar manner to remind the user of other events.

An important feature of the present disclosure is that chair 510 is "smart" and connected to the user's smart devices. The chair according to the disclosure effectively becomes a giant computer mouse in that the user can move different components of chair 510 to perform specific computer related tasks, such as cancelling a meeting alert. The chair can also receive information from other smart devices and the Internet and the company's server to understand the seated user, his or her profile, preferences, and schedule etc. and respond automatically if necessary, to better the user's health and workplace efficiency.

Figure 4:
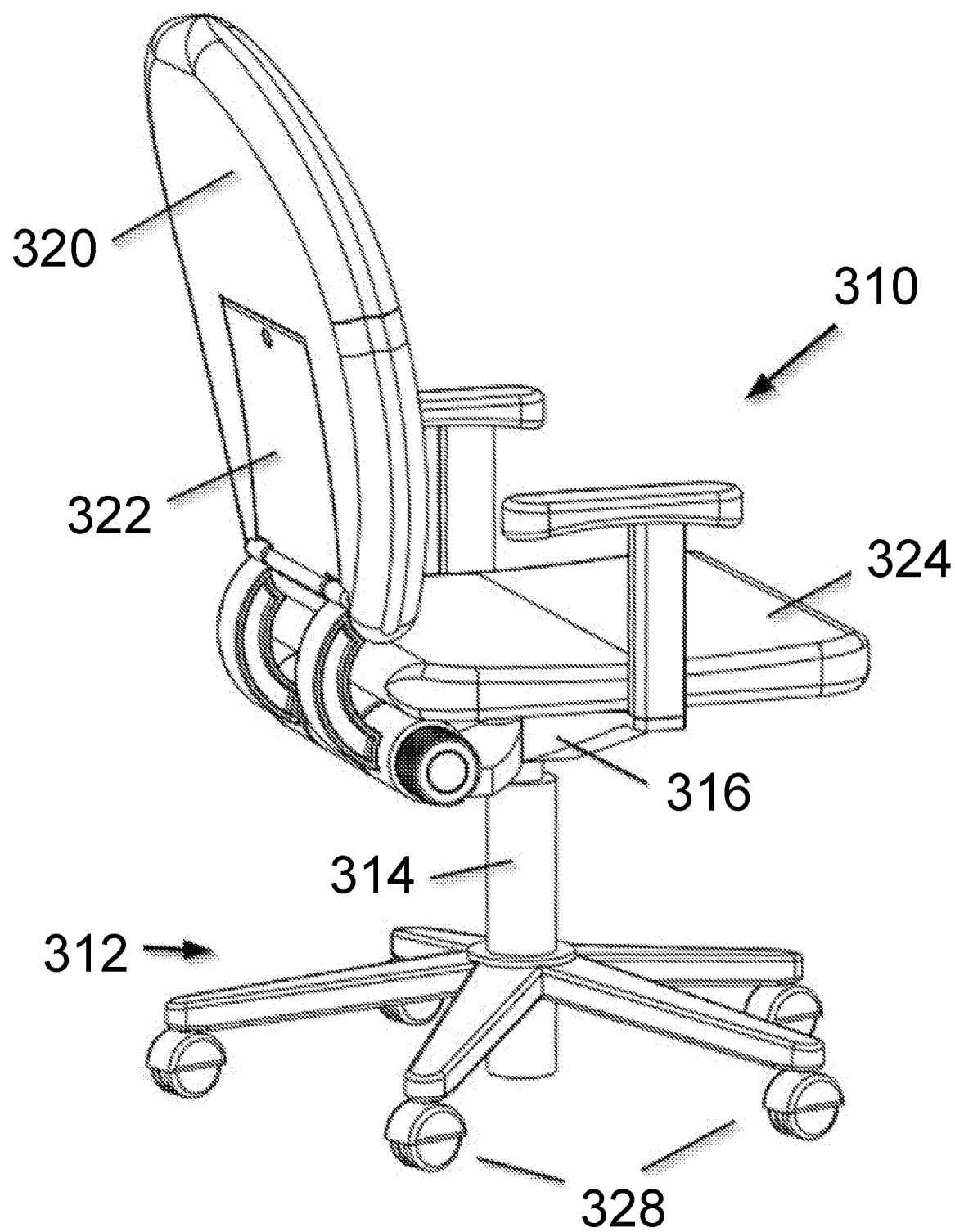
FIG. 4 is a rear perspective view of an exemplary ergonomic seating structure, showing various components, in accordance with the present disclosure.
Figure 5:
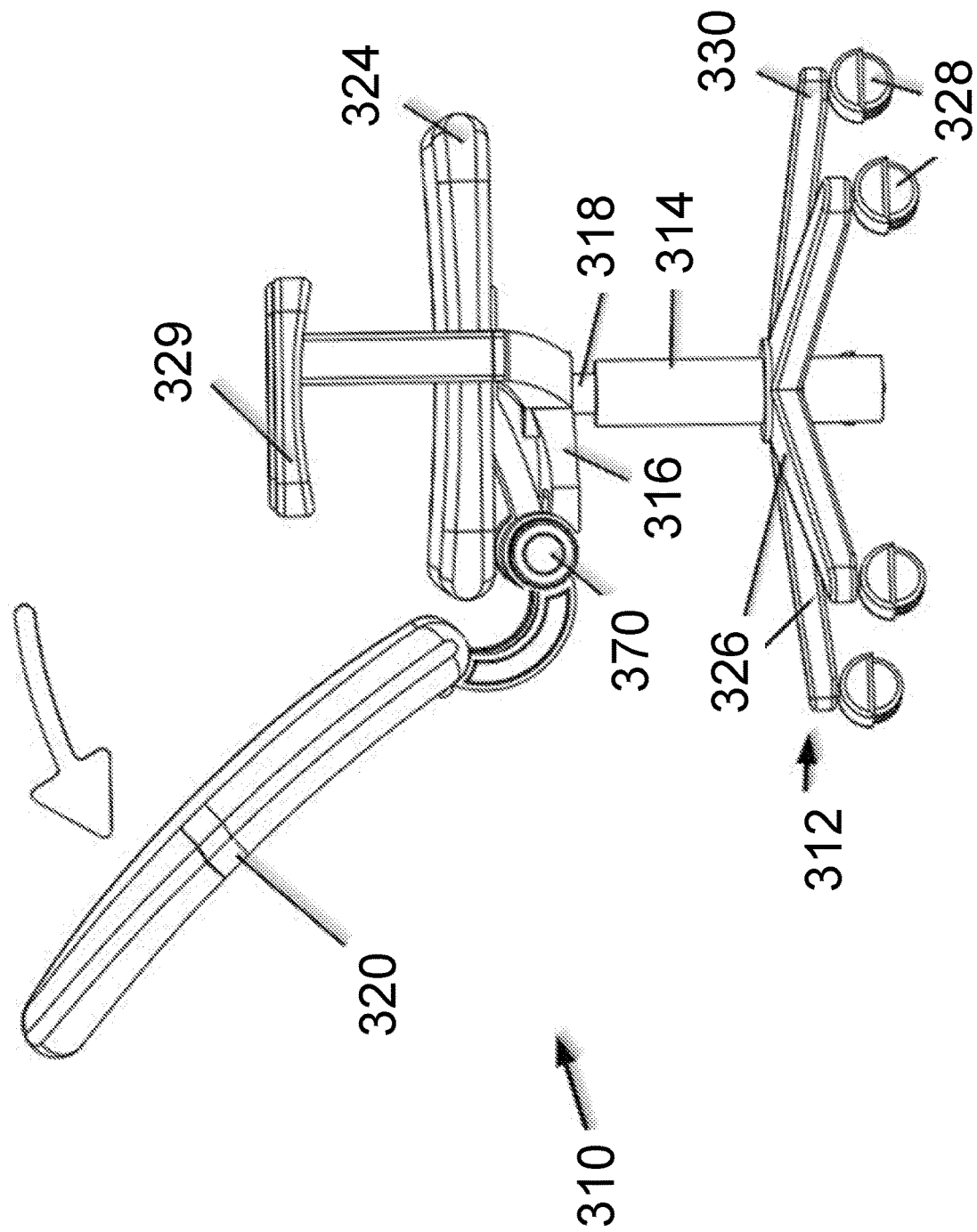
FIG. 5 is a side elevation view of the seating structure of FIG. 4, showing the backrest reclined, in accordance with another embodiment of the disclosure.

Referring to FIGS. 4 and 5, and according to another embodiment of the present disclosure, a seating structure 310 is provided having a dolly structure 312, from which a post 314 upwardly extends. A yoke assembly 316 includes a vertically disposed piston 318 which is slidably secured to post 314, as understood by those of skill in the art. A backrest 320 is pivotally secured to a portion of yoke assembly 316. A seat portion 324 is pivotally secured to a portion of yoke assembly 316. As is well known by those skilled in the art, dolly structure 312 includes 5 radially disposed legs 326, each having a caster wheel 328 pivotally attached to a remote end 330. A left and right side armrest 329 are mounted to yoke assembly 316 by a telescoping connection and are selectively vertically displaceable.

Figure 6:
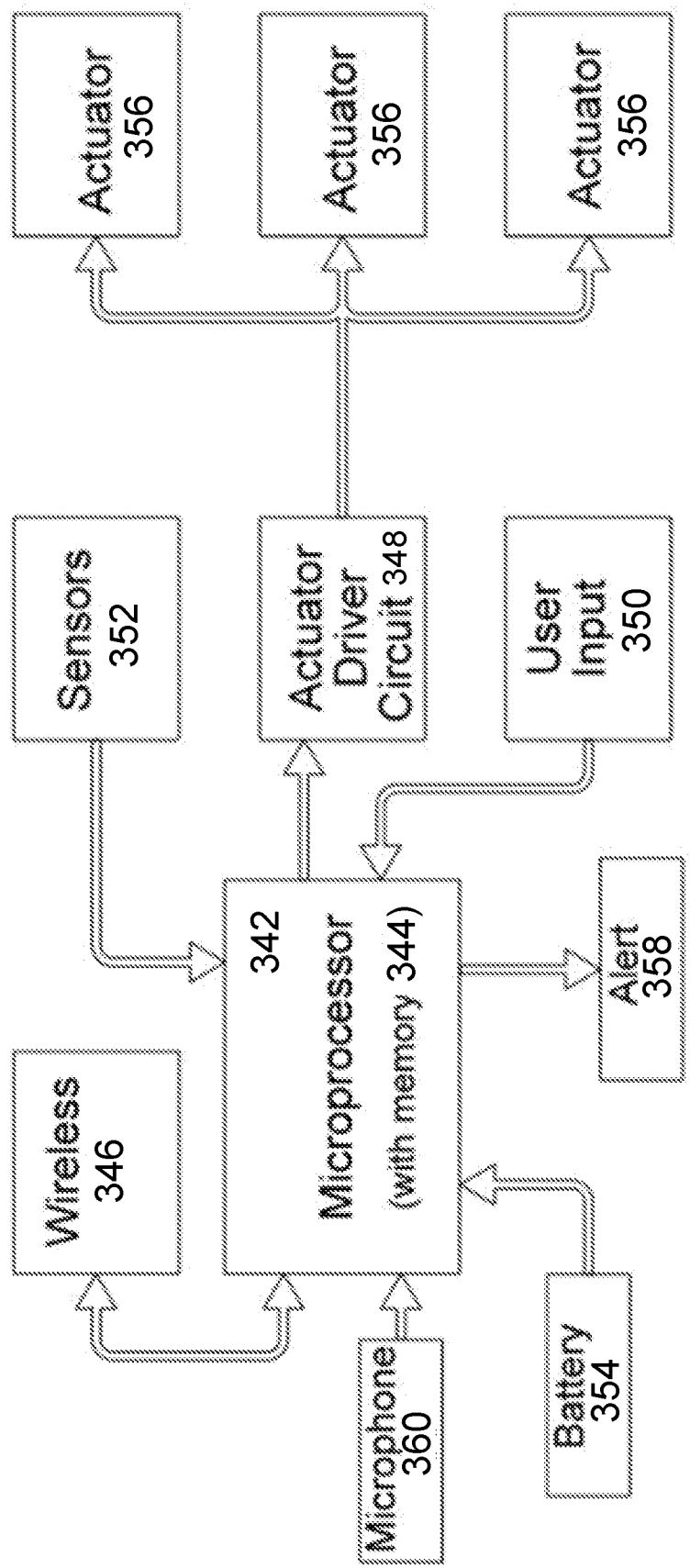
FIG. 6 is a schematic showing various electrical components, in accordance with the disclosure.

As shown in FIG. 6, and according to the disclosure, seating structure 310 further includes a microprocessor 342, memory 344, wireless communication 346 and an actuator driver circuit 348, collectively called a control circuit 340. Seating structure 310 further includes user input controls 350 (buttons, knobs, etc.), positioning sensors 352, a battery 354 and actuators 356. All these components are mounted throughout the seating structure and are electrically connected to microprocessor 342.

As is understood by those skilled in the art, backrest 320 is pivotally secured to yoke assembly 316 and may pivot back (or recline) between a generally straight upright position (no recline—about 90° with respect to seat portion) and a predetermined full recline position, defining an angle of about 130° with respect to the seat portion 324. As with conventional seating structures of the type that include a reclining backrest, backrest 320 is biased to the upright no-recline position by a spring-bias, which may be provided by compression, tension, torsion, or axial mechanical springs, a pneumatic piston arrangement, or another mechanism, as understood by those skilled in the art.

In conventional adjustable seating structures, the magnitude of this recline-spring-bias may be controlled by a lever (not shown). Also, hard stop points may be selected using knob 370 that prevent backrest 320 from reclining past a fixed preset angle. This allows the user to decide the maximum degree of recline the backrest will move, when he or she leans back in the chair. As mentioned above, often the user keeps the preset recline angle to a no recline angle of about 90°, straight upright. Unfortunately, when the user does this, applicants' research indicate they often forget the need to alleviate the strain on the discs of their vertebrae and to return their lumbar curve back to its desired rest position and slouch. In other words, most users don't think about reclining when they are working and miss out on the health benefits of cycling regularly between reclining, sitting upright and standing every 20 minutes or so throughout the day.

Positioning sensors 352 are positioned at different locations on seating structure 310 and are used to detect user presence (is there a user sitting in the chair), if the user is seated upright, the force the user is exerting against backrest 320, and the angular position of backrest with respect to seat portion 324. The type of sensor may vary depending on what it is required to sense, but the sensors are well known and may be conventional. Strain-gauge type sensors may be mounted, for example, within seat portion 324 to detect the user's weight (and therefore the user's seated presence) and also the force the user is exerting against backrest 320. Optical-coupler sensors or hall-type sensors may be used to determine the angle of backrest 320. Any type of sensor may be used here, as understood by those skilled in the art, without departing from the disclosure.

Manual Mode (Remind):

According to a first manual mode of operation of this embodiment of the disclosure, at prescribed times, following a schedule stored in memory 344, microprocessor 342 will first interrogate the sensors to determine certain values, including:

r) If there is a person seated on seat portion 324;
s) The force being exerted against backrest 320;
t) The current angle of backrest 320; and
u) The preset maximum reclining angle (set by the user).

At prescribed times, based on the schedule, if there is a person seated and the current angle of backrest is less than the prescribed and suggested recline angle, microprocessor 342 will send an alert (from alert generator 358) to the seated user, such as a vibration, a tactile impulse, a movement of a chair component, illuminating lights, or generating sounds or a voice, to indicate that a reclined position is suggested to maintain good posture and health. This reminder to the user may also be in the form of a generated alert that will appear on his computer screen, or even on the user's smart phone, as a push notification text or alert. The user may cancel the request by voice (which would be "heard" by a connected microphone 360), pushing a button on input control 350, moving one of the chair components (including rolling the chair on the floor mat) a prescribed number of times, such as two or three times, tapping on a chair component, such as armrest 329 (picked up by a sensor) or using their smart device (such as their cell phone, computer, or other) which is connectable by wireless communication 346 (Bluetooth®, Wi-Fi_____33, etc.). According to this mode, and the disclosure, the user is only reminded to change position (recline). The recline tilt lock (or hard-stops) will not be automatically released. If the user does not cancel the alert or reminder, control system 40 will continue to remind the user at preset intervals. If the user does heed the reminder and manually releases the recline tilt lock, he or she will push against backrest 320 (against the action of the spring-bias) until the desired recline angle has been reached. Sensors 352 will detect the angle and will either confirm that the recline angle is following the recommended angle (acceptable) with another confirmation alert, or with another alert that indicates that the user must further recline. The user may still select the maximum angle of recline.

After a prescribed period of time at the reclined position, control system will alert the user that the reclining period has ended and that backrest 320 may be (or should be) returned to the full upright position, or to a different position, such as the previous recline position set by the user. The user may again cancel the alert and remain in the reclined position, as desired.

Automatic Mode (Remind and Disengage):

According to the disclosure, in a semi-automatic mode, control system 340 performs the same reminding process as in the above-described manual mode, but now the user is being reminded that unless he or she cancels the event, any tilt-stop or hard stops will automatically release and backrest 320 will be released and the user will be allowed to lean back to a reclined position. In this mode, backrest 320 does not automatically recline, but only releases any stops that have been preset and subsequently allows the user to recline to a greater degree, the degree to which may be selected by the user in an interface such as a smart-phone connected via Bluetooth. If the user remains seated upright during this time, sensors will detect this and in response, microprocessor 342 will generate alerts, as before, to the user that must be cancelled. The behavior patterns of the user may be aggregated and transmitted to a usage dashboard or otherwise aggregated for later review. Once backrest 320 reaches the prescribed angle of recline (according to the event schedule), applicants contemplate locking backrest 320 in the reclined position. The seated user may activate a control or voice command to release the fully reclined lock at any time.

After a prescribed period of time in the reclined position, control system will alert the user that the reclining period has ended and that backrest 320 will either be unlocked (if that feature is set) or the alert is merely a reminder to the user that the recline time has ended and that the user may raise (with the action of the spring-bias) to an upright position. If the user remains reclined, alerts will continue, but the user may again cancel the alert and remain in the reclined position. Control circuit 340 causes recline lock to automatically match the lock settings before the recline. If it was set to lock, then the locked setting will be reset. Same with unlocked.

In each mode, the user determines the maximum angle of recline.

Training Mode:

Since seating structure 310 can be paired with a separate smart device, applicants contemplate using the smart device to help educate the user how to use the chair—a kind of real-time interactive instruction manual.

In use, when a user touches a control on the chair, for example, a height adjustment lever, this action would be sensed by sensors and the microprocessor would work with an app running on the user's smart-phone to explain how the height adjustment works, with video, graphics and text instructions. When the user does adjust the height of the chair, according to one embodiment, a graphic located on the screen of the smart-phone simultaneously show the seat move in the same direction.

This training tool works with different alerts. In such instance, if the user feels three vibrations in the cushion of their chair, in the training mode, the microprocessor on the chair can communicate to a smart device to push instructions of what the three vibrations means. This would continue for a period of time and automatically shut off. Alternatively, the training tool can be used to detect how the user responds to a particular alert sequence, if applicable, and can use this information to determine if further training is required.

Similarly, the user can tap on the screen of their smart-phone over a particular graphic component of the chair and the information would be transmitted to the microprocessor on the chair which would cause that selected component to move or vibrate, to indicate where a particular component is located.

Figure 9:
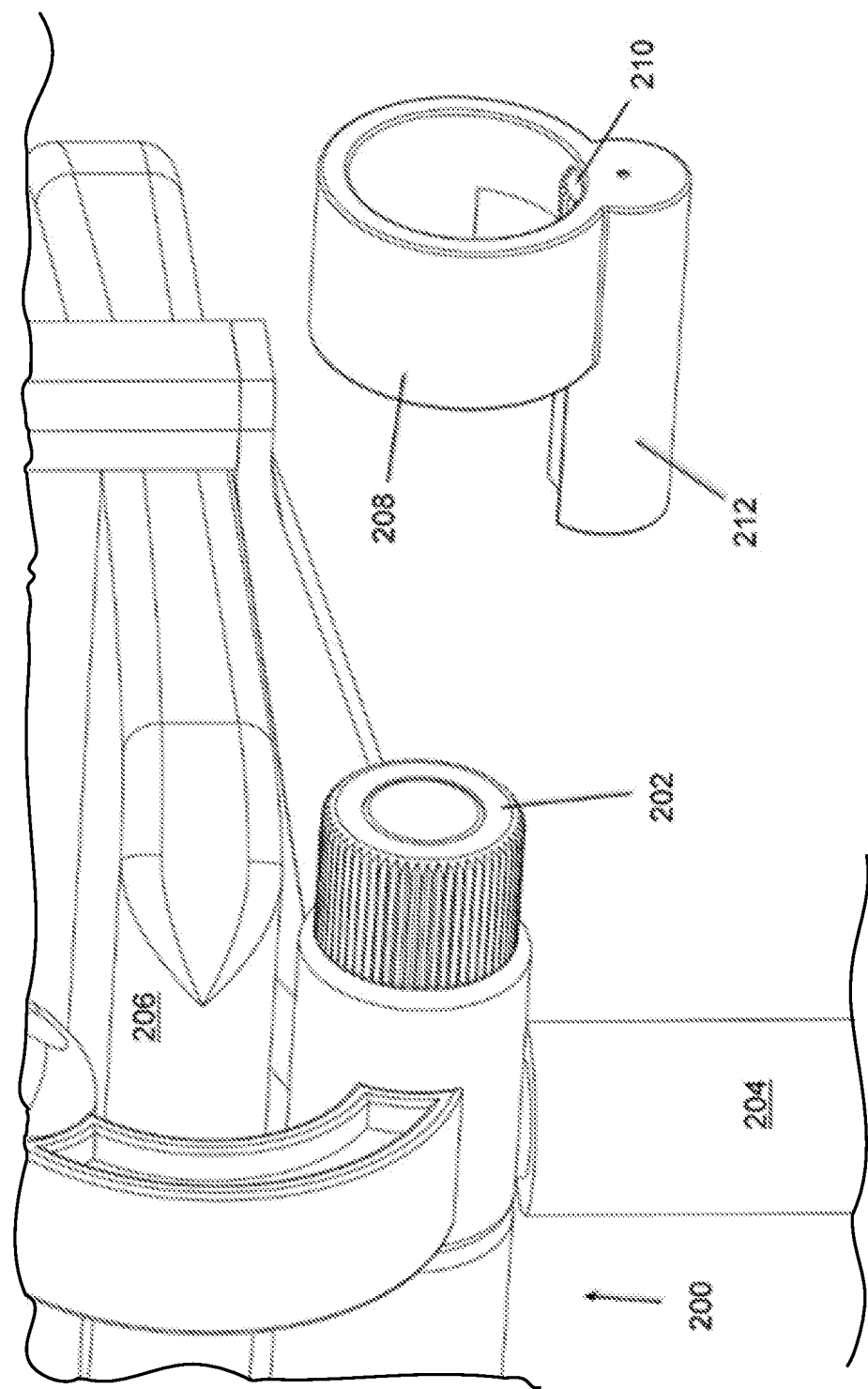
FIG. 9 is a partial perspective view of the seating structure of FIG. 7, showing details of an add-on tilt-control unit prior to being secured to the seating structure, in accordance with the present disclosure.

Feature Module:

This disclosure provides a chair that includes an easily accessible and replaceable component (a "module"). The module can be positioned anywhere on the seating structure, but is preferably secured (such as snapping into place or being inserted like a cartridge into a snug-fit recess or cavity) to the backrest of the chair, as shown in FIG. 9. The module includes any of several features including massaging motion to massage the user's back, vibration (or mechanical impact) which may function as an alert to the user, heat and transforming lumbar support, as detailed below.

Figure 7:
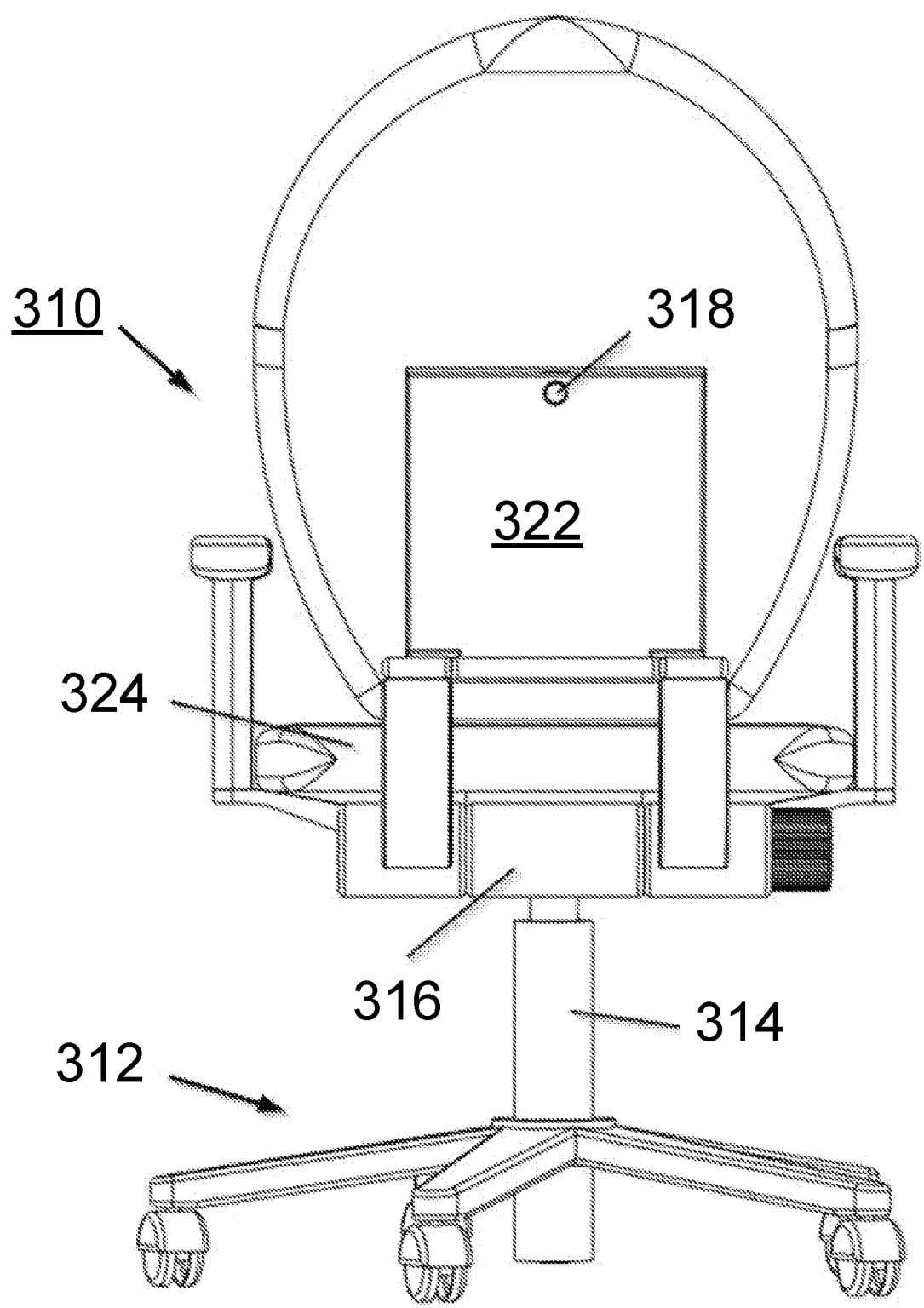
FIG. 7 is a rear plan view of the seating structure of FIG. 4, in accordance with the present disclosure.
Figure 8:
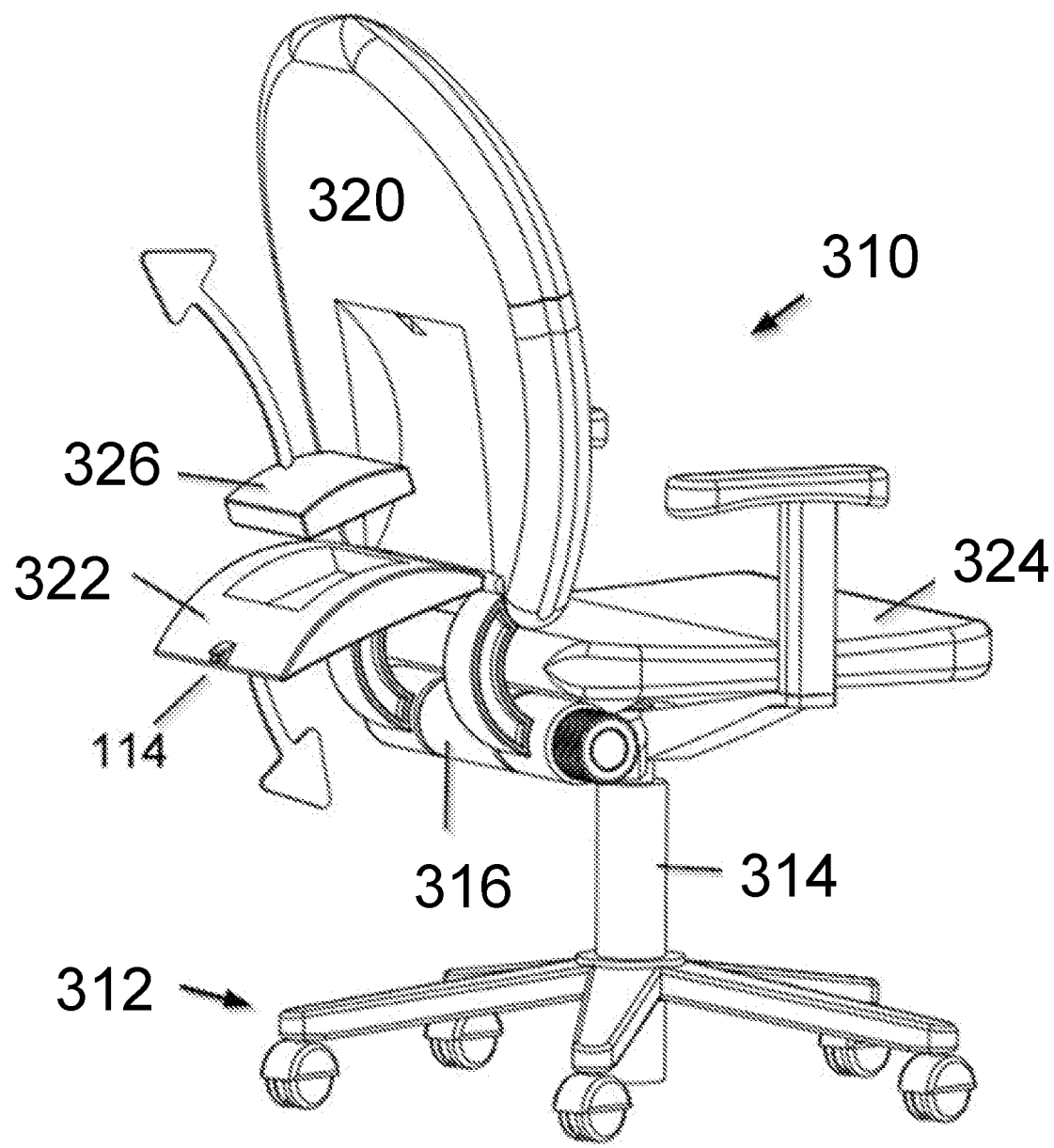
FIG. 8 is a rear perspective view of the seating structure of FIG. 7, showing the module access door open and the module being removed therefrom, in accordance with the present disclosure.

Referring now to FIGS. 4, 7 and 8, a chair 310 is shown including a dolly assembly 312, a post 314 attached thereto and supporting a yoke 316. A seat portion 324 is attached to yoke 316. A backrest 320 is pivotally attached to yoke 316 and includes a module cover 322 which is pivotally attached to backrest 320, pivotal between a fully closed position, shown in FIG. 4 and an open position, shown in FIG. 9. Module cover 322 is securable to backrest 320 when in the closed position by a latch 318, for example. When module cover 322 is in the open position, a module 326 can be accessed, removed and replaced by the same module or other ones. Module 326 preferably includes its own power supply (such as batteries, not shown), and is controlled by wireless communication (e.g., Wi-Fi_____33, Bluetooth®) to a remote smart device (e.g., smart-phone, remote control unit, a laptop computer, tablet, or smart desk).

One type of application for a module is messaging which includes an electromechanical actuator that can be activated to create single tactile impulses, preferably to the back of the user, a sequence of tactile impulses, or a pattern of pulses generated at prescribed frequencies, amplitudes, and durations. These tactile patterns are used to communication information to the seated user in a subtle and non-disturbing manner. The electromechanical actuator can be a solenoid, a motor rotating an offset weight, linear motion actuators, rotational vibrators, pendulum vibrators and oscillators, or similar. An onboard microprocessor controls the electromechanical actuator to generate a predetermined tactile message to the user's back. Since the microprocessor is paired with the user's smart device, such as his or her phone, and laptop, the tactile messages could provide a reminder that a meeting is starting in 10 minutes, for example. Another proposed use would be to have the tactile messaging convey the passage of time, by transmitting a single impulse, for example, every half hour of time, or at lunch time, etc.

This messaging module could include connections to automatically connect with electrical components already installed in a chair, or could include all the required components, all self-contained, including, a battery, a controller circuit (microprocessor, memory, etc.), an impulse generator and a wireless communication circuit, such as Bluetooth®.

To install the module, in the example shown in the figures, the user simply inserts the module into the cavity of the module door. The door is then closed.

The module feature can be remotely controlled by the user's smart device so that exposed controls on the module itself are not necessary.

Another proposed module includes a section that can expanded or contract against the user's back so that it can selectively provide lumbar support. Once example would be to control the inflation or deflation of a sealed fluid bladder.

Another proposed module includes a heating element and a strong massaging oscillation generator (not shown). This module would provide local heat and massaging on demand by the user. Again, the user merely has to select the option and duration on his or her smart device.

Figure 10:
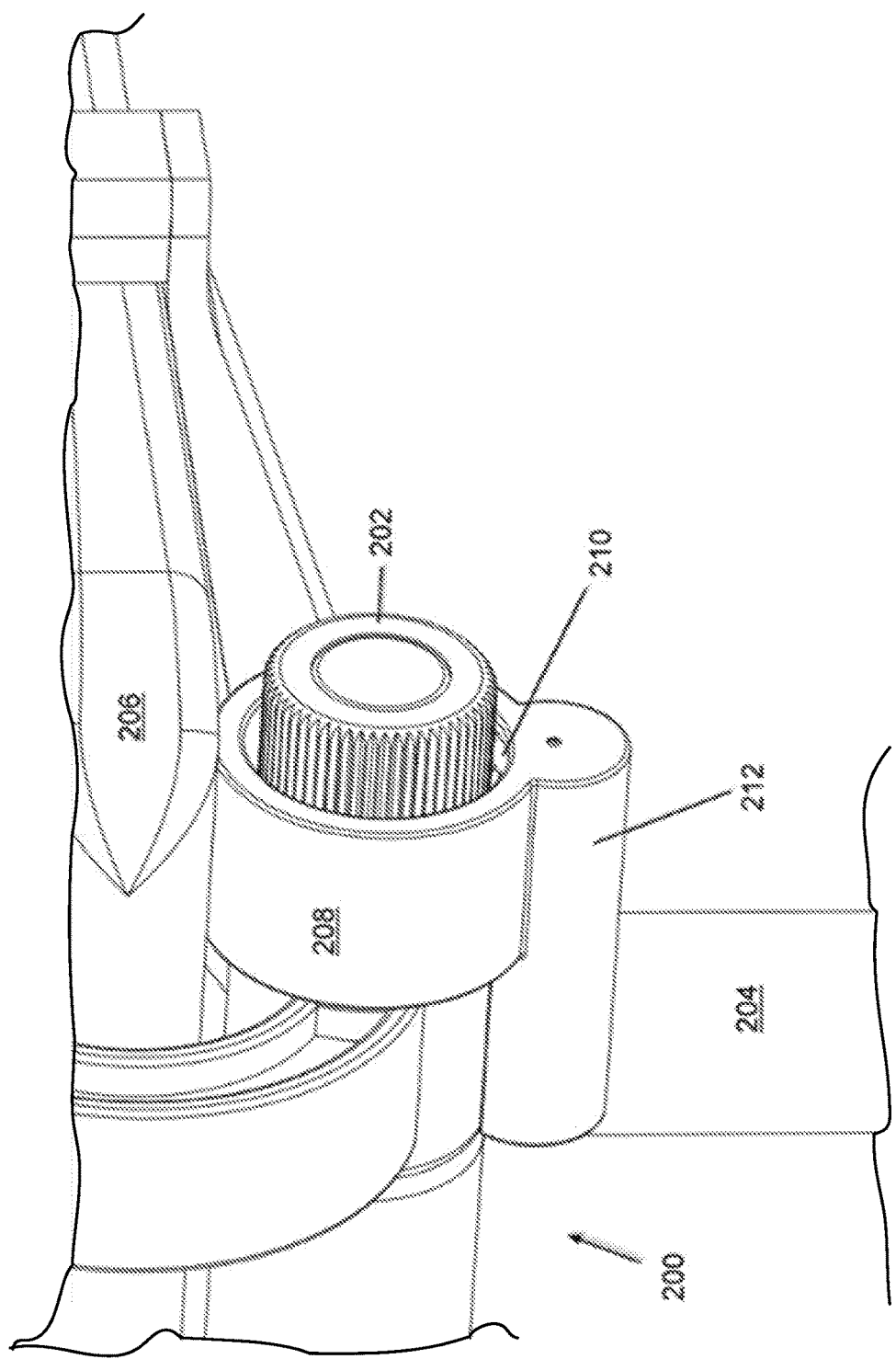
FIG. 10 is a partial perspective view of the seating structure of FIG. 9, showing details of the add-on tilt-control unit secured to the seating structure, in accordance with the present disclosure.
Figure 11:
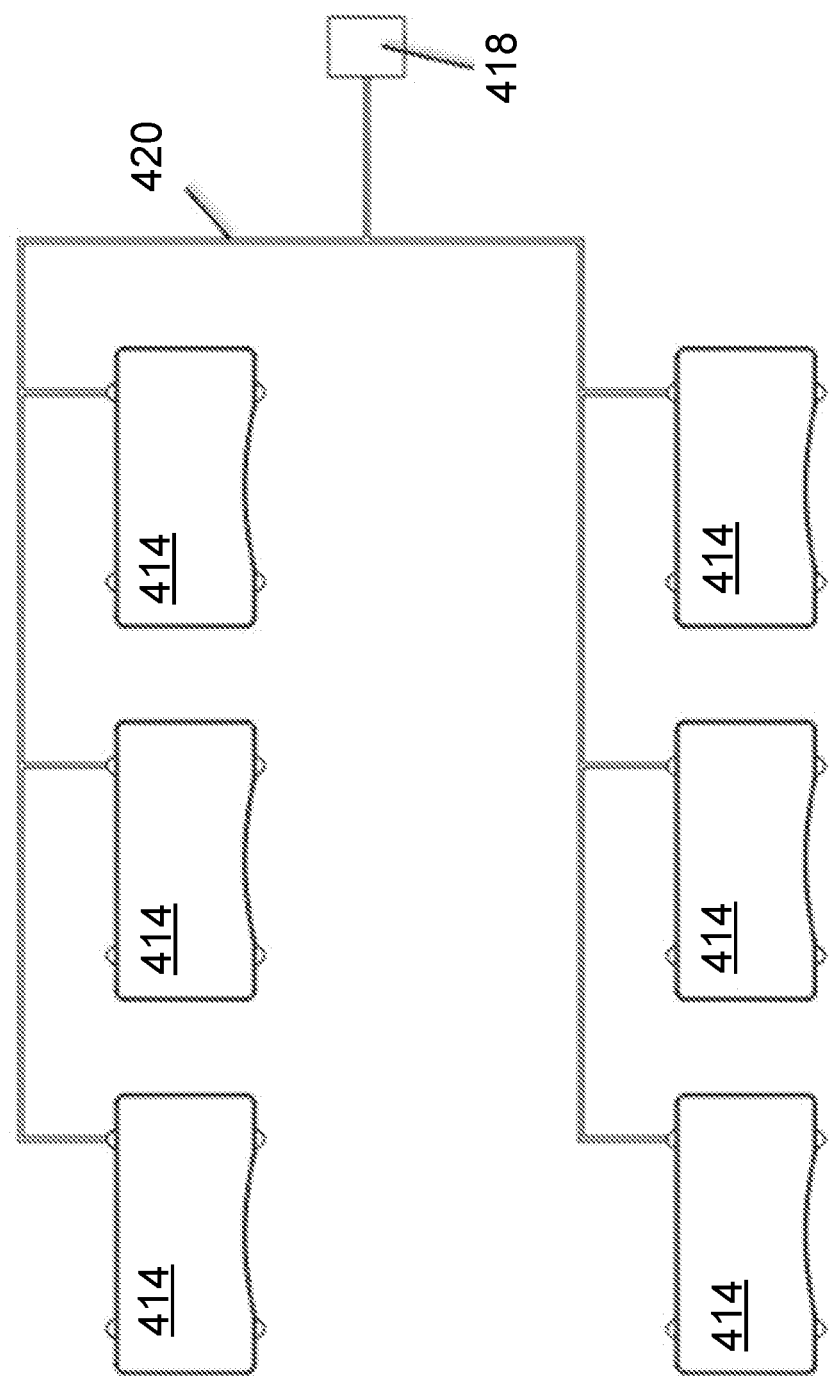
FIG. 11 is a top plan view of an exemplary matrix of installed sit-stand desks showing connection to a controller, according to the present disclosure.

Add-On Tilt Control Unit:

Referring to FIGS. 9 and 10, a seating structure 200 is shown having a seat portion 206 mounted to a post 204. Preferably a knob 202 (having external teeth) is provided to selectively release the recline lock, allowing the user to recline the backrest of the seating structure. Other mechanisms for actuated rotation may be used here in place of the knob, as understood by those skilled in the art. According to this disclosure, an add-on tilt-control unit 208 is provided which includes a housing 212 that houses an actuator (not shown), a drive gear 210, a battery (not shown), and controlling circuitry (not shown, but the same as shown in FIG. 6 and described above. Add-on tilt control unit 208 would be custom made to fit each seating structure 200, as required. In this example, add-on tilt control unit 208 is designed and shaped to snuggly secure to seating structure 200 around knob 202, as shown in the figures. As shown in FIG. 11, gear 210 is sized and positioned to engage the teeth of knob 202. Gear 210 is mechanically attached to the actuator of the add-on tilt control unit 208 so that when actuator is activated, gear 210 will rotate and, in turn, rotate knob 202, in a direction that causes the factory-installed tilt-lock mechanism that is located within seating structure 200.

Once installed to seating structure 200, as shown in FIGS. 9 and 10, the operation of add-on tilt control unit 208 is the same as above-described embodiments. Depending on the mode, control circuitry, powered by onboard battery, announces to the user that the position-change schedule is recommending a position change. If the recommended change is a recline, the user will be so notified by an appropriate alert, as described above in earlier embodiments. The user may decline by moving the chair side to side or pivoting the seat 206 about post 204 or use other input methods described in this specification. Sensors within add-on tilt control unit 208 will detect this and reschedule the position-changing event. If the user accepts the change (by doing nothing), the add-on tilt control unit 208 will activate the internal actuator and gear 210 so rotate knob 202 and release the reclining tilt-lock. The user will then push back against the backrest to a reclined position. After a prescribed period of time, the user will again be alerted and he can again move back to a different position. Of course, other tilt-lock and tilt-release mechanisms may be used in connection with this embodiment of the disclosure, as understood by those skilled in the art.

Health Management Light:

According to this disclosure, an LED is mounted to the seating structure or nearby desk and will illuminate when the user (employee) is actively following the prescribed position-change schedule during reclining. This communicates that that the user is reclining for health management reasons and addresses cultural inhibitions to reclining in certain office environments that applicants have identified in their research. Control circuit 40 can also instruct a nearby smart-device to offer a similar indication. A separate device could be positioned on the desk and instructed to illuminate during this time period of reclining or when standing to provide encouragement help overcome cultural barriers to these changes in work styles.

Sit-Stand Desk with Remote Height Management:

By way of overview and introduction, the present disclosure concerns improvements of managing sit-stand desks and in turn, positively influencing healthy behavior of workers. The embodiments discussed below are not intended to be exhaustive or limit the disclosure to the precise forms disclosed in the following detailed description. Rather, the embodiments are chosen and described so that others skilled in the art may utilize their teachings.

Figure 12:
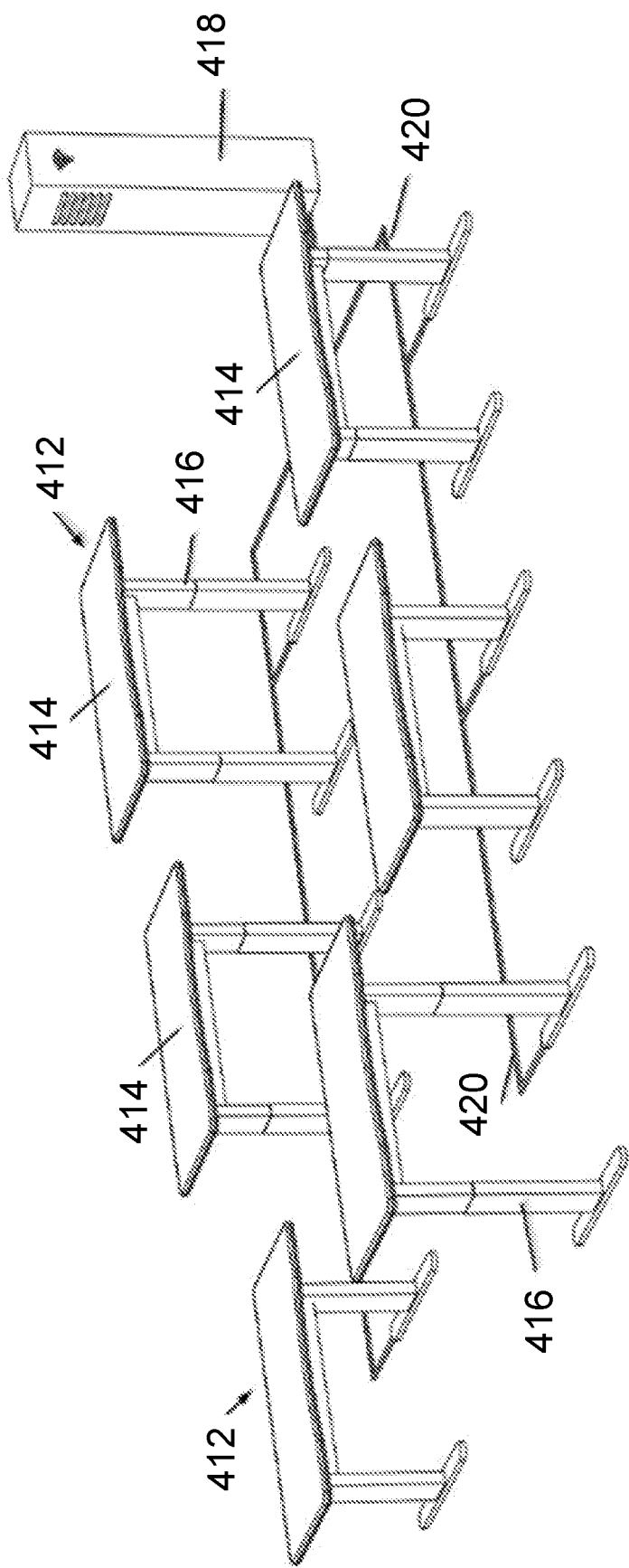
FIG. 12 is a perspective view of the exemplary sit-stand desks of FIG. 11, showing each desk having a worktop positioned at a different height, according to the present disclosure.
Figure 13:
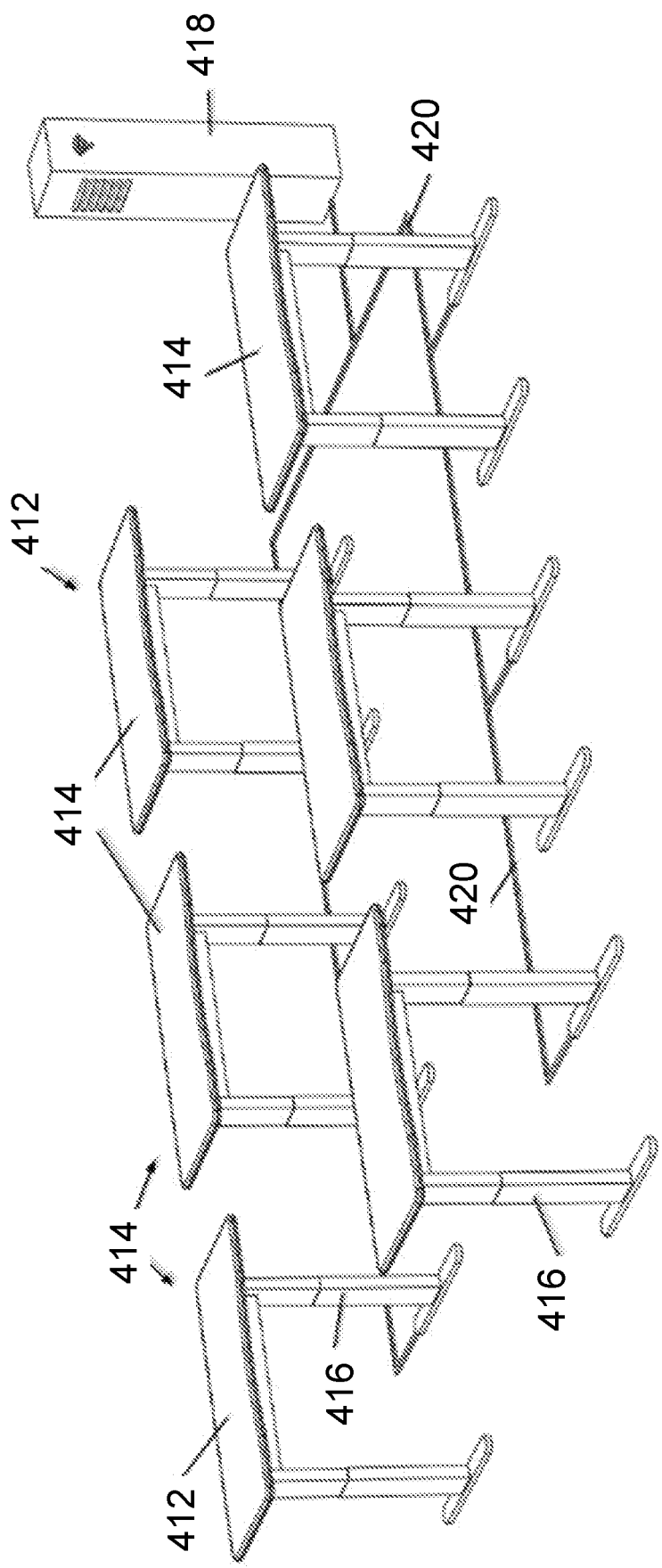
FIG. 13 is a perspective view of the exemplary sit-stand desks of FIG. 11, showing the worktop of each desk in the matrix positioned at a common height, according to the present disclosure.

Referring to FIGS. 11-13, an exemplary installation of six sit-stand desks are shown. Each desk 412 includes a worktop 414, and motorized legs 416. According to a first embodiment of the disclosure, motorized legs 416 are controlled by a local control unit (not shown) secured to worktop 414. A user of each desk 412 can use the control unit to power motorized legs 416 to move worktop 414 up and down to a desired height. According to this disclosure, each control unit of each desk 412 is connected to a local master controller 418. The connection can be either hardwired, such as using a CAT-5 communication cable 420 shown in the figures, or wirelessly, using Bluetooth®, Wi-Fi, or another suitable system.

According to one embodiment of the disclosure, local master controller 418 includes a timing circuit (not shown), an Internet connection (not shown) and a control panel (not shown). Local master controller 418 is in electrical communication with each of desks 412 and may change the height of each worktop 414 of each desk 412 either individually, in preselected groups, or all simultaneously. The height change to any, or all worktops 414 (that are connected to local master controller 418) can be controlled manually, by an operator using the control panel (not shown) located at local master controller 418. Alternatively, the height change commands to select desks or all desks may be generated automatically, following a timing schedule, such as:

| Which desk(s)? | Move to what height? | When should this occur? | On which days? |
| --- | --- | --- | --- |
| ALL | 44 inches | 8:00 PM | M-F |

In the above example, the desktops of ALL the desks controlled by local master controller 418 are programmed to reposition to a new set height of 44 inches above the floor at 8:00 PM, each night, Monday thru Friday, unless instructed otherwise. According to another embodiment of the disclosure, sensors (not shown) located at each desk 412 detect the presence of a user at a desk. Such sensors may be proximity, pressure (used in connection with a pressure mat), infrared (e.g., thermal), optical, capacitive, or similar, as is well known by those skilled in the art. If it is determined (through sensing) that a particular desk is being used at the time of a scheduled height change (e.g., at 8:00 pm, Monday), an "in use" signal will be sent to, or read by local master controller 418 at the time of the planned event. In such instance, all other, unoccupied desks will proceed to move to the new scheduled height (e.g., 44 inches), but the occupied desk in this example will remain unchanged and in full control by the immediate user. Once it is determined (by scheduled interrogation of local master controller 418) that the user no longer occupies the particular lone desk, local master controller 418 will instruct that desk to raise its worktop 414 to the scheduled height (e.g., 44 inches) to match the height of the other desks in the group.

According to the present disclosure, if a user returns to a desk after leaving and his or her desk has already been raised to a new scheduled height by local master controller 418, the user may simple return the desktop height to any desired height using the controls at the desk. Local master controller 418 will periodically interrogate that desk (and any other desk which is forced off the master height schedule by the user) to determine through electronic sensing if the user has left. At such time, local master controller 418 will again reset the height of the now unoccupied desk to match the height of the others, or to match the prescribed height of that desk, according to the preset schedule.

In one embodiment, the height of each desk is programmed to move to a set height that is common to all desks (i.e., all desks will move to the same height value) in the controlled group, as represented illustratively in FIG. 13. According to another embodiment of the disclosure, each desktop is moved to the "stand" height set by and specific to each respective user (their highest worktop setting). In this embodiment, each desk will raise to a specific max height which may or may not be equal to the other desks in the group.

An important benefit to having all sit-stand desks pre-positioned at the "stand" position in the morning when the users arrive is that doing so encourages the users to actively use the sit-stand desk to benefit their respective health. Applicants have learned that there is a psychological benefit generated when a user arrives and sees their desk in the stand position. The user is more likely to start their work standing and is more likely to continue using the sit-stand schedule of their own desk throughout the day. By setting their sit-stand desk to its "stand" position at the start of the day, the user is reminded of the desk's main purpose—to encourage a healthy lifestyle and behavior.

Another benefit to having the worktops 414 all rise to a high setting at night, is that doing so provides better access for the cleaning crew to clean under and around each desk.

The present system could also lower each desk to a low height if desk includes sensors that allow the desk to stop in respond to contact with an obstruction or sense obstructions and not descend. This is not always a preferred approach so some desks only include functions that only automatically raise the desk.

It is not uncommon, in some installations to have hundreds of sit-stand desks arranged and online, in a single large group (such as at a call-center). In this environment, it is not uncommon for several or many desks to be unoccupied for extended periods of time, as different factors change the schedules and populations of workers throughout the group. Having the worktop 414 of some or many unused desks in the room remain in a "stand" or high-setting position for extended periods of time may be considered unsightly, or may otherwise interfere with daily operations as people move about in the room and between the desks. To address this concerns and according to another feature of this disclosure, user-data history for each desk and sensors located at each desk could be used to determine the occupancy of any desk in the group. If it is determined that any desk has not been occupied for a predetermined period of time, for example, at least 2 days in a row, local master controller 418 would flag those specific desks to remain at a low, "seated" height until the desks are used once again. By doing this, the present system would not force the worktops 414 of unused desks to remain raised at the "stand" or max positions for extended periods of time during work hours.

System for Remotely Powering Seat Structures:

Referring now to FIGS. 14-18, a system for remotely powering a seat structure is shown, including a chair 450 having a base 452, a central post 454, a seat portion 456, a backrest 458 and armrests 460. Chair 450 is shown positioned on a floor mat 462 in FIG. 14. As described in greater detail below, floor mat 462 includes at least one embedded primary induction coil 464 which is electrically connected to a charging control circuit (not shown) and is powered by line voltage (plugged into a nearby outlet—not shown).

Chair 450 may be conventional in structure in that base 452 includes a number of radially disposed, equally spaced legs 466 (usually five) radiating from central post 454, which is vertically disposed. Attached to the remote end of each leg 466 is a caster wheel 470, collectively allowing the chair to selectively roll along floor mat 462. Seat portion 456, backrest 458, and armrests 460 are either directly or indirectly mechanically supported by central post 454 and in turn support the seated user. In conventional use of chair 450, as is well known, a user sits on seat portion 456, leans back, as desired against backrest 458 and supports his or her arms on armrests 460, again as desired. The user may push their feet against floor mat 462 to cause the entire chair 450 to roll on caster wheels 470 along the floor mat in any planar direction, as necessary.

According to the present disclosure, and referring to FIGS. 15-18, a secondary induction coil and drive assembly 480 is secured to the underside of base 452. Assembly 480 includes an upper housing 482 and a vertically displaceable lower housing 484. Lower housing 484 supports a secondary induction coil 486, a drive wheel assembly 488, and location sensors 490. As mentioned above, lower housing 484 may be selectively displaced vertically with respect to upper housing 482, as described below. However, lower housing 484 is preferably snugly slidably engaged in a telescoping manner with upper housing 482, allowing relative vertical movement, but minimal relative lateral or transverse displacement. Lower housing 484 mechanically supports drive assembly 480, which, although not shown in great detail, includes a drive motor connected to a drive wheel 492 and drive circuitry. Drive motor (not shown) and drive wheel 492 are mounted to a pivotal frame (not shown) which can rotate about a central axis. A steering drive (not shown) is mounted within lower housing 484 and connected to the pivotal frame (not shown). Steering drive is connected to drive circuitry.

An actuator (not shown) is mounted to either lower housing 484 or upper housing 482 and is used to displace lower housing 484 with respect to upper housing 482 in a controlled manner. This actuator is preferably a servo type drive motor, but may also be a linear drive motor or solenoid, or a drive mechanism used in combination with an over-center spring arrangement. Regardless of the type of actuator used, the function of the actuator is to move lower assembly 484 between a lower position (shown in FIG. 18), wherein drive wheel 492 frictionally engages floor mat 462 and secondary induction coil 486 becomes immediately adjacent to the upper surface of floor mat 462, and an upper position (shown in FIG. 17), wherein drive wheel 492 and secondary induction coil 486 are remote from floor mat 462, as described in greater detail below.

Figure 14:
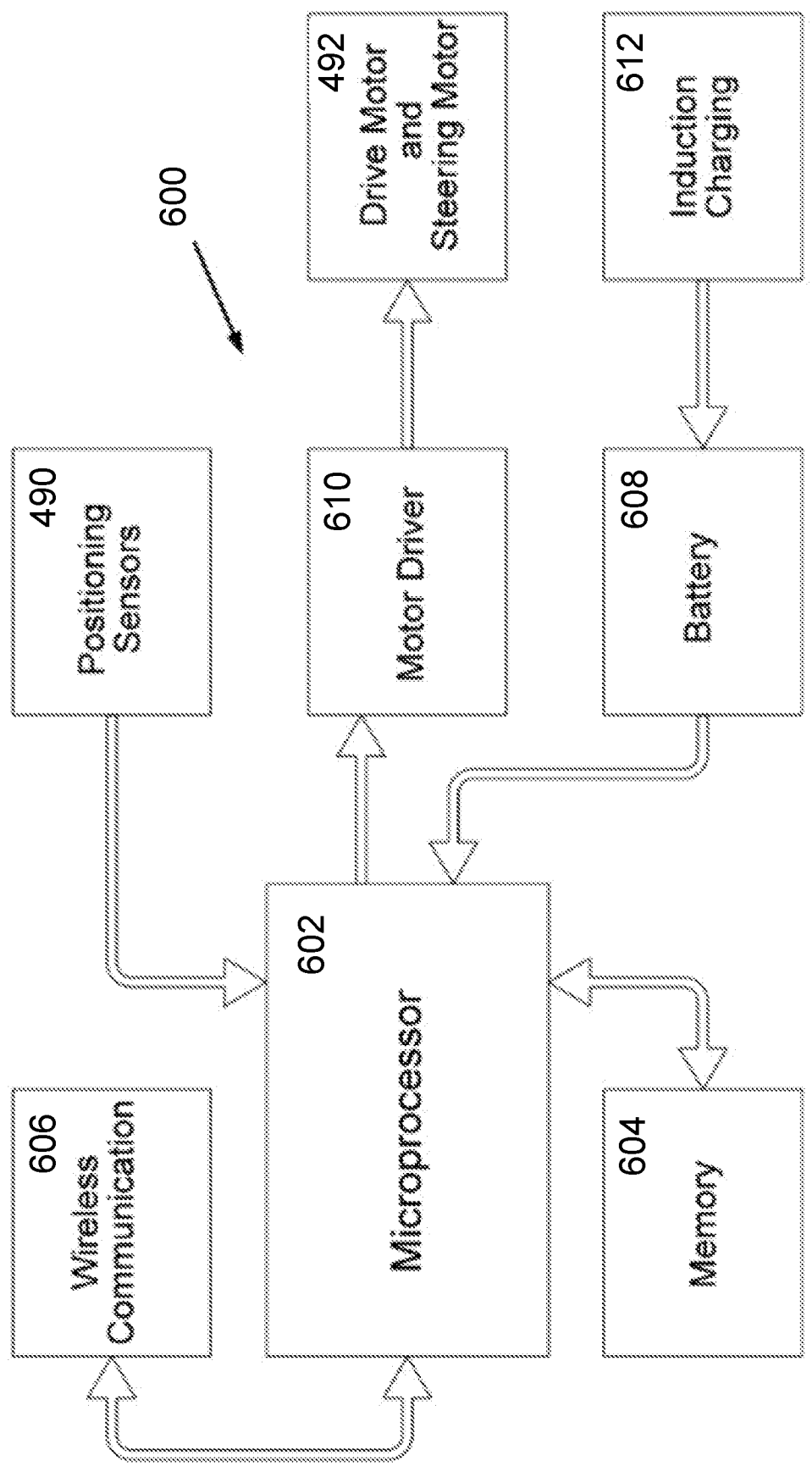
FIG. 14 is an operational schematic showing the different components used to operate various electrical functions of a chargeable mobile chair, according to the present disclosure.
Figure 15:
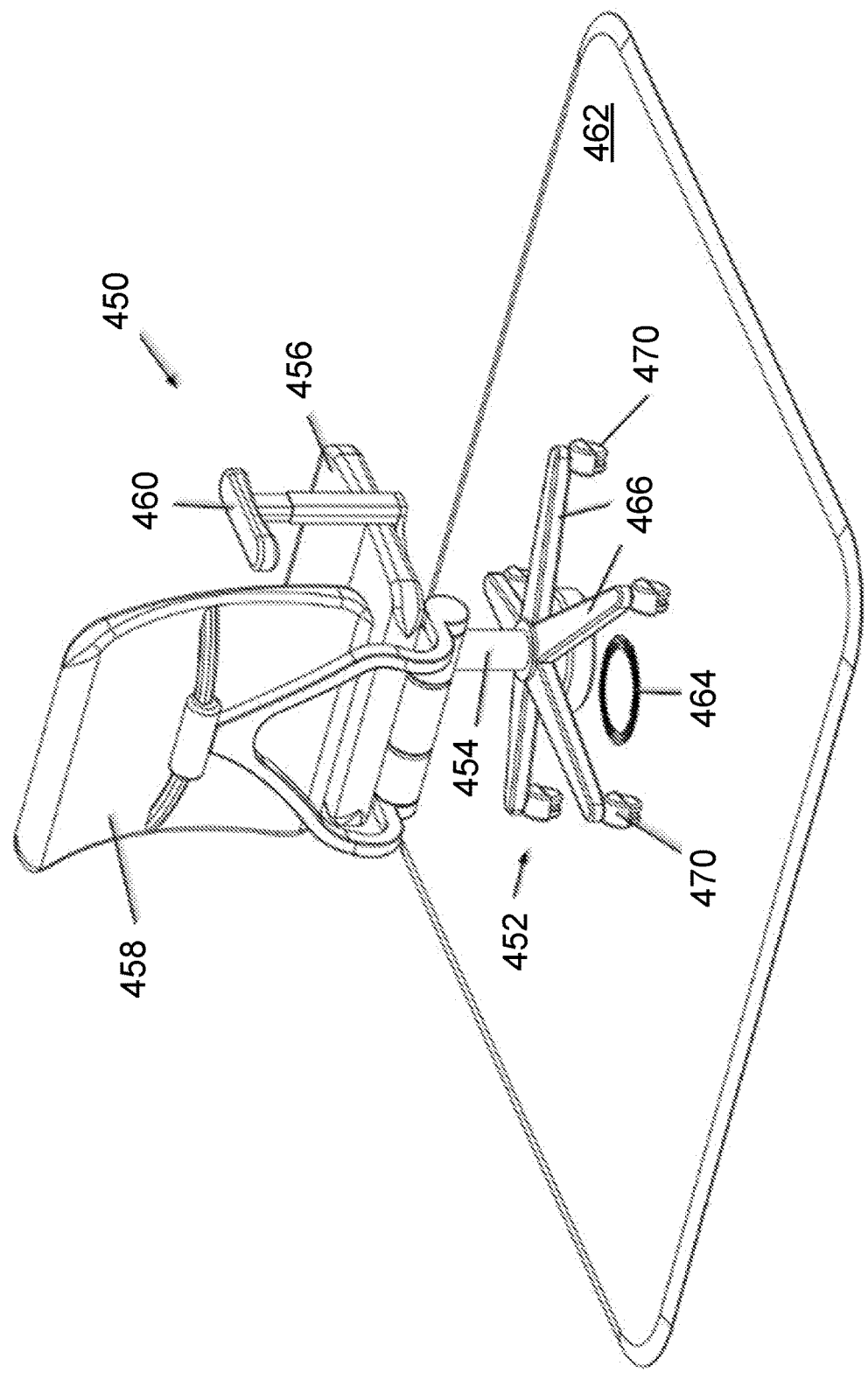
FIG. 15 is a perspective view of a mobile chair located on a chair-mat, showing details of an induction charging system, according to the present disclosure.
Figure 16:
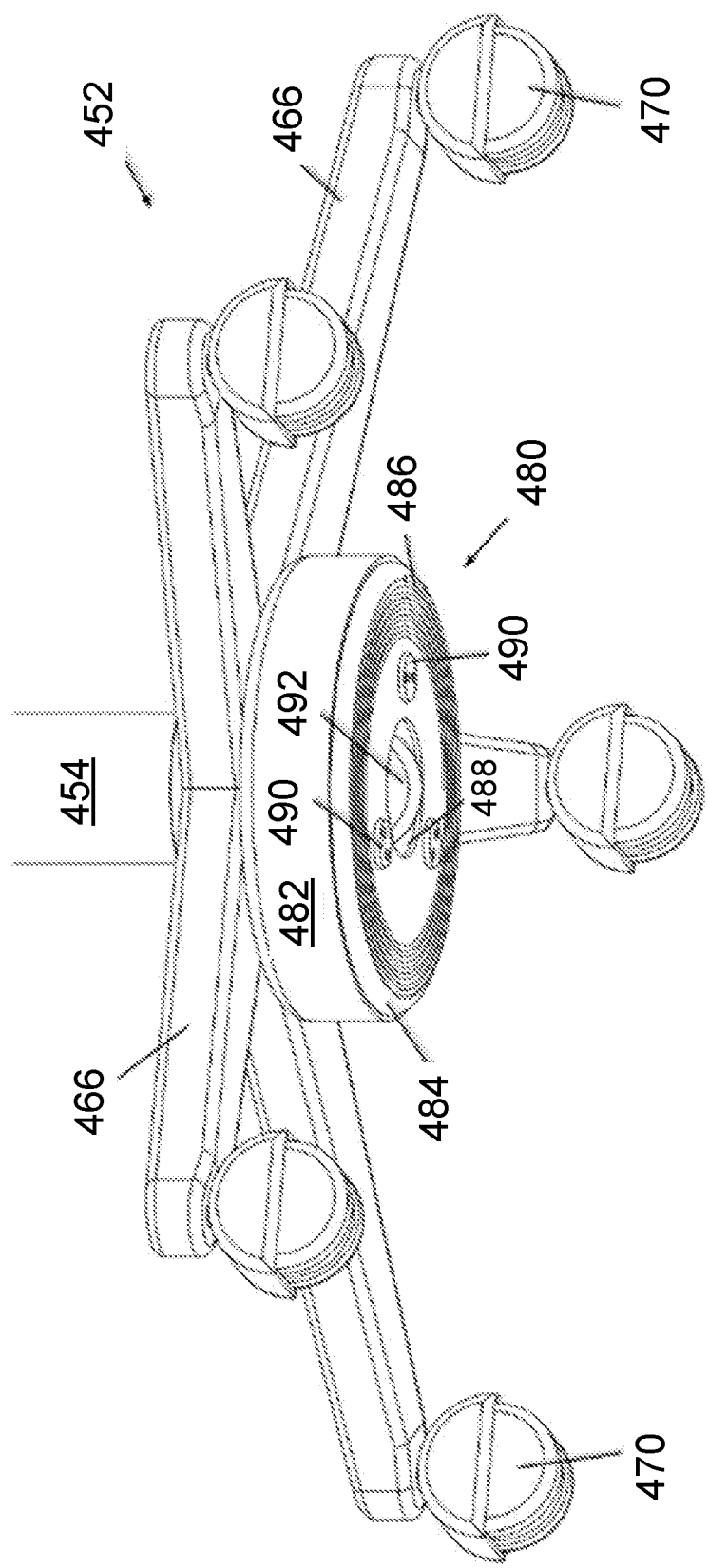
FIG. 16 is a perspective view of a portion of the mobile chair of FIG. 15, showing a chair base supporting the induction charging system of FIG. 15 with the system shown in a retracted and stowed position, according to the present disclosure.
Figure 17:
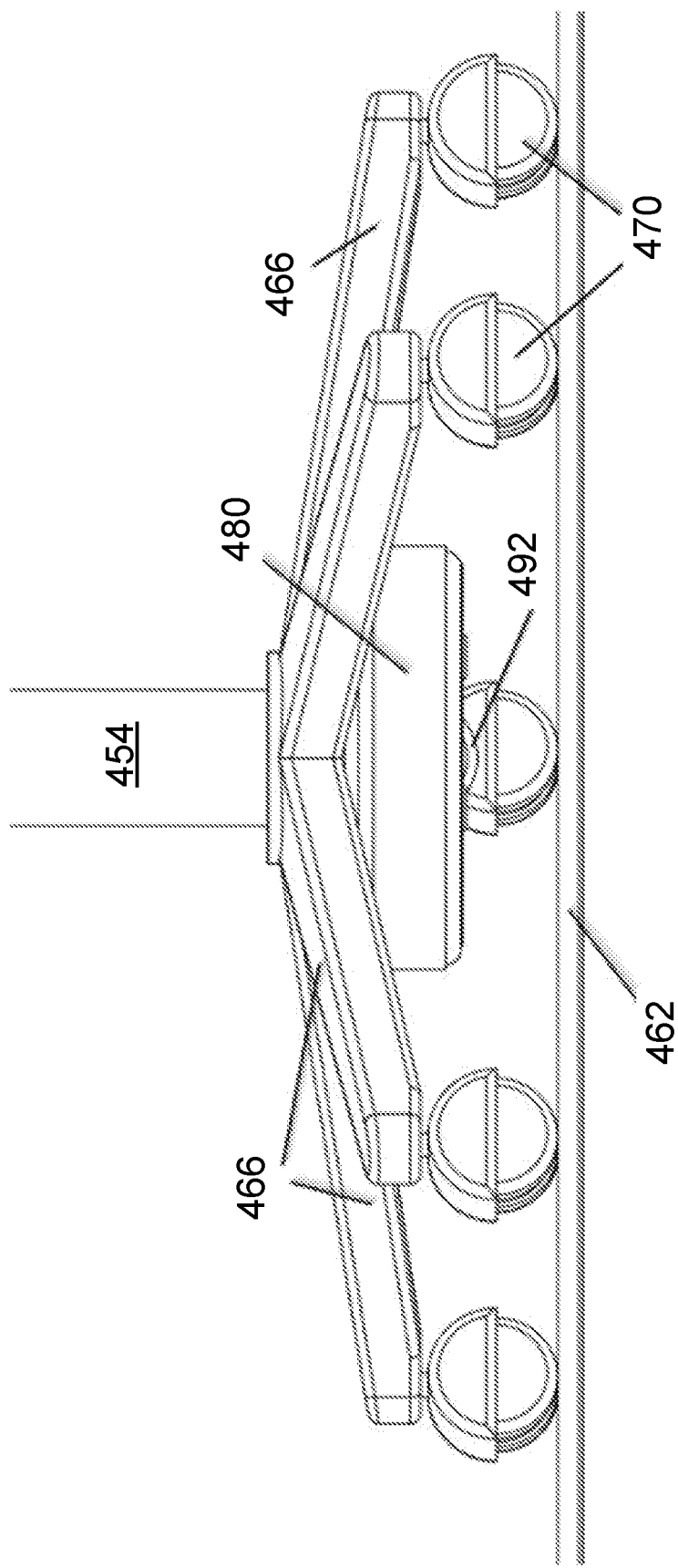
FIG. 17 is an elevation side view of the induction charging system of FIG. 16 with the system shown in a retracted and stowed position, according to the present disclosure.

As shown in the operational schematic of FIG. 14, a control circuit 600 includes a microprocessor 602, memory 604, wireless communication 606 and a battery 608. Control circuit 600 is located on chair 450 in an appropriate (preferably accessible, but hidden) location. Microprocessor 602 is connected a motor driver circuit 610, which in turn is connected to the above-described drive motor that powers drive wheel 492 and steering drive (not shown). Battery 608 is an appropriate rechargeable battery and is used to power all electronic components used on chair 450, including microprocessor 602, memory 604, wireless communication 606 and allow drive actuators described herein. Battery 608 is also electrically connected to an induction charging control circuit 612. Positioning sensors 490 are connected to microprocessor 602 to provide positioning information of chair 450 on mat 462, as described in greater detail below.

Figure 18:
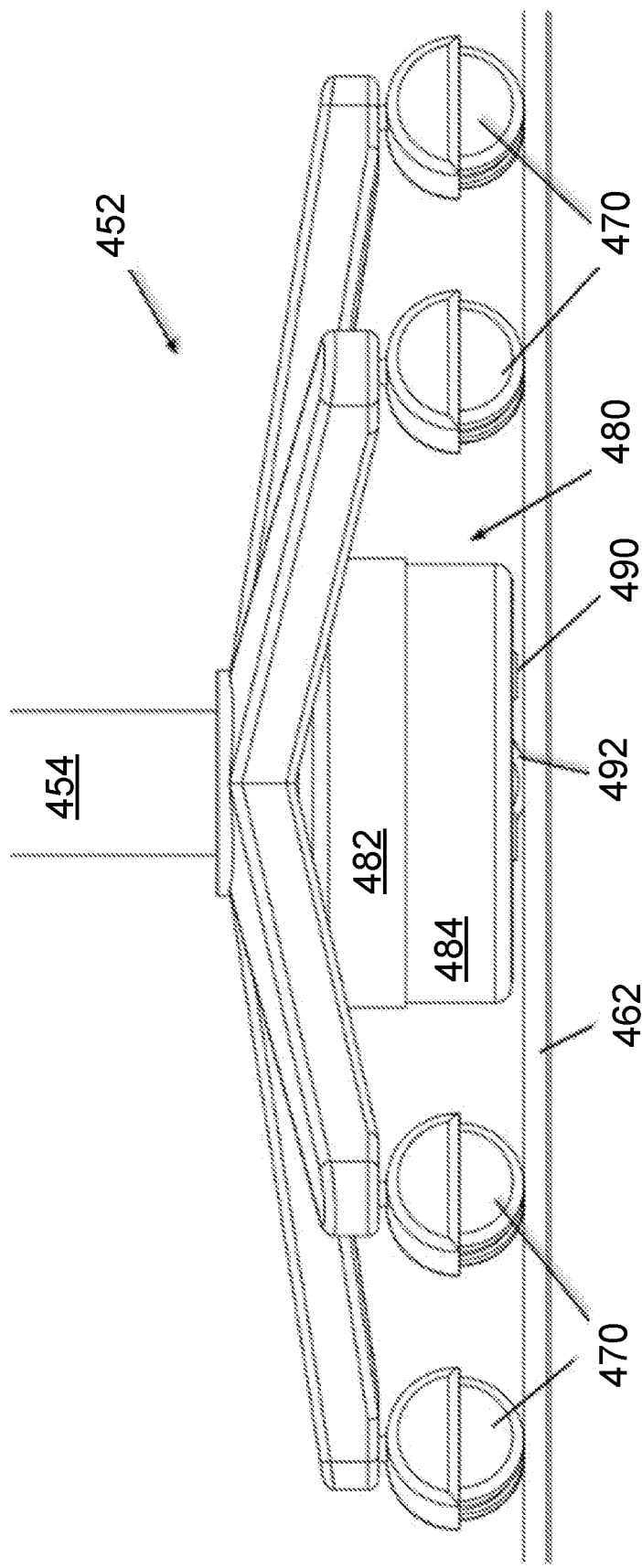
FIG. 18 is an elevation side view of the induction charging system of FIGS. 16 and 17 with the system shown in an extended and deployed charging position, according to the present disclosure.
Figure 19:
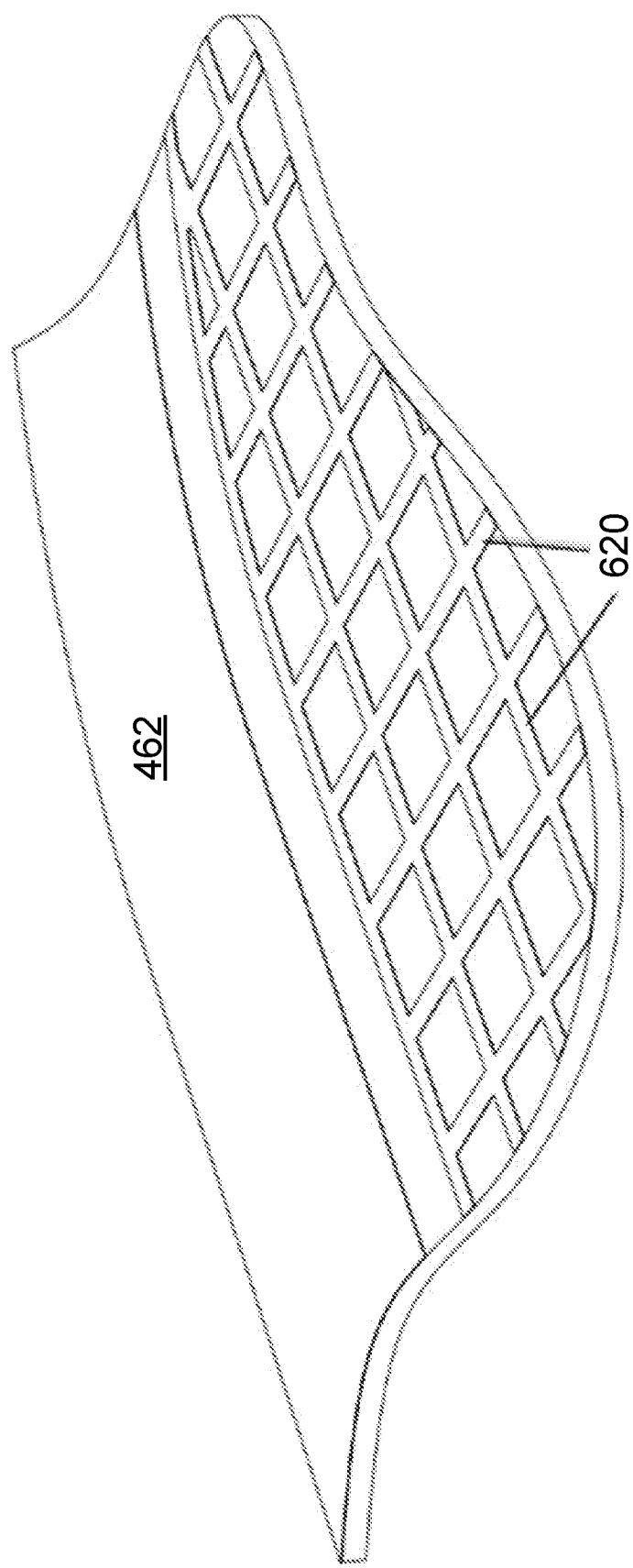
FIG. 19 is a partial close up sectional view of a floor mat, showing details of registration lines that are used to help locate the position of the chair, according to the present disclosure.
Figure 20:
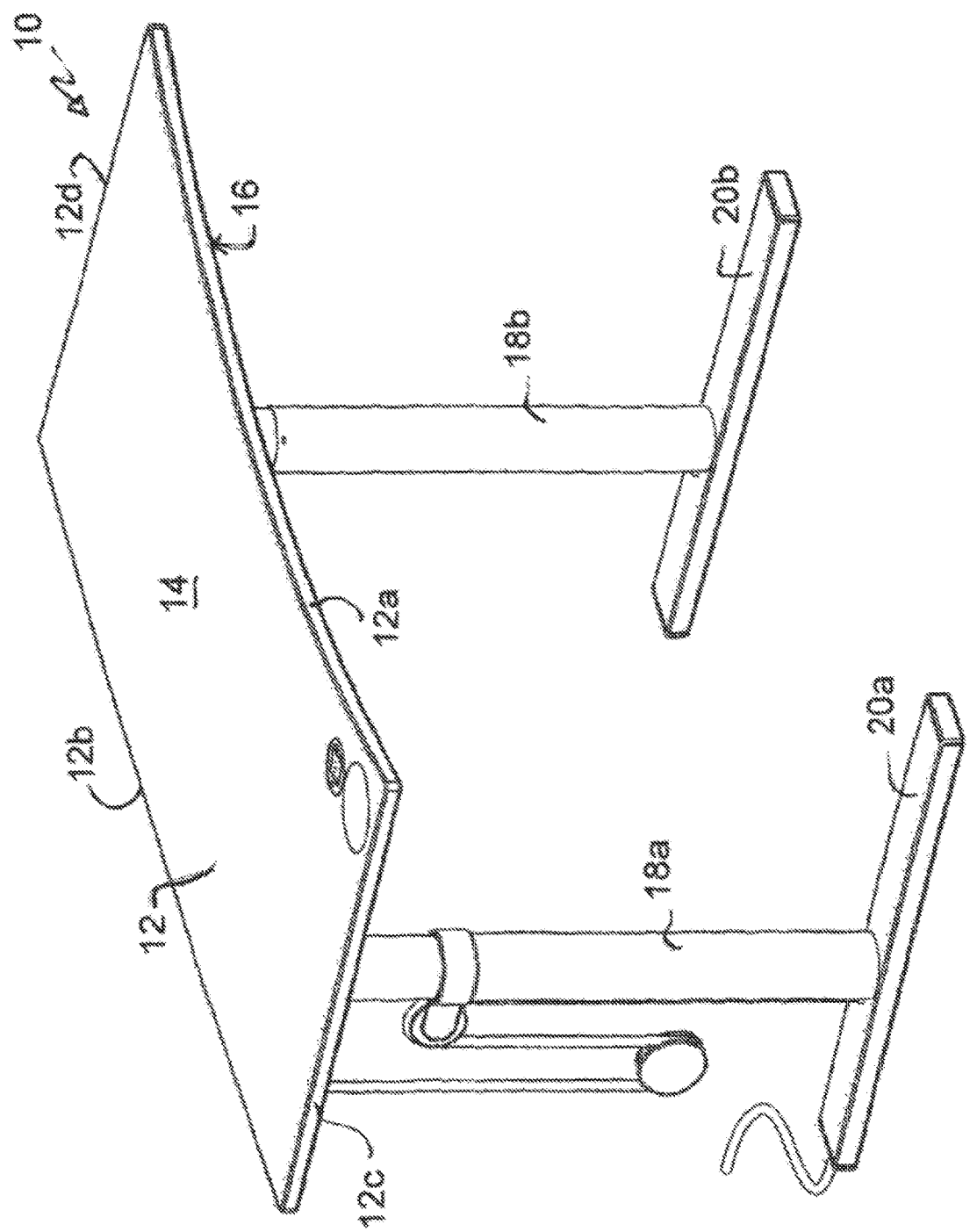
FIG. 20 is a front perspective view of a sit-stand workstation, according to the disclosure including a frame structure having two vertically displaceable legs each of which being attached to a base at a lower end and attached to a common support at an opposing upper end, a control unit and a power cord system, the desk shown in a lowered position.
Figure 21:
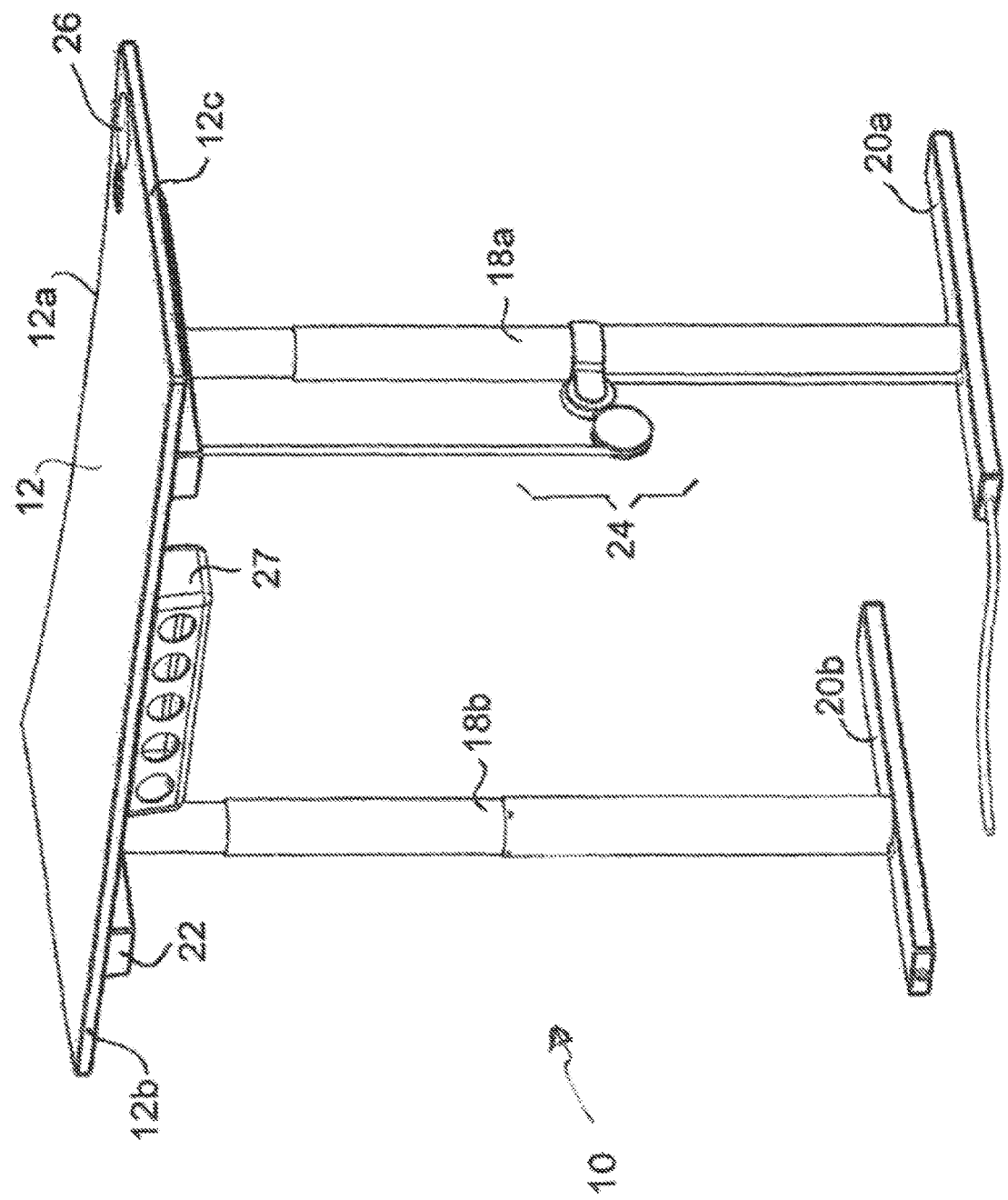
FIG. 21 is a rear perspective view of the sit-stand workstation of FIG. 20, shown in a raised position and showing a cord management box, according to the disclosure.
Figure 22:
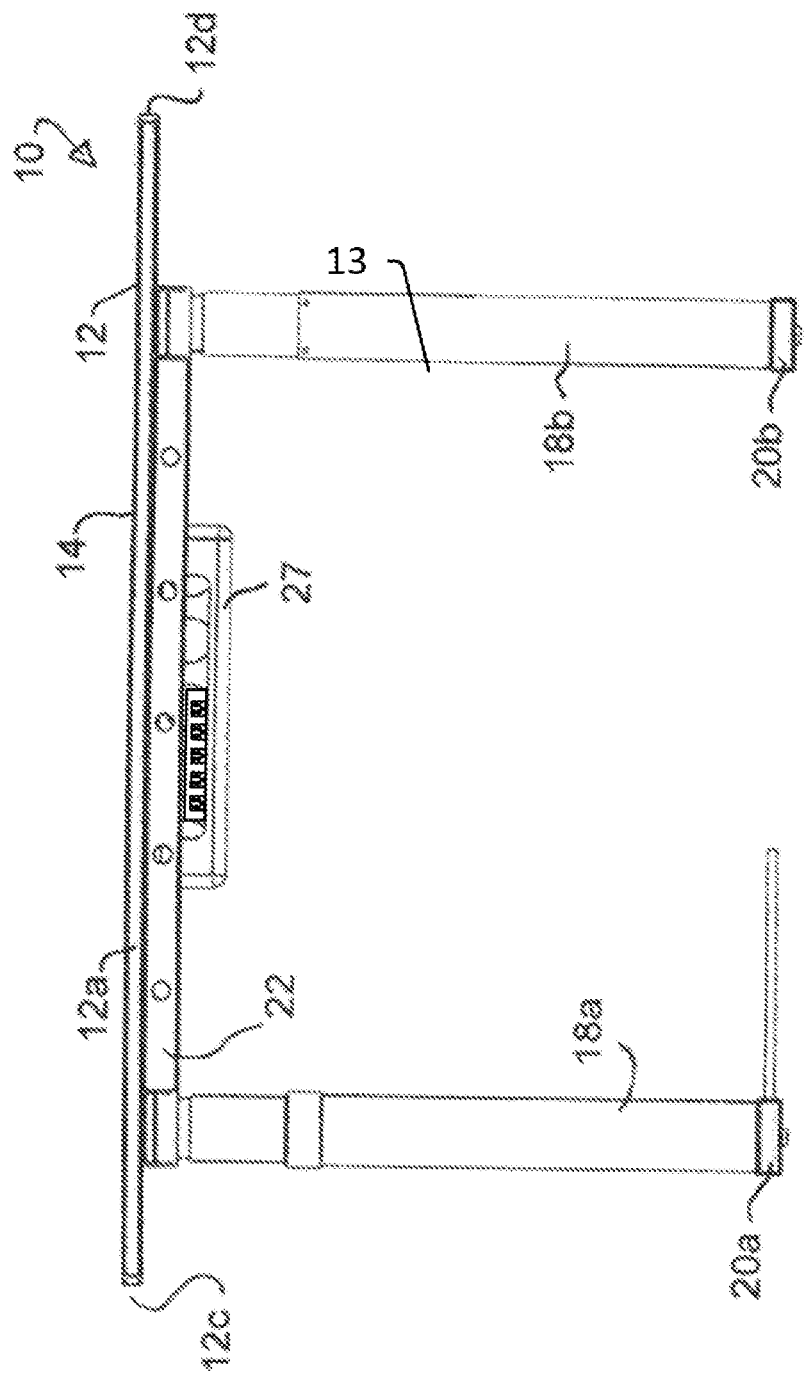
FIG. 22 is a front elevation view of the sit-stand workstation of FIG. 20 shown in a lowered position, according to the disclosure.

Referring to figure FIG. 18, a section of floor mat 462 is shown including a plurality of lines 620. The lines are preferably printed onto mat 62 and thereafter coated with a protective coating so that lines 620 will not wear out during use. Lines 620 are sensed by sensors 490 and used to help control circuit determine the exact location of chair 450 on mat 462. Lines 620 can vary in width, and/or vary in spacing therebetween. This controlled variation in either line width or line spacing is accurately measure by sensors 490, similar to how a conventional laser mouse reads a mouse pad to determine relative location and movement. As explained below, when lower assembly 484 is positioned in the lower position (as shown in FIG. 18), sensors 490 become immediately adjacent to mat 462 and lines 620. As chair 450 is moved across mat 462, sensors 490 move across lines 620 and measure their unique characteristics, such as line width and line spacing and send this information to microprocessor 602 during operation, as described below. In this embodiment, sensors 490 are laser emitter and receiver type, but sensors 490 may be other types, including infrared or magnetic (Hall sensors), in which case, lines 620 would be made from a magnetic material so that they would be detectable by the Hall type sensors.

In use of chair 450, battery 608 is initially fully charged and any electrically-powered accessories of chair 450 can be used throughout the day by a user. Microprocessor 602 carefully measures the charge of battery 608, as it discharges. When the charge remaining on battery 608 reaches a certain level, microprocessor 602 will activate an audible (sound), visual (LED), or tactile (vibration) alert to the user, indicating that the battery is low and that charging is required for that night. It is preferred that control circuit will charge battery 608 frequently enough to always allow the user with full use of all electrical accessories during each day. When battery 608 requires charging and the user is so alerted by microprocessor 602, the user may (if he or she remembers) manually position chair 450 to align over primary charging coil 464 located in mat 462. Since charging coil 464 is embedded within mat 462, a visual mark (not shown in the drawings) is preferably provided on the mat surface so that the user may easily see coil 464 during chair alignment. If the user does manually move chair 450 over primary coil 464, the user will activate a button or switch on chair 450 (not shown) which will cause control circuit to deploy lower assembly 484. This will cause secondary coil 486 to become immediately adjacent to primary coil 484. In such instance, a charging circuit (not shown) located within mat 462 will detect that the two coils are aligned and will activate primary coil 464 (allowing current to flow therethrough). As is well known, the current flowing in primary coil 464 will induce a charge and current to flow in the adjacent second coil 486, which will in turn be used to charge battery 608 located on chair 450.

Should the user forget to move chair 450 into the coil-aligned charging position, control circuit 600 will do it automatically. Once battery charge passes a predetermined threshold, and the time of day reaches a predetermined time (e.g., 9 PM), and sensors detect that a user is not seated in seat rest 456 (by measuring load thereon) microprocessor 602 will activate motor driver 610 to drive actuator (not shown) to move lower assembly 484 from its raised and stowed position, shown in FIG. 17, to its lowered position, shown in FIG. 18. In the lowered position, drive wheel 492 will frictionally contact the upper surface of floor mat 462.

Once drive wheel is fully lowered, control circuit will power the motor attached to drive wheel 492 causing chair 450 to roll about mat 462. During this initial drive period, sensors 490 located on the lower surface of lower assembly 484 will accurately read lines 620 located within mat 462. This detection and reading of lines 620 will allow microprocessor 602 to determine the chair's location on mat 462. Microprocessor 602 will then control drive motor and the steering motor to effectively move chair 450 so that secondary induction coil 486 aligns with primary induction coil 464, allowing charging to commence.

Once charging completes (either battery 608 is fully charged or after a prescribed time period), an appropriate motor will be activated to return lower assembly from its deployed position back to its retracted and stowed position.

Should chair 450 be moved when lower assembly 484 is in its deployed position, sensors 490 will immediately detect this and microprocessor 602 will instantly raise lower assembly 484 so that drive wheel 492 no longer contacts floor mat 462. After a period of time, as long as chair 450 is not moving and no person is detected seated thereon, lower assembly 484 will again be deployed, drive motor will again activate so that sensors 490 can determine the chair location on mat 462 and control circuit 600 can again drive motors to move it back to the charging location so that charging may continue.

Workstation Structure:

Referring to FIGS. 20, 21, 22, 23 and 24, a height-adjustable workstation 10 is shown in accordance to the disclosure. The workstation is shown in a lowered position in FIGS. 20, 22, and 23 and in a raised position in FIGS. 21 and 24. The term "workstation" refers to a desk or a table or any other structure that includes a work surface or otherwise supports a machine or device, and can be of any size or shape without departing from the disclosure, described below. According to this preferred embodiment, workstation 10 includes a panel-like planar worktop 12, defining a work surface 14 and an underside 16, a lower support frame that includes two supporting pedestals 18a, 18b and two bases 20a and 20b, an upper support frame 22, a cord tensioning assembly 24, a control unit 26 and wire management box 27.

Worktop 12 includes a front edge 12a, a rear edge 12b, a left side edge 12c and a right side edge 12d. Worktop 12 can be any size and shape and made from any appropriate strong and rigid material, such as wood, metal, glass, particle board, Medium Density Fiberboard (MDF), High Density Fiberboard (HDF), reinforced plastic, or reinforced composites and laminates, or combinations thereof, as is well known by those skilled in the art. Since worktop 12 is meant to be raised and lowered at regular intervals, as described below, it is preferably made from a lightweight, rigid material with a durable work surface 14. As mentioned above, worktop 12 can take on any shape, but as shown and described in this application is preferably generally rectangular between about 4 feet and 6 feet long (measured between side edges 12c and 12d) and between about 26 and 36 inches deep (as measured along either side edge 12c or 12d). In this application, front edge 12a is shown curved inwardly to accommodate the user.

Figure 26:
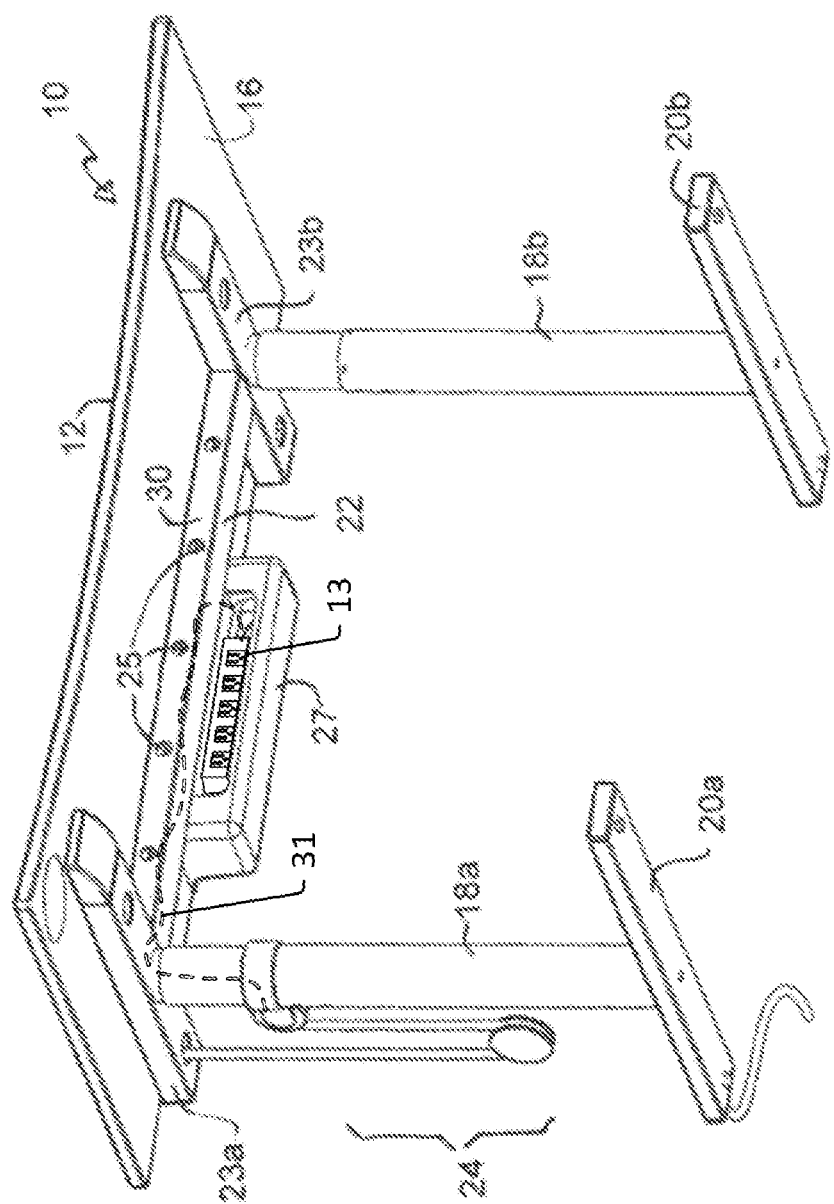
FIG. 26 is a lower perspective view of the sit-stand workstation of FIG. 20 shown in a lowered position, according to the disclosure.
Figure 27:
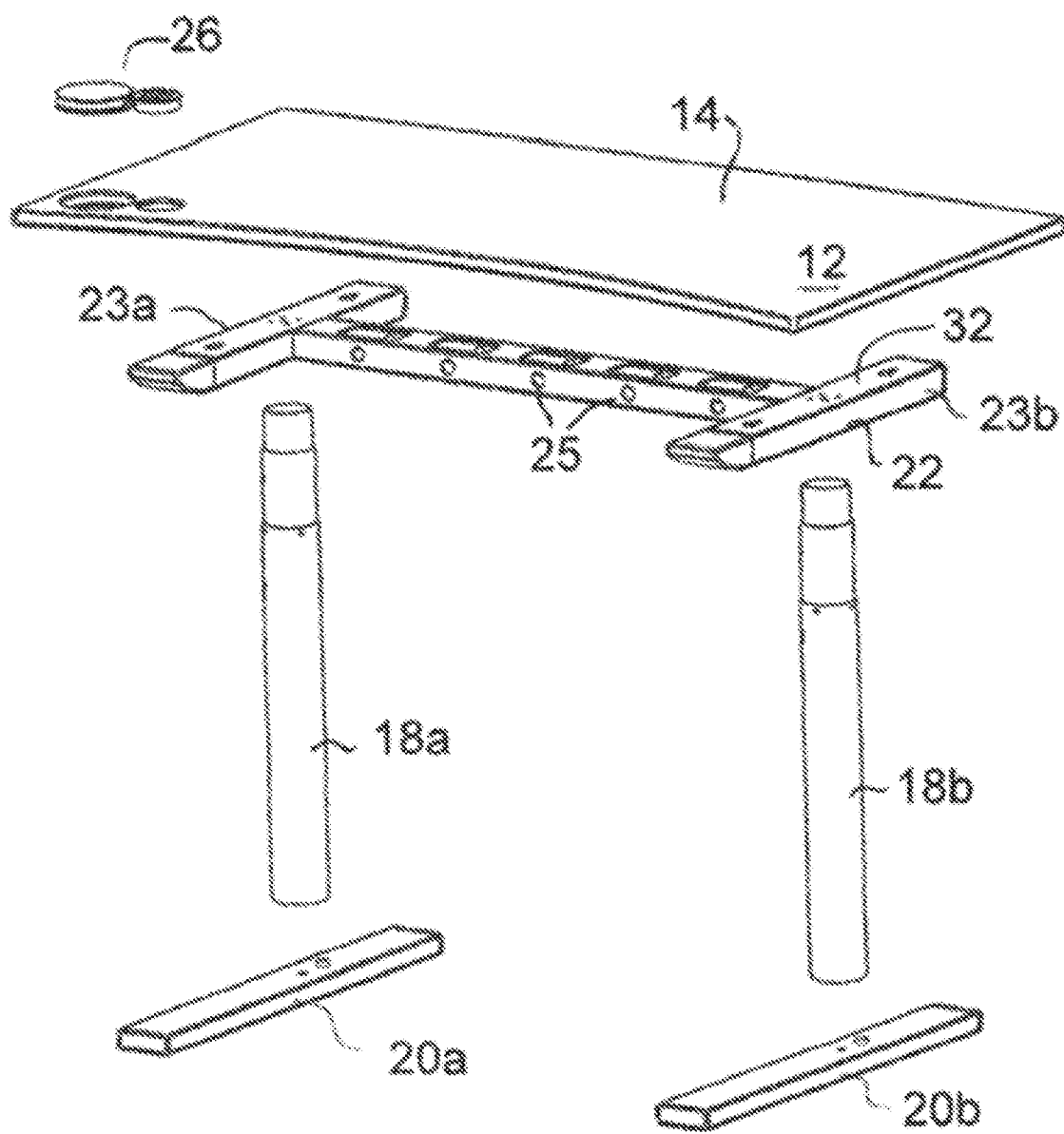
FIG. 27 is an upper perspective assembly view of the sit-stand workstation of FIG. 20, according to the disclosure.
Figure 28:
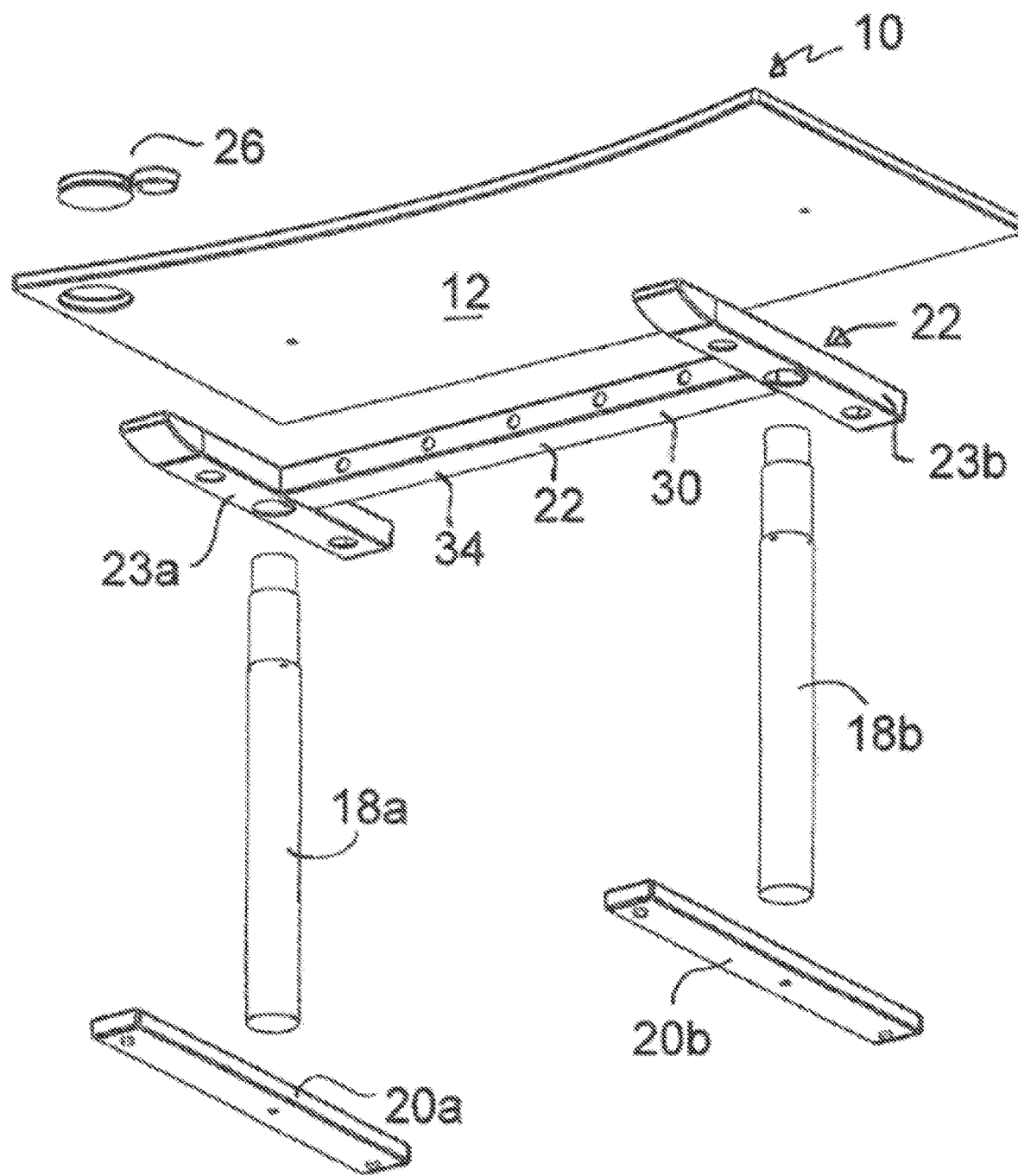
FIG. 28 is a lower perspective assembly view of the sit-stand workstation of FIG. 27, according to the disclosure.

Upper support frame 22 may be of any shape, but is preferably "H" shaped, as shown in FIGS. 26, 27, and 28, and includes two side sections 23a, 23b, connected to a central crossbar 30. These three parts are preferably hollow-box-formed and made from steel or aluminum. Each part is welded to each other to form a structurally rigid single body and defines an upper frame surface 32 and a lower frame surface 34. As described below, upper support frame 22 is connected to pedestals 18a, 18b and provides a rigid connection between the two and also provides a connecting platform to which the worktop 12 can be secured. Upper support frame 22 is preferably made hollow and includes a multitude of wire ports 25 through which various wires and cords may selectively pass between wire management box 27 (not shown in FIGS. 27 and 28, but shown in FIG. 26) and various electrical devices used either on the work surface 12 or in the immediate area.

Each pedestal 18a, 18b is preferably of the type that includes two or more vertically telescoping tubular sections and are each designed to selectively collapse and extend linearly between a lowest height, preferably about 20 inches, and a highest height, preferably about 48 inches. At least one, but preferably both pedestals 18a, 18b includes a drive mechanism (not shown). The drive mechanism is preferably located within the pedestal structure and can be electronically and accurately driven to control the exact magnitude of linear displacement (extension or retraction), and therefore the exact height of worktop 12, as measured between the floor and work surface 14. The drive mechanism preferable includes an electric motor (not shown) connected to a lead screw (not shown) wherein the lead screw engages a threaded follower. The follower is mechanically secured to a rigid portion of the pedestal structure so that as the motor rotates the lead screw, the follower is forced along the lead screw and in turn, causes linear displacement of the pedestal, as dictated by the sliding telescoping components of the pedestal.

Although the above arrangement is preferred, other mechanisms may be employed to raise and lower the work surface 14, as those of ordinary skill in the art are well aware, including a system of pulleys and cables, toothed belts, and/or appropriate bar linkages (e.g., four-bar linkages). Each of these systems may be used to effectively mechanically linearly displace each pedestal 18a, 18b, as instructed. Instead of an electrical drive motor, the linear drive mechanism for linearly displacing the pedestals may alternatively be derived from an appropriate pneumatic or hydraulic drive system or a magnetic linear motor, as understood by those skilled in the art. Appropriate linear drive systems for pedestals 18a, 18b are commercially available by several companies, such as: Joyce/Dayton Corp. of Kettering, Ohio. Regardless of the drive mechanism used, the drive mechanism is able to selectively raise and lower worktop 12 with respect to the lower frame (and the floor).

Referring to FIGS. 27 and 28, and regardless of the type of drive mechanism used to control the linear displacement of each pedestal, a lower end 19a, 19b (usually the telescoping section of largest diameter) of each pedestal 18a, 18b, is mechanically secured to base 20a, 20b and an upper end 21a, 21b is mechanically secured to upper support frame 22 using appropriate mechanical fastening means, such as bolts, welding, brazing, or friction (such as mechanical clamps), or a combination thereof, as long as the end result is that the each pedestal 18a, 18b is firmly mechanically affixed to both base 20a, 20b and upper support frame 22 to create a stable and strong structure. Although not shown, depending on the material and structural details of the different components of work station 10 a cross bar may be required to ensure a sturdy rigid structure that mitigates racking, listing and side-to-side wobbling.

Worktop 12 is secured to an upper side of upper support frame 22 using any appropriate fastening means, such as screws, bolts, rivets, adhesive or an appropriate mechanical friction means, such as clamping, so that underside 16 of worktop 12 contacts upper support frame 22 and so that worktop 12 becomes firmly affixed to upper frame surface 32 of upper support frame 22.

Bases 20a, 20b, pedestals 18a, 18b, and upper support frame 22 are all preferably made from a strong rigid material, such as steel or aluminum, but other materials can be used for all or some of these components, including wood, other metals and metal alloys, composites, plastics, and even the use of glass is contemplated.

Figure 29:
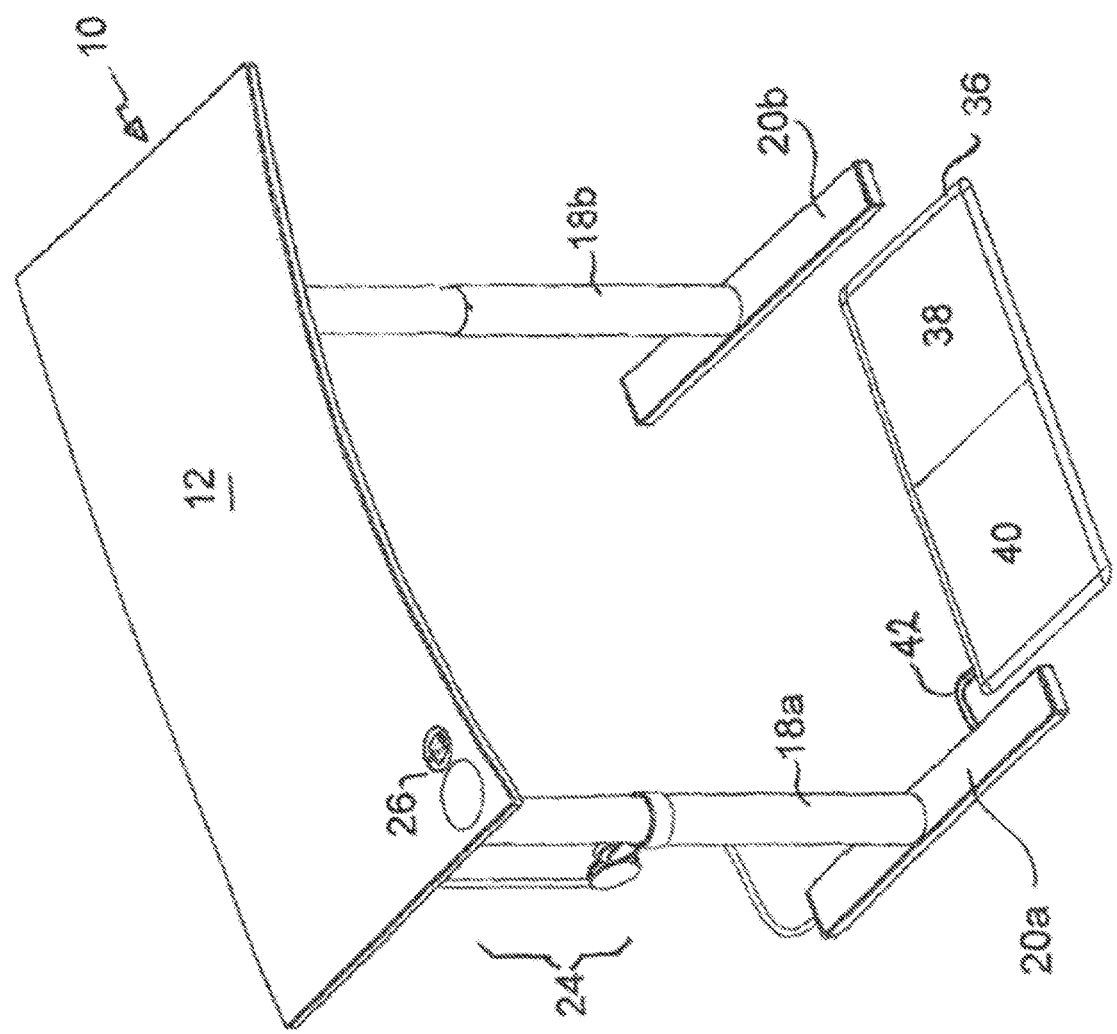
FIG. 29 is a perspective view of the sit-stand workstation of FIG. 20 showing a pressure mat, according to another embodiment of the disclosure.
Figure 30:
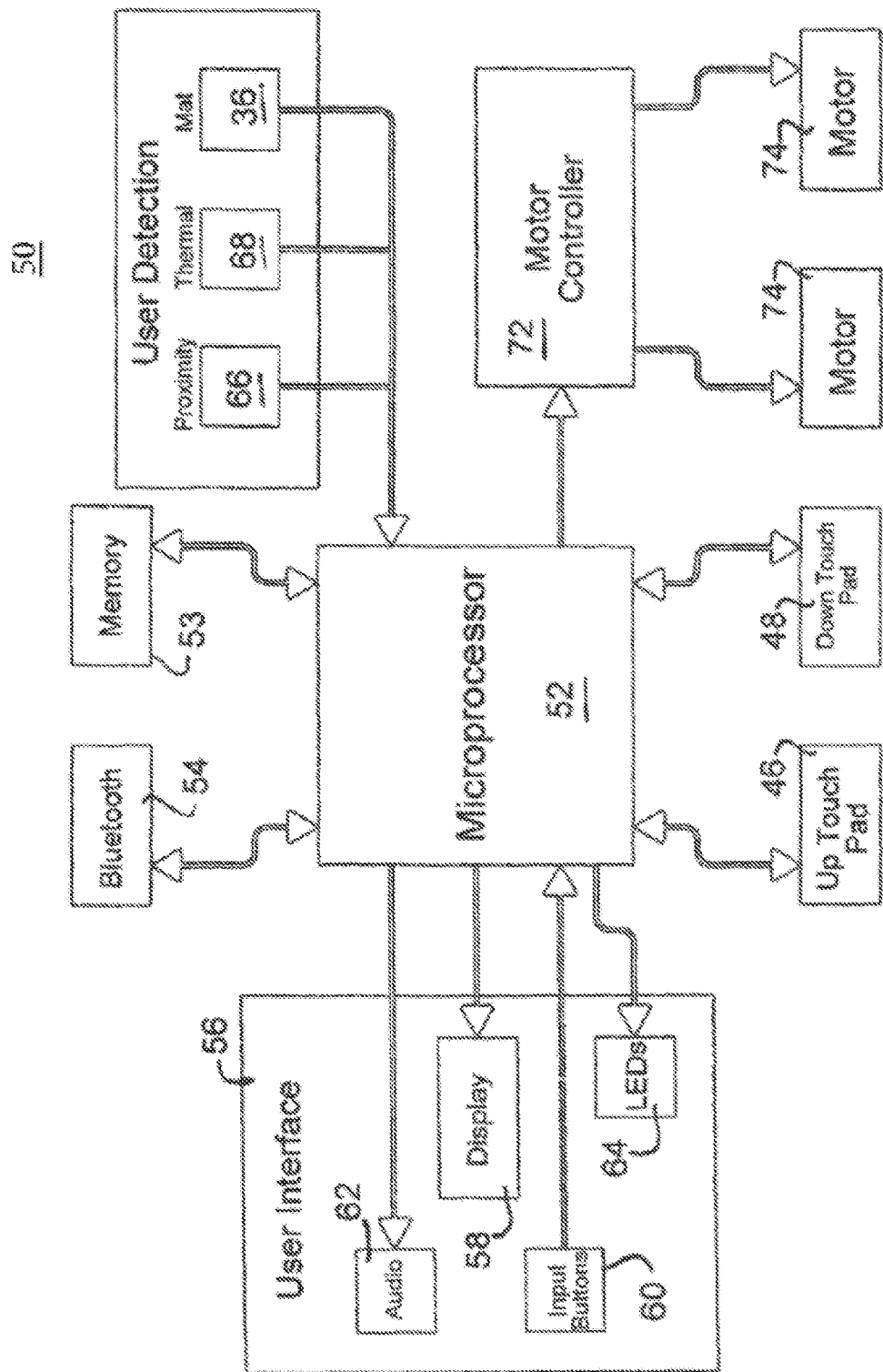
FIG. 30 is an electrical system schematic showing details of a control unit and peripheral sensors and devices, in accordance with the present disclosure.

Referring to FIG. 29, work station 10 is shown according to another embodiment of the disclosure wherein a pressure-sensitive mat 36 is provided, positioned on the floor in front of work station 10 and between bases 20a, 20b. Mat 36 includes appropriate circuitry (or other internal structure) to detect and measure isolated pressure within predetermined zones, preferably a right pressure zone 38 and a left pressure zone 40, but other zones are contemplated. The circuitry used within mat 36 is preferably a simple and reliable circuit, such as a strain-gauge system commonly used within conventional electronic scales or even within the floor step-unit of a Wii gaming system, or the pressure mats used to operate the automatic door-opening mechanisms of a grocery store. Mat 36 is electrically connected to control unit 26, either directly using electrical cord 42, or wirelessly using a wireless system (transmitter and receiver), such as Blue-Tooth®, other RF, or infrared. Mat 36 is used to detect and measure the following, according to the disclosure:

v) If a person is located in front of workstation 10;
  w) If that person is standing;
  x) If that person is sitting;
  y) The weight of that person (used to track the person's weight and also can be used as a user identifier); and
  z) Fatigue, by detecting repeated and more frequent weight shift from one foot or zone to the other.

Applicants further contemplate using mat 36 as an input device to help the user communicate to workstation 10, perhaps to raise or lower the work surface 14, or perhaps to cancel a planned height-change event, or to allow the user to perform a bit of exercise while standing, similar in concept to the Wii gaming system.

Also, mat 36 can include transducers (not shown) that would generate mechanical vibration in response to received signals sent to mat 36 from control unit 26 as a means for workstation 10 to communicate to or alert the user. Mat 36 is preferably made from a strong durable material, such as plastic, or rubber or composite and is powered by on-board batteries, or powered from a power unit located within workstation 10. Such mats are well known and the specific internal construction and internal operational details are beyond the scope of this disclosure. A well-known example of a pressure sensitive mat switch is commonly used at grocery stores to detect the presence of a customer entering or exiting and to then activate a motor-drive unit to automatically open the door.

Control Unit:

According to the present disclosure and referring to FIGS. 25, 27, 28 and 30, control unit 26 is shown including a display and input unit 44, an upper touch pad 46 and a lower touch pad 48. Control unit 26 preferably includes a control circuit 50 having a microprocessor 52, memory 53, a Blue-Tooth® module 54, and a user interface 56. User interface includes a display 58, such as an LCD display, input switches 60, an audio circuit 62 and status LED lights 64, all electrically connected to microprocessor 52 in a manner to provide the desired operation in accordance to the present disclosure, as explained below. User-detection transponders, such as an ultrasonic range finder 66, a thermopile 68, pressure mat 36 (shown in FIG. 29 and described above), and a microphone 70 are electrically connected to control circuit 50 so that electrical input signals from these remote transponders can be considered during operational decisions of work station 10, as explained below. Electrical connection of the above described components of control unit 26 are well known by those of ordinary skill in the art and are therefore not described in any great detail here.

A motor control circuit 72 is used to drive each drive motor 74 in response to electrical command signals from the connected control circuit 50, as described below. Motor control circuit 72 may be located within each respective pedestal, 18a, 18b, adjacent to each motor located therein. As explained above, drive motors 74 are used to raise and lower work surface 14, as needed. Control circuit 50 further includes various connectors that allow peripheral and other devices to be hard-wire connected to control circuit 50 and therefore to microprocessor 52, as desired or as necessary for proper operation.

As mentioned above, user interface includes display 58, input switches 60, an audio circuit 62 and status LED lights 64. Display 58 functions to communicate to the user both alphanumerical data and visual data during use of workstation 10. In accordance with the present disclosure, display 58 preferably changes background color to help convey certain information regarding the operation of workstation 10, the performance of the user, or to provide psychological encouragement or concern, depending on the on-going performance of the user. For example, if the user is on target or within 5% of meeting his or her goals for time standing, then display 58 will appear green (see left up to right cross hatching of screen 58 in FIG. 25). Following this example, a yellow color showing on display 58 will indicate a slight departure from the height-management schedule and a red color could show for a short period of time if and when a particular scheduled raising event is cancelled by the user. Display 58, according to the disclosure is also used to indicate various numerical information during the setup and operation of workstation 10, such as any inputted data including the user's weight, height and age, the date, the time, etc., and various operational data, such as current height of the work surface, current time and date, and desired and current standing time in percentage or hours and minutes (see display 58 in FIG. 25). Display 58 can also indicate an estimate of current calories burned for that day, calories burned for the month, etc. and even a rate of calorie-burn at any given time. For encouragement, Applicants contemplate calculating and displaying an equivalent "age number" as an estimate of improved health that the user would be considered equal to, a kind of representative fitness indicator. The number would be displayed automatically if the number shows a younger age than that of the user, and displayed by request regardless of the age.

Input switches (or buttons) 60 are used to allow the user to input information and control different functions and modes during the operation of workstation 10. Input switches 60 can be any conventional type electric switch, such as a simple momentary push-button membrane switch, a capacitive-controlled "touch-sensitive" contact switch, or even as an "on-screen" switch, provided within display 58 as a touch-screen input device. Regardless of the type of switches used, Applicants recognize the need of a sealed user interface to prevent or at least discourage dirt, dust, crumbs, or any liquids from reaching any internal circuitry of control unit 26.

According to one embodiment of the disclosure, at least two input switches are large capacitive-controlled "touch-sensitive" contact surface pads, a move-up lower touch pad 48 located on the underside 16 of worktop 12, and a move-down upper touch pad 46 located on work surface 14 of worktop 12. According to this embodiment, if a user just touches move-up lower touch pad 48 with his hand, the "switch" would "close" and this condition would be instantly detected by microprocessor 52 during routine interrogation, which would then immediately send a signal to motor control circuit 72, which would, in-turn, cause drive motors 74 to automatically activate to raise worktop 12. The fact that move-up lower touch pad 48 is located under worktop 12 allows the user's hand to move up with the table, giving the user a better sense of control since the user's hand rising with the table would effectively be lifting the table. This arrangement provides effective bio-feedback to the user. Similarly, having the move-down switch located on the top of the table allows the user's hand to move down with the table.

Applicants contemplate providing each up/down capacitive switches with an adjacent momentary pressure membrane switch. This arrangement, for example would allow the user to raise or lower the worktop 12 at a first speed just by lightly touching the capacitive switch and then selectively increase the rate of height displacement by pressing the same switch a bit harder so that the adjacent pressure membrane switch is activated. Control circuit 50 would be programmed to control the speed of the motors in response to the detected condition of both the capacitive switch and the pressure switch for both up and down directions. The switch can be in the form of a touch-screen wherein a graphic switch or similar can be displayed on the screen to convey a switch function. The user merely has to touch the screen on the switch graphic to effectively generate a "start" command, which is sent to the control circuit (the "start" command may not necessary be generated by the switch itself, but may instead be created within the control circuit in response to detecting that the switch has been activated-either moved to cause the worktop to move up or down or change speeds, as understood by those skilled in the art). Once the control circuit "receives" the start command, the control circuit sends a signal to motor control circuit 72, which would, in-turn, cause drive motors 74 to automatically activate to raise worktop 12.

One Touch Operation:

According to another embodiment of this disclosure, control circuit 50 and the controlling software program is such that the user only has to touch either the upper touch pad 46 or the lower touch pad 48 a single time to instruct the microprocessor 52 to activate drive motors 74 to move worktop 12 either up or down to a preset or predetermined height. In this arrangement, the user only has to touch the touch pad (46 or 48) a single time and then release (just a tap or a swipe with the finger or palm). This feature is unlike conventional sit-stand workstations of the prior art which require that the user hold the switch constantly for the motor to remain activated during the travel of the worktop to the desired height. The prior art workstations use this continuous hold-down requirement as a safety feature so that the worktop does not accidentally hit anything during its movement.

The pedestals of the present disclosure preferably include an automatic safety cutoff system which will automatically deactivate drive motors 74 instantly should any part of workstation 10 contact an obstruction during movement. Such a cutoff system can be Piezo-electric based, or based on IR proximity type sensors, or other type of sensors, as understood by those skilled in the art, as long as the sensors can detect or otherwise determine that a portion of workstation 10 may contact with or otherwise damage an object or injure a person during lowering and that in such instance, the lowering movement will either stop or not start to begin with. Also, this feature requires that the user preset the upper and lower height-stops so that the control circuit 50 knows when to stop displacement once activated. If worktop 12 is located at its lowest height, as preset by the user during initial setup, and the user touches touch pad (46 or 48), control circuit 50 will drive the motors to raise worktop 12 until it reaches the highest preset height. Similarly, if the user touches touch pad (46 or 48) again, worktop 12 will descend to the lowest preset height. Now, if worktop 12 is located at some intermediate height somewhere between the preset highest and lowest height-stops, then it is preferred that the single-touch feature not activate. In such instance it is preferred that the user manually raise or lower worktop 12 to either the highest or lowest preset height-stops to reactivate the single-touch feature. This is because the system won't know if the single touch command is meant to raise or lower the worktop. As an alternative here, instead of preventing the single-touch feature from operating if the worktop is located at an intermediate position, the control circuit 50 can display a confirmation request on display 58 before a height-displacement occurs, such as "Tap upper pad once to confirm to move up-Tap upper pad twice to confirm to move down" . . . or words to that effect.

According to another embodiment of the disclosure relating to the above-described single-touch feature, the user may touch upper touch pad 46 once, as before, to activate the drive motor and move the worktop up or down. If the worktop is located at the highest (preset) position, the single-touch input will cause the worktop to descend to a preset lower position, where the drive motor will automatically stop. If the worktop is located at the lowest (preset) position, the single-touch input will cause the worktop to ascend to a present higher position, again where the drive motor will automatically stop. If the worktop is located at any intermediate height (between the uppermost and lowermost preset positions) the user's single-touch command will cause the worktop to automatically ascend (by default) advancing towards the upper preset position. If the user really wanted the table to descend instead, he or she just taps the upper touch pad 46 once to stop the ascending worktop and once more to cause the worktop to reverse direction and descend to the lowermost position. In this arrangement, as the user taps the upper touch pad, the motor will follow the same pattern: first tap, go up, second tap, stop, third tap, go down, fourth tap, stop, fifth tap, go up, etc. To prevent accidental activation of the motor drive, the single-touch-to-activate operation can actually be a quick double-touch (like the "double-click" of computer mouse buttons) or a prolonged single-touch (or some other pattern of touching) to prevent accidental motor activation. With a single touch operation, the user may find themselves accidentally touching the upper touch pad 46, which can prove to be annoying. The user may set up the tap-to-move feature to operate as follows:

a) Which direction will the worktop move when the touch pad is touched (up or down);

b) How many taps is required to activate the movement (what is the tap pattern-single tap, double tap, long duration tap, etc.); and c) Which touch pad is to be used in this mode, the upper touch pad 46, the lower touch pad 48, or both.

According to yet another embodiment of this disclosure relating to the above-described single-touch feature, the user may single-touch the upper touch pad 46 to cause the worktop 12 to auto-move down to the lower preset position and single-touch the lower touch pad 48 to cause the worktop 12 to auto-move up to the upper preset position. In this arrangement, the single-touch feature will work regardless of the height position of the worktop.

According to another embodiment of the disclosure, Applicants contemplate that control circuit 50 will recognize when a user touches both upper touch pad 46 and lower touch pad 48. This action can be used to cancel a height-displacement event, or cancel a mode or provide an input response to a selection request.

Status LED lights 64 are preferably provided to convey select operational information, such as confirmation of a switch event (confirming to the user that the control circuit has detected the activation of a particular switch), power on, and perhaps a blinking or brighter condition to indicate when the table top is in motion up or down.

Apart from the above-described mat 36 which, as described can be used to detect the immediate presence of a user, ultrasonic range finder 66, and a thermopile 68 (such as Passive Infrared—PR) can also be used to detect when a user is nearby. Such detection allows important features of the present workstation to function, including:

dd) Only operating drive motors 74 when a user's presence is detected (a safety feature);

ee) Driving drive motors 74 to allow worktop 12 to move quickly up and down as a greeting (and also as a reminder to use the sit/stand operation of workstation 10) when a user first arrives at the workstation, perhaps in the morning; and ff) To only calculate stand-time by the user when the user is actually present at the workstation.

Microphone 70 (and voice-recognition circuitry) is preferably included with the present workstation 10 so that control circuit 50 is able to determine if the user is speaking, perhaps on the telephone, or with a colleague. If such determination is made, it is preferred that control circuit 50 will postpone any table top movement during this time. We don't want to surprise or otherwise bother or interrupt the user when it is likely that he or she is busy.

Microprocessor 52 is instructed by a software program stored in onboard read-only memory. According to the present disclosure, the software is written to control the work-height of the table top in one of the following modes described in the following paragraphs Manual Mode:

This mode simply controls the up-down operation in response to the manual instructions by the user. When the user commands it, the control circuitry responds, the motors are driven and the table top is repositioned until the user releases the up/down switch, or as described above, the motors will automatically reposition worktop 12 from the lowest height stop to the highest height stop without having the user to hold onto the upper touch pad 46, or the lower touch pad 48.

Semi Auto Mode:

This mode provides automatic operation of the table top. The user inputs (as a percentage) how much of the time of use of the sit/stand desk he or she wishes to stand. For example, during an 8 hour period of use, worktop 12 will be in the raised position 25% of the time, meaning that the user will be standing for 2 hours during that time. Control circuit 50 will provide a height-adjustment schedule for this time period so that the user will be asked to stand a total time of 2 hours (or 25%) over the 8 hour period. Of course the actual stand time will be divided up during the 8 hours and will preferably follow a predetermined or random schedule. In this mode, control circuit 50 will signal to the user that a height-adjustment event is imminent, but will not carry out the height-adjustment until the user confirms that he or she approves. The user therefore effectively remains aware of the height-adjustment events during the day, but can override any event by either not confirming at the time of an event, or by actively cancelling the particular event. The user remains in control, but control circuit 50 encourages the user to keep to the sit and stand schedule by reminding the user when each height-adjustment event should occur to meet the pre-established goal. When the user cancels an event or manually changes the height of the worktop, control circuit 50 will automatically adjust the remaining schedule to account for the user's override and ensure that the user meets the standing goal (in this example, 25%). Canceling a height-adjustment event is similar to using the "snooze" button to cancel an alarm. It does not cancel the mode. The control circuit will continue to remind the user of future height-adjustment events, as they come up. According to this semi auto mode, when the worktop is meant to displace vertically during a height-adjustment, the present system will prompt the user by a "whisperbreath" worktop movement, as described below and request permission. When the user senses this movement of the worktop, he or she will understand that it is time for a height-adjustment event and that the workstation is requesting permission to carry out the adjustment. The user can either accept or decline this request, as described above.

Full Auto Mode:

This mode moves worktop 12 up and down following a height-adjustment event schedule. The schedule in this mode can either be generated by the control unit, in response to some initial inputs by the user, or set up by the user entirely. During use in this mode, when an event is to take place, the control unit will alert the user that a height-adjustment is imminent (for example, by activating worktop in a "whisperbreath" movement, as described below). The user does not have to confirm or do anything. After a prescribed period of time (a few seconds), the control unit will send a "Start" command to activate the drive mechanism, to raise or lower the worktop, as scheduled. The user can, at any time, cancel the height-adjustment movement by contacting the touch pads 46, 48. If the user cancels the event prior to movement, then worktop will remain at the same height and the schedule will be updated to account for the cancelled event. If the user cancels the event during the event (when the worktop is moving, the movement will stop). The user can then contact the touch pads 46, 48 another time to return worktop to the start height prior to the event.

According to this full auto mode, when the worktop is meant to displace vertically during a height-adjustment, the present system will prompt the user. When the user senses this movement of the worktop, he or she will understand that a height-adjustment is imminent, unless he or she wishes to cancel the event.

Adaptive Operation:

In either full or semi auto modes, an important feature of the present system is that it will adapt to the behavior of the user so that future operation of the workstation will better match the user's fitness level. This will encourage continued use of the workstation and therefore, continued fitness and wellness.

For example, the user programs workstation 10 to be fully raised 40% of the time during a period of operation (a full work day for example). But during operation, control circuit 50 detects that the user is shifting his or her weight side to side at more frequent intervals, as detected by the right and left pressure zones 38, 40 of mat 36, or by other sensors. This can indicate that the user is getting tired standing. In response to this potential fatigue by the user, control circuit 50 adjusts the height-adjustment event schedule so that worktop 12 will only be fully raised perhaps 30% of the time, taking into account the shortened time remaining of the period of operation during the recalculation.

In this example, the workstation of the present disclosure learned and adapted to a changing user behavior, as detected by its sensors. During use, the user appeared to be getting tired at the set stand time of 40% so the present system automatically reduced the goal to 30% to better match the fitness of the user. The workstation, according to the present disclosure uses sensors and data to "get to know" its user and adapt accordingly. In the above example, perhaps control circuit 50 can change the duration that the table resides at the full up position from 60 minutes to 30 minutes so that the user will be less fatigued during each standing period. The duration for each full down condition can also be adjusted to better adapt to the user. Continuing with this example, should the user show more fatigue in the future, the present system will again reduce the standing time until a balance is found, wherein the extra work required by the user to stand matches the condition of the user. Once this balance is determined, the present system can establish a schedule that matches the user's ability and fitness and can slowly work with the user to improve the user's strength, fitness and wellness over time. Similarly, control circuit 50 can adjust the duty cycle of each event to more closely fit the user's ability. As the user of the above example improves their fitness over time, the present system will detect this and will again adapt, but this time by increasing the standing duration, decreasing the sitting duration, and perhaps increasing the frequency of height adjustment events.

The learning feature of the present disclosure also learns basic work habits of the user, such as when the user goes to lunch each day, when he or she arrives and when he or she leaves. The system, according to the present disclosure may confirm trends over longer periods of time regarding the user. For example, the user may appear to be a bit more tired on Mondays owing to the number of cancelled raising height-adjustment events (and other measured or sensed factors) and perhaps even the measured amount of time it takes the user to transition from sitting to standing. The controlling system of the present disclosure uses this information to adjust the height-adjustment event schedule accordingly so that the system works with the user's detected strength and endurance, during the day, the week, and over longer periods of time. Over time, while using the present workstation in this mode, the height-adjustment event schedule and user-prompts on the screen will work to encourage the user and/or modify the amount of time sitting to help achieve long-term health benefits.

Other considerations can be used to influence the duration and frequency of height-adjustment events during the time period. Such information, such as general profile information, including the user's age, weight, overall health and answers to such set-up questions as:

1) Are you a morning person?
2) Do you exercise in the morning?
3) Do you have any injuries?
4) Do you have a heart condition? How much do you weigh?
5) About how many miles do you walk each day? What do you eat for a typical lunch?

6) Do you eat breakfast?

Other considerations may include performance data gathered early on during the day. For example, if the user is asked to stand for a duration of 1 hour and after just 15 minutes control circuit 50 reads data from mat 36 and determines that the user is shifting their weight from one leg to the other at an increasing frequency, then control circuit 50 will re-evaluate the duration and the schedule will automatically change to accommodate the learned ability and apparent health of the user. The system is designed to learn over the short term and the long term the particulars and improvements of the user so that a height-adjustment schedule can be created to benefit the user over a long period of time. In the above example, the schedule would change to shorten the stand-duration and if the user response continues to convey signs of weakness or fatigue, the system will either suggest a lower total stand time (perhaps 20%), or will just automatically adjust the percentage regardless.

According to the disclosure, when control circuit 50 is set in either the above-described automatic or semi-automatic mode, the present system will automatically adapt to the particular user and will change the duration, the frequency of the height-adjustment events, and the total stand time over the period of use in response to the user's measured behavior, as they use the desk. As described elsewhere in this application, if the user shows fatigue, for example, by rocking side to side, alternating putting his or her weight on his or her left and right foot, the present system will detect this (using mat 36 or other sensors). When this fatigue is detected, control circuit 50 will change the parameters of the height-adjustment schedule to better fit the condition of the user. The present desk is meant to work with the user, nudging them along with encouragement to follow an adaptive sit-stand schedule to thereby maximize fitness and wellness. Examples of such user-behaviors include:

| Measured Behavior | Response to Behavior |
| --- | --- |
| Fatigue of User | Decrease Amount of Stand Time |
| Strength of User | Increase Amount of Stand Time |
| Patterns of Height-Change Event | Avoid those Times for Height-Change |
| User is Not Detected at Desk | Do Not Change Height of Desk |
| Downloaded Fitness Information | Adjust Stand Time Accordingly |

Overtime, the present system will better understand "who" the user really is, and based on these measured behaviors and other considerations, the present workstation can adapt its operation accordingly.

According to another embodiment of the present disclosure, external devices, such as cell phones, computers and exercise-monitoring devices can be connected, either wirelessly, or by electrical connection to the control unit. An example of an exercise-monitoring device is a Fitbit®, made by Fitbit, Inc. of San Francisco, Ca. 94105. This particular device measures various parameters by a user during their movement, including the number of steps taken, the number of miles walked, the number of stairs climbed, and an estimate of calories burned. This information can be downloaded to the present workstation and used to determine the measured behavior of the user so that the workstation can take this information into account when determining the height-adjustment schedule for the user for the day.

Whisperbreath Movement of Worktop:

As described above, in either the fully auto mode or the semi-auto mode, the user is notified by display 58 and/or by smooth, small up and down height-displacements of worktop 14. This smooth up and down motion of the worktop 14 is known to the Applicants as a "whisperbreath" movement and is an important feature of the present disclosure. The movement provides a means to communicate to the user of the workstation in a relatively calm and non-interrupting manner. The amplitude of vertical displacement and the frequency is preferably calculated to mimic the breathing amplitude and frequency of a relaxed human. This frequency has been determined to be about 16 cycles per minute and the preferred vertical displacement of worktop 14 is about 1 inch (measured from peak to valley).

According to a preferred embodiment of this disclosure, whenever a height-adjustment event is about to occur in the auto-mode, the worktop of the present workstation will perform a whisperbreath movement (gently moving up and down) to inform the user that the worktop is about to move. In the above-described semi-auto mode, this movement will be used to indicate to the user that the workstation is requesting permission (prompting the user) to make a height-adjustment and the user must authorize the movement by contacting the display panel with his or her hand, using the pre-established tactile gesture, such as a single or double tap, or perhaps a swipe. Although this whisperbreath movement is preferably used alone to prompt the user, as described above, this movement can be supplemented with a sound. Also, if the user ignores the gentle movement of the worktop 12, the frequency and amplitude can be changed by control circuit 50 to a less-than-peaceful movement to better get the user's attention.

Figure 31:
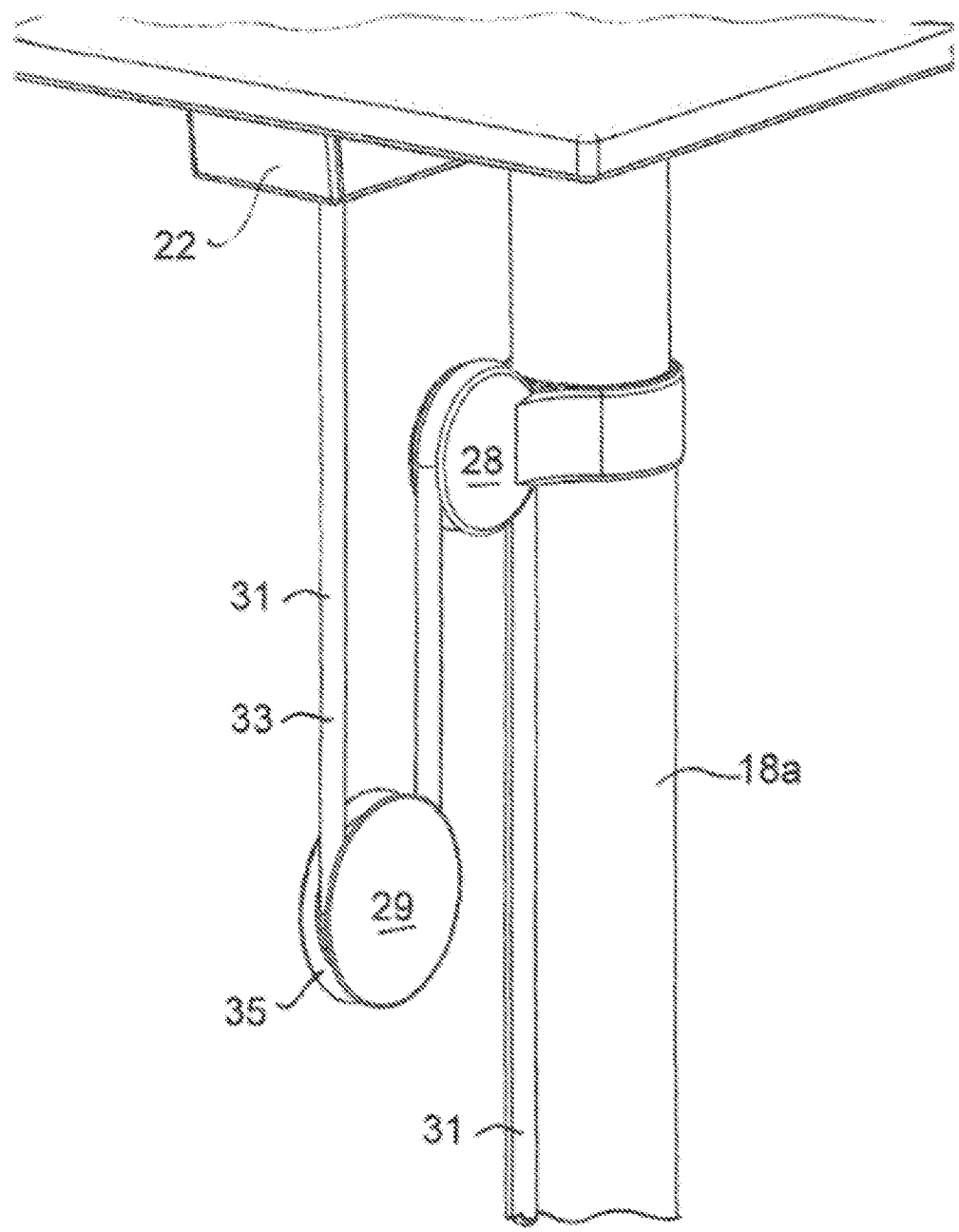
FIG. 31 is a perspective partial view of the sit-stand workstation of FIG. 20, showing details of a power-cord tensioning assembly, according to another embodiment of the disclosure.

Referring to FIG. 31, when the user receives workstation 10 for the first time and powers it up, workstation 10 will greet the user by the above-described whisperbreath movement of worktop 12. According to one embodiment of this feature, this greeting movement will be repeated once a day when the user first arrives, as detected by mat 36, proximity transducer or some other sensors. According to another embodiment, this same movement, or a similar one can be used to get the user's attention at any time during the period of use (e.g., during the day at the office). As mentioned above, the characteristics of this whisperbreath movement can vary so that more than one movement can be used to indicate different things. As mentioned above, a greeting movement can be relatively quick (almost indicating "happiness" to see the user). This movement can therefore have a relatively quick cycle time, perhaps moving up about ½ inch and then slowly down 1 inch and then quickly up 1 inch and finally slowly down ½ inch. Another unique movement can be described as moving up and down ¹⁄₁₀ inch very quickly, essentially a vibration. This quicker movement could perhaps be used to convey more urgent messages to the user. Another signature movement could be a single quick downward movement of perhaps ¼ inch. It is contemplated that the user's cell phone can be "connected" (by Bluetooth®, or other) to control circuit 50 and the alert movement of the desk can be used to alert the user of certain cell phone events, such as incoming call, email or text, etc. The desk movement can also be used in connection with software programs running on a nearby computer, such as Microsoft's Outlook®, wherein, for example, the movement can alert the user of an upcoming meeting. Other electronic devices can be connected to control unit 26 so that these devices may cause a whisperbreath movement to occur. Such devices include a smoke or fire alarm, a doorbell and a remote security device. For example, if a nearby smoke alarm is activated, a signal could be transmitted to the user's workstation to cause the worktop to alert the user by rapid movement of the worktop. Any amplitude or frequency or sequence can be used to create unique movements for any of a variety of alerts to the user. The general amplitude range for these dips is between about 1/16 inch to about 1 inch (measured peak-to-peak).

In use, during initial setup of workstation 10, according to one embodiment of the disclosure, the user is asked to answer several questions that appear on display 58 and also to input several bits of information, such as the use's age, date, time, the user's name, weight, height, build and other. The user will then be asked to manually raise worktop 12 to a height that the user considers to be a comfortable maximum height for standing. When the desired height is reached, the user holds lower touch pad 48 until control circuit 50 flashes status LED lights 64 and audio circuit 62 beeps (and perhaps the worktop whisperbreath movements). The user will repeat this process for setting the desired lowest worktop height (i.e., sitting)

Control circuit 50 will then continue the set up by asking the user to select a percentage-standing value, such as 25% so that later when "Semi Auto Mode" or "Full Auto Mode" are selected, workstation 10 can operate immediately under the predetermined guidelines of either of these two modes. The user will also have to input the average consecutive time spent at the workstation. These values can be adjusted either by the user, or automatically as control circuit 50 adapts to user conditions and user behavior patterns over time.

Applicants further contemplate an alternative set up process where after the user inputs the above-mentioned information, the user is encouraged to use workstation 10 in a manual mode for a period of time, perhaps a week. During this time, control circuit 50 will keep track of the different worktop heights, duration at those heights and frequency of height-adjustment event and then use this information to determine highest height stop, the lowest height stop, and a baseline health value. From this information, control circuit 50 can create a more accurate height-adjustment schedule when the user selects Full Auto Mode or Semi Auto Mode later on. The computer will know (eventually, as it learns) if the user is not very fit and will start a plan that is less strenuous to the user, offering perhaps a schedule that asks the user to stand 15% during the work day time period. The computer monitors how the user is able to handle this plan over the next week or two and then slowly increases the standing time and/or frequency of the sit-stand events. If the user starts overriding the automatic events set by the computer, either cancelling or extending the duration or frequency, the computer would detect this and make adjustments to the event schedule accordingly. Applicants recognize that an important feature here is to ensure that the user is not discouraged by using the present workstation according to the disclosure and follows the prescribed height-adjustment event schedule as closely as possible.

An important goal of the present disclosure is to provide a sit/stand desk (and other devices) that encourage a user to get fit and stay healthy. As mentioned above, the present disclosure uses sound, by sound effects and voice (words of encouragement, etc.), lights (different colors displayed on display 58 to convey different levels of success and encouragement), or numerically, by displaying a numerical value on display 58 to convey levels of success or honest levels of current health.

According to yet another embodiment of the disclosure, to encourage the new user to just get started, the workstation 10 is immediately operational and will automatically follow a preset level of standing time, such as 15%. The user will be able to "play" with the heights to adjust the preferred heights during initial use, when the user wants to. The control circuit 50 will keep track of all adjustments and will slowly fine-tune the user's operational parameters. The present workstation 10 will ask the user questions over a period of time, such as a week, including the use's age, date, time, the user's name, weight, height, build and other. This way, Applicants believe that because the user will not feel like there is a set up period and they can use the workstation immediately, they will feel better connected to the workstation with develop a feeling of trust and oneness, which can only encourage prolonged use of the workstation and a healthy outcome.

Figure 23:
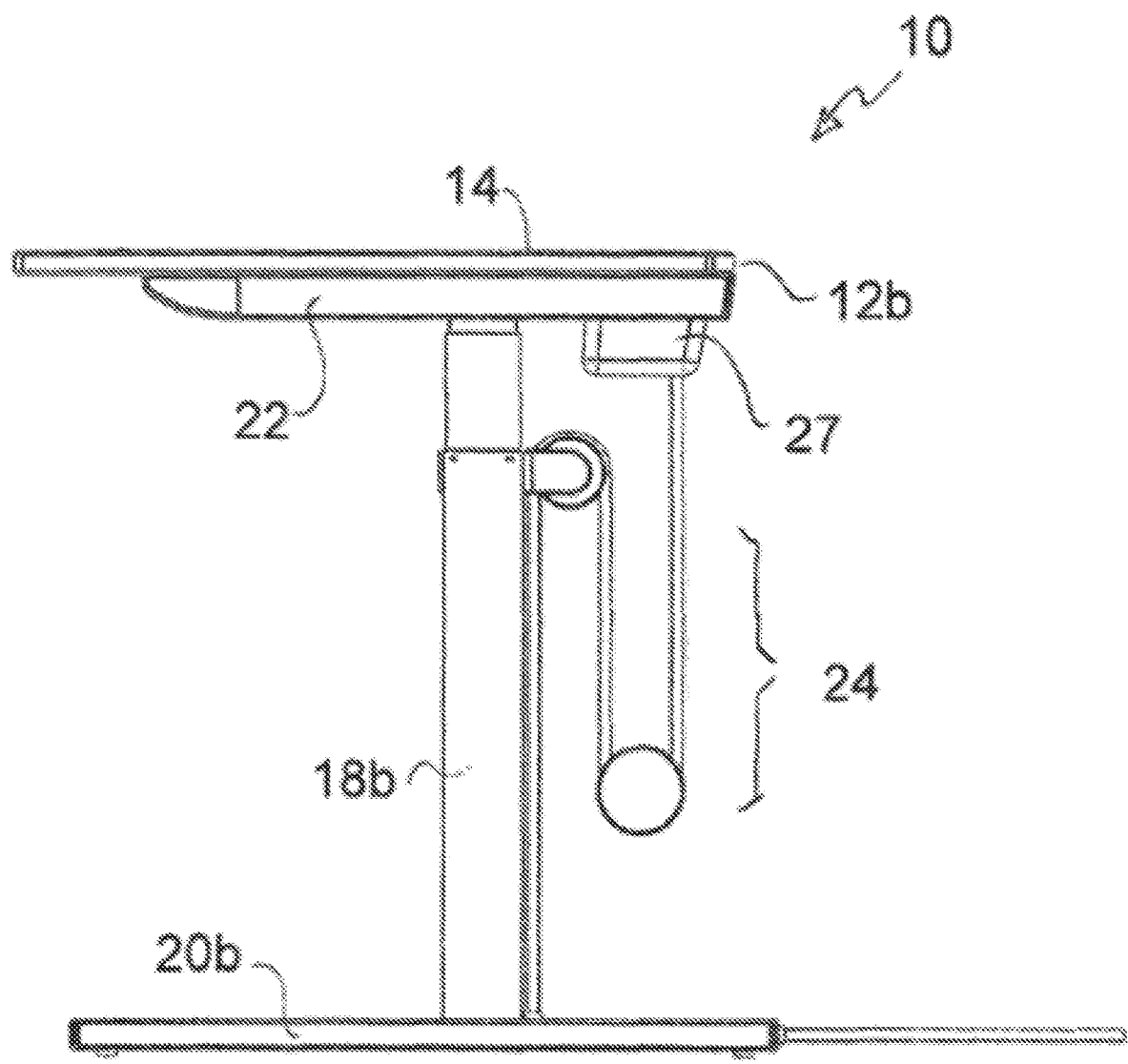
FIG. 23 is side elevation view of the sit-stand workstation of FIG. 20 shown in a lowered position, according to the disclosure.
Figure 24:
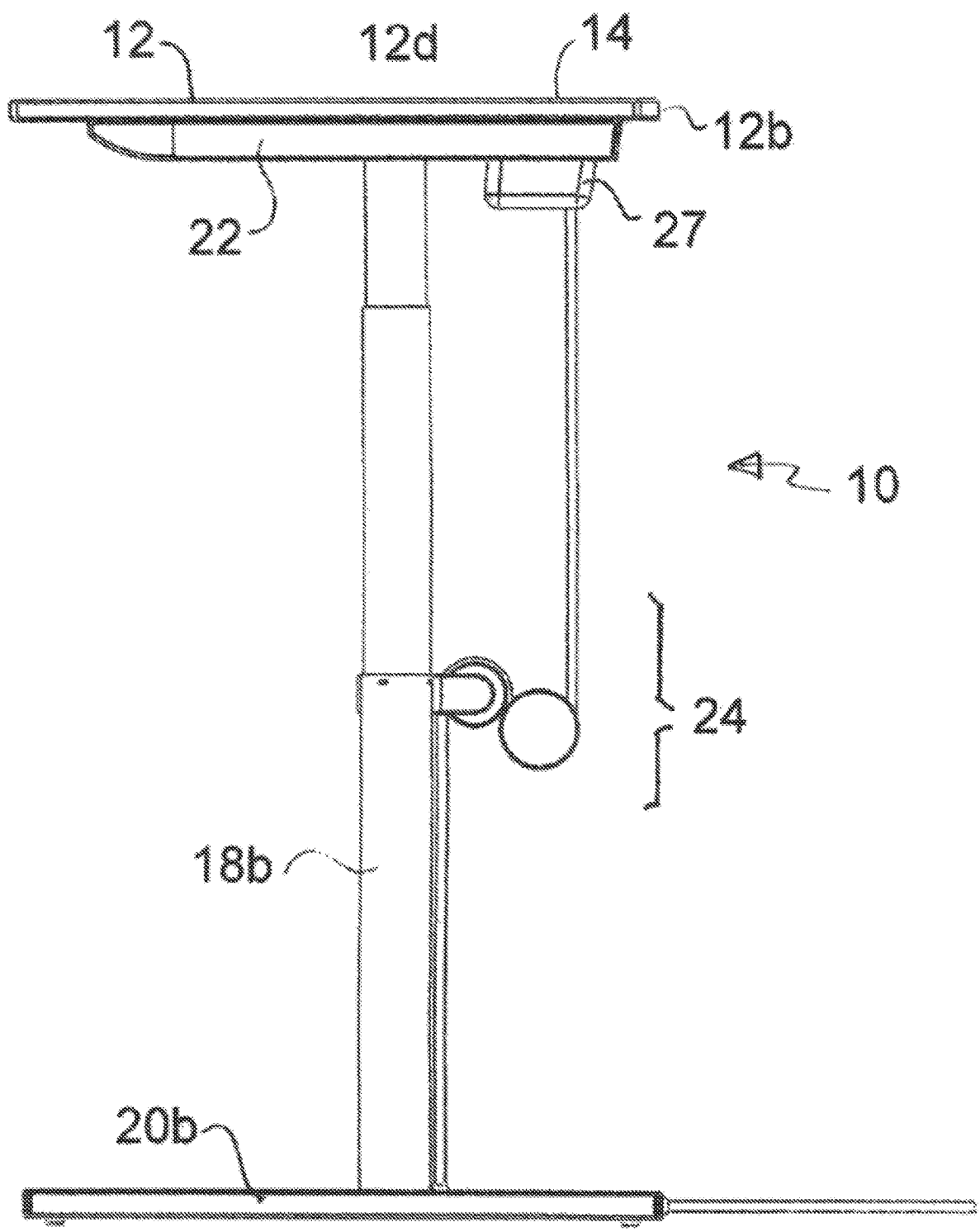
FIG. 24 is side elevation view of the sit-stand workstation of FIG. 20 shown in a raised position, according to the disclosure.
Figure 25:
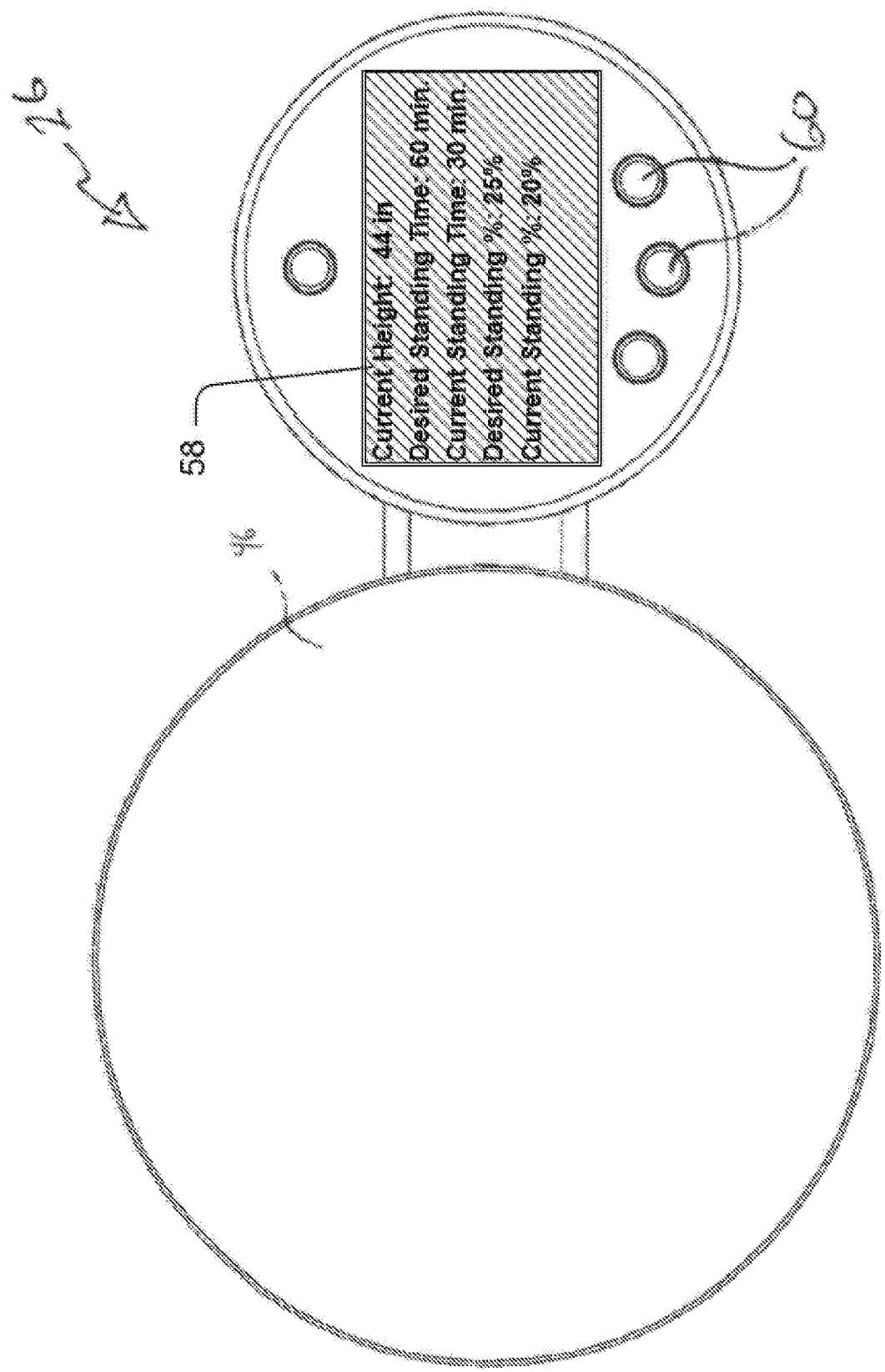
FIG. 25 is a top plan view of the control unit, showing an input contact pad and a display, according to the disclosure.

Wire Management:

Since work station 10 commonly supports electronic equipment on worktop 12, such as a computer and monitor, it is important to provide a source of power for such devices located on worktop 12. The challenge is to manage the power cable as it follows the worktop up and down during the operation of workstation 10. Referring to FIGS. 23 and 24 and according to a preferred embodiment of the disclosure, a cord tensioning assembly 24 is shown including a stationary pulley wheel 28 and a tensioning weight 29. Pulley wheel 28 is secured to either pedestal 18a, 18b (shown in the figures secured to pedestal 18a) at a portion that remains stationary with respect to base 20a as worktop 12 moves up and down during the operation of workstation 10. Pulley wheel 28 is preferably circular in shape, like a conventional pulley and includes a circumferential groove that is sized and shaped to receive a power cord 31. Pulley wheel 28 is preferably about 2-3 inches in diameter and is mounted to leg 18a so that the center of pulley wheel is located about 2 to 3 inches away from leg 18a.

As shown in FIGS. 23 and 24, and 31, power cord 31 is fed into either base 20a, 20b (shown fed into base 20a in the figures) and directed up to the groove of pulley wheel 28. According to the present disclosure, tensioning weight 29 is preferably pulley shaped and includes a groove 35 that is sized to receive power cord 31. Power cord 31 extends up to upper support frame 22 and is provided with slack so that a loop 33 is formed. As shown in FIGS. 23 and 24, tensioning weight 29 is positioned within this loop so that power cord 31 is effectively captured within groove 35 halfway around the pulley-shaped weight, thereby holding tensioning weight in place. As worktop 12 moves up and down during use, the power cord loop 33 changes size, but since tensioning weight 29 is always secured within loop 33, its weight will keep power cord 31 taut and the loop managed so that power cord 31 does not get tangled with nearby objects. The exact weight of tensioning weight 29 will depend on the type and flexibility of the power cord used, but it is expected to be between 8 ounces and one pound, sufficient to keep power cord 31 taut and straight regardless of the height of worktop 12, as shown in FIGS. 23 and 24. Power cord 31 is preferably fed through hollow portions of upper support 22 and connected to an outlet strip 13 of several power outlets (can be conventional) and perhaps other communication connectors, which is positioned within wire management box 27. Wire management box 27 is secured to underside 16 of worktop 12 so that it moves up and down with any vertical displacement of worktop 12 during operation of workstation 10. Therefore, any electrically powered device located on work surface 14 or worktop 12 can be easily and effectively plugged into one of the outlets located within wire management box 27 without fear of entanglement during operation of workstation 10.

Communication:

According to yet another embodiment of the present disclosure, user use-data can be collected and stored by control circuit 50. Following a predetermined download schedule, control circuit 50 can use the Blue-Tooth® module 54 (or WIFI) to link up with the Internet either directly or through the user's computer and transmit the stored user use-data to remote servers for product validity and user evaluation. Applicants contemplate providing a service for users wherein qualified personnel may review the user use-data and other user-profile information, fitness history to help recommend a refined fitness schedule to allow the user to better reach their fitness goals. In such instance, two-way communication between the remote servers and the user's workstation may occur through the Internet and either the Blue-Tooth® module 54, a WIFI connection, or perhaps a hard wire connection. The remote servers can also use this communication link to provide firmware updates as necessary. This communication feature would allow the user to receive weekly or monthly reports showing health improvement, total times standing and equivalent calories burned daily, weekly and total to date, as well as other collected and monitored data. The user would hopefully look forward to receiving their "report card" and would be encouraged to stay with their schedule.

All user-inputted data and settings and collected data can be automatically backed-up at a remote memory location so that the appropriate data and settings can be recalled if necessary, such as if the user disconnects all power to workstation 10 or upgrades to another workstation 10.

Improvements in Workstation-User Sensing:

According to previous embodiments described in this patent application, mat 36, ultrasonic range finder 66, thermopile 68 (such as a passive infrared—PIR), and microphone 70 are used independently or in any combination to detect when a user is nearby or adjacent to the workstation (i.e., "is present"). Such user-detection allows important features of the workstation to function, including:

gg) Only operating drive motors 74 when a user's presence is detected (a safety feature);

hh) Driving drive motors 74 to allow worktop 12 to move quickly up and down as a greeting (and also as a reminder to use workstation 10) when a user first arrives at the workstation, as detected by the sensors and perhaps in the morning; and ii) To only calculate stand-time by the user when the user is actually present at the workstation, again as detected by the user.

Applicants have further contemplated that it would be beneficial for the workstation of this disclosure to not only 'know" when a person is present at the workstation, but more particularly, to either know if and when the "primary user" of the workstation is present at the workstation, or if not the primary user, to know the identity of whoever is using the particular workstation, perhaps a coworker, the user's boss, or other.

If local sensors cannot accurately detect the presence of the primary user, the workstation will assume that any detected person using the primary user's workstation is in fact the primary user and may respond by switching from standby mode to an operational mode. Such a false detection could lead to inaccurate collected data and would likely result in the workstation poorly meeting the true needs of the primary user. Also, the collected data will yield inaccurate and unreliable trends and statistics of the assumed primary user.

To overcome this potential problem and according to another embodiment of the disclosure, workstation 10, includes any combination of several sensors, including the above-described mat 36, ultrasonic range finder 66, and thermopile 68 and uses them to create and store an "electronic signature" of a select primary user (the person who regularly uses the particular workstation). This "smart sensing" arrangement allows the present system to accurately determine when a particular person is present at the workstation at any given time and who that person is (or, depending on how the system is set up, to determine who that person is not). For example, a primary user may have habits that can be repeatedly detected by the system, electronically stored within electronic memory, electronically compared and used to ID the current user, or at least used to determine when the person present at the workstation has a signature that is stored within the system. Such habits may include a unique standing pattern (e.g., the user may consistently stand between 2 and 4 inches from the edge of the worktop 12), having a strong and unique body heat pattern that is located at a specific region of the field of view of the sensors, the type of music that the user plays, the user's voice, any tapping the user does against the worktop, the selected height of the worktop 12, or the user's time schedule or known routine. According to one of the embodiments, one of the sensors is a Bluetooth® (or similar) controlled sensor that is able to accurate detect and read an RFID located on the user's body, such as embedded within the user's building ID badge.

If other workers (non-primary users) in the office stop by to visit the primary user's workstation when the primary user is not at the workstation, the sensor array located within and adjacent to the workstation will detect electronic parameters that are particular to the visitor and will store this information along with the time of the visit, the duration of the visit, the visitor's name (if determined by the workstation), the date, and perhaps how much the visitor weighs. By providing "smart sensing", the workstation according to this embodiment of the disclosure can detect and generate a visitor's and user's log for review by the primary user upon his or her return. Additionally, the workstation can automatically activate a flash-memory voice-recorder when requested to do so by any of the visitors so that the visitor may leave a voice message for the primary user.

By using "smart sensing" with each workstation located within a work environment, the smart sensing system, according to this embodiment of the disclosure may collect all sensed information and may use this information to help track workers efficiency and attendance. It is not Applicant's desire to create a sensing system that will collect information on the workers of a company to benefit "Big Brother" or to be used against any particular worker, but instead to use this collected information to provide general statistical data regarding a group of workers, such as, what is the average "desk-occupancy" of the workers in the engineering department.

Such "smart sensing" of the present workstation can additionally be used for the following:

1. The collected information can be used to determine which employees are in attendance at a company on any given day, such as engineers, CAD people, sourcing, designers, etc.) to help management manage daily resources and work distribution.

2. The collected information can be used to automatically keep track of billing by determining which workers are working at their desk and for how long each day to improve efficiency and billing accuracy.

3. The collected information can be used to better manage telecommuting, sick-leave, vacations, lunch hours and even smoking breaks.

4. The collected information can be used to learn trends and routines and help the primary user plan ahead for the day's events. For example, as lunchtime on Wed approaches, the system can provide the primary user a list of menus or other information of local restaurants and can even tap into Internet resources to provide wait-time information. Other useful information includes traffic reports or train schedules or train delays, and even weather. This information can be automatically downloaded to the primary user's smart phone, if desired.

[5. The collected information can also be used to measure the body temperature of the primary user in an effort to detect the onset of a potential illness, fever, or stress levels. The workstation can use this information to change the sit-stand schedule or perhaps recommend that the user take a break, a vacation, or sick day. Other sensors can be used to measure the heart rate, or other vitals of the primary user.

6. The collected information can be used to power down any combination or all electrical devices connected to or otherwise associated with the user's workstation. For example, if the local sensors connected to the workstation detect that the primary user is no longer at the workstation, the system can turn off the desk lamp located on the worktop and put the computer into a sleep mode. Additionally, the system can turn on various and appropriate announcements on the phone, as predetermined by the user.

According to another embodiment of the disclosure, the drive motors used to raise and lower worktop 12 can be impulse drive so worktop 12 raises or lowers a very small amount (as described in greater detail above), such as a couple of mm. According to this embodiment, this quick movement can be used to help convey the passage of time, such as providing a little "dip" movement every hour, or to alert the user that a scheduled even is soon approaching.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains. This application also incorporates U.S. patent application Ser. No. 16/167,234, filed on Oct. 22, 2018 by reference in its entirety for all purposes.

While the disclosure may be susceptible to various modifications and alternative forms, specific embodiments have been shown by way of example in the drawings and have been described in detail herein. However, it should be understood that the disclosure is not intended to be limited to the particular forms disclosed.

Thus, the invention is to cover all modifications, equivalents, and alternatives falling within the spirit and scope of the invention as defined by the following appended claims.

What is claimed is:

1. A furniture system comprising:
    a worktop subassembly including a worktop member and an elongated frame assembly, the frame assembly including a body extending from a first end to a second end of the frame assembly, the body having an upper surface and a lower surface and forming a cavity, the cavity extending along a length dimension between first and second portions of the cavity that are adjacent the first and second ends of the frame assembly, at least one wall of the body defining at least a first opening into the cavity, the worktop member supported by the frame assembly so that an upper surface of the worktop is above the upper surface of the body;
    a first leg extending upward to an upper end that is coupled to the frame assembly proximate the first end so that the upper end of the first leg resides at a height below the upper surface of the frame assembly and the first leg extends vertically downward below the first portion of the cavity so as to be vertically aligned below the first portion of the cavity;
    a second leg extending upward to an upper end that is coupled to the frame assembly proximate the second end so that the upper end of the second leg resides at a height below the upper surface of the frame assembly and the second leg extends vertically downward below the second portion of the cavity so as to be vertically aligned below the second portion of the cavity;
    an elongated a power subassembly housing supported by the worktop subassembly so as to be immovable with respect to the worktop subassembly at a location outside the cavity and below the height of a lower surface of the worktop member, the subassembly housing having a length dimension, a width dimension and a depth dimension wherein the length dimension is substantially longer than the width dimension and the depth dimension, the subassembly housing extending along a trajectory such that the length dimension of the subassembly housing is substantially parallel to the length dimension of the body; and
    at least a first power outlet supported by the power subassembly housing;
    wherein at least a first power cable extends within the cavity along at least a portion of the length of the cavity and from within the cavity through the at least a first opening defined by the at least one wall of the body into the power subassembly housing, and is coupled to the at least a first power outlet within the housing.

2. The furniture system of claim 1, wherein the body includes a crossbar that extends between the first and second ends, the crossbar including first and second side walls, the first side wall extending between the upper and lower surfaces and the second side wall extending between the upper and lower surfaces, the first and second legs coupled to the crossbar proximate the first and second ends of the crossbar, respectively.

3. The furniture system of claim 2 wherein the power subassembly housing forms a housing opening and wherein the power cables extend from within the cavity through the power subassembly housing opening and into an inside cavity formed by the power subassembly housing to connect to the at least a first power outlet.

4. The furniture system of claim 2, wherein the crossbar defines a longitudinal axis extending through the first end and the second end of the crossbar, wherein the crossbar has a first length measured in a direction parallel to the longitudinal axis, and wherein the power subassembly has a second length measured in a direction parallel to the longitudinal axis that is less than the first length.

5. The furniture system of claim 2 wherein the body further includes first and second side members coupled to the crossbar, each side member extending forward from the crossbar and forming an upper surface, the worktop member coupled to the upper surface of each side member.

6. The furniture system of claim 5 wherein the first and second side members extend adjacent the first and second ends of the crossbar, respectively.

7. The furniture system of claim 5 wherein each of the first and second side members is at least partially hollow to form cavities that open into the cavity formed by the crossbar.

8. The furniture system of claim 2 wherein the crossbar is a structurally rigid bar wherein the first and second side walls are immovable with respect to the worktop member.

9. The furniture system of claim 1, wherein each of the first and second legs includes a height adjustment mechanism for adjusting a height of the elongated frame assembly relative to a vertical axis.

10. The furniture system of claim 9, wherein each height adjustment mechanism is positioned at an end of each of the first and second legs proximate the body and includes an outer leg portion and an inner leg portion telescopically received in the outer leg portion.

11. The furniture system of claim 1 wherein the lower surface of the body forms the opening.

12. The furniture assembly of claim 11 wherein the power cables extend through the opening into the channel formed by the body and from the channel formed by the body into the power subassembly housing where the cables are coupled to the at least a first power outlet.

13. The furniture system of claim 11 wherein the opening is spaced from upper ends of the first and second legs.

14. The furniture system of claim 1 wherein the power subassembly housing includes a lower surface and wherein the height of the lower surface of the power subassembly housing is below the height of the lower surface of the body.

15. The furniture system of claim 14 wherein the power subassembly housing forms at least one opening for accessing the power outlet.

16. The furniture system of claim 1 wherein the power subassembly housing is spaced apart from the body.

17. The furniture system of claim 1 wherein the opening is a first opening, the body further defining at least a second opening, the power cables extending through the second opening into the cavity formed by the body and from there through the first opening into the housing to be connected to the at least a first power outlet.

18. The furniture system of claim 1 wherein the opening defined by the at least one wall includes a horizontal opening.

19. The furniture system of claim 1, wherein the body includes a first side wall extending between the upper surface and the lower surface and a second side wall extending between the upper surface and the lower surface, and wherein the worktop member is coupled to the upper surface of the body and extending outwardly beyond the first side wall.

20. The furniture assembly of claim 1 wherein the power outlet housing is supported by the frame assembly.

21. The furniture assembly of claim 20 wherein the power outlets reside at a height that is lower than the lower surface of the body.

22. The furniture assembly of claim 21 wherein the body defines a longitudinal axis extending through the first end and the second end of the frame assembly, the frame assembly having a frame assembly length dimension along the longitudinal axis, the power subassembly housing having a housing length dimension that extends along an axis parallel to the longitudinal axis and having a housing length dimension that is less than the frame assembly length dimension.

23. A furniture system comprising:
a worktop subassembly including a worktop member and an elongated frame assembly, the frame assembly including a body extending from a first end to a second end, the body having an upper surface and a lower surface and forming a cavity that extends along a length dimension, the cavity including first and second spaced apart portions located proximate the first and second ends of the frame assembly, respectively, at least one wall of the body defining an opening into the cavity, the worktop member supported by the frame assembly so that an upper surface of the worktop is above the upper surface of the body;
a first leg extending upward to an upper end and wherein the upper end is coupled to the frame assembly below the first portion so that the first leg extends downward below the first portion so as to be vertically aligned below the first portion of the cavity, and the upper surface of the body resides at a height above the upper end of the first leg;
a second leg extending upward to an upper end and wherein the upper end of the second leg is coupled to the frame assembly below the second portion and spaced apart from the first leg so as to be vertically aligned below the first portion of the cavity, and so that the upper surface of the body resides at a height above the upper end of the second leg;
a power subassembly housing supported by the worktop subassembly at a stationary location below the height of the lower surface of the worktop member and outside the cavity, the subassembly housing having a length dimension, a width dimension and a depth dimension wherein the length dimension is substantially longer than the width dimension and the depth dimension, the subassembly housing extending along a trajectory such that the length dimension of the subassembly housing is substantially parallel to the length dimension of the body; and
at least a first power outlet supported by the power subassembly housing so that the first power outlet is accessible at a height below the cavity formed by the body; and
wherein power cables extend along at least a portion of the length of the cavity and from within the cavity through the at least a first opening defined by the at least one wall of the body into the power subassembly housing, and are coupled to the at least a first power outlet within the power subassembly housing.

24. A furniture system comprising:
a worktop subassembly including a worktop member and an elongated frame assembly, the frame assembly including a body extending from a first end to a second end, the body having an upper surface and a lower surface and forming a cavity that extends along a length dimension between the first and second ends, at least one wall of the body defining at least a first opening into the cavity, the worktop member supported by the frame assembly so that an upper surface of the worktop is above the upper surface of the body;
a first leg extending upward to an upper end and wherein the upper end is coupled to the body so that the upper surface of the body resides at a height above the upper end of the first leg and the first leg extend downward from the lower surface of the body;
a second leg extending upward to an upper end and wherein the upper end of the second leg is coupled to the body and spaced apart from the first leg so that the upper surface of the body resides at a height above the upper end of the second leg and the second leg extend downward from the lower surface of the body;
a power subassembly housing supported by the worktop sub-assembly at a location outside the cavity and below the height of a lower surface of the worktop member, the power subassembly housing includes a lower surface and wherein the height of the lower surface of the housing is below the height of the lower surface of the body, the power subassembly housing including a first side wall and a second side wall, a first opening formed in the first side wall of the power subassembly housing for accessing the power outlet and a second opening formed in the second side wall of the housing; and at least a first power outlet supported by the housing;

wherein power cables extend along at least a portion of the length of the cavity and from within the cavity through the at least a first opening defined by the at least one wall of the body into the power subassembly housing, and are coupled to the at least a first power outlet within the housing.

25. The furniture system of claim 24 wherein at least portions of the first and second openings are spaced below the lower surface of the body.

26. The furniture system of claim 25 wherein a power subassembly housing length dimension is less than a body length dimension.

27. The furniture system of claim 24 wherein the first leg is vertically aligned with at least a portion of the cavity defined by the body and wherein the second leg is vertically aligned with at least a portion of the cavity defined by the body.

28. The furniture system of claim 27 wherein the housing is an elongated housing that extends along a length dimension and wherein the housing is arranged such that the housing length dimension extends parallel to the length dimension of the cavity.

29. The furniture system of claim 28 wherein the housing is attached directly to an undersurface of the worktop member.

30. The furniture system of claim 28 wherein the housing is spaced apart from the frame assembly.

31. The furniture system of claim 24 wherein at least a portion of the first opening is spaced below the lower surface of the body.

32. The furniture system of claim 24, wherein the body includes a crossbar that extends between the first and second ends, the crossbar including first and second side walls, the first side wall extending between the upper and lower surfaces and the second side wall extending between the upper and lower surfaces, the first and second legs coupled to the crossbar proximate the first and second ends of the crossbar, respectively.

33. The furniture system of claim 32 wherein the power subassembly housing forms a housing opening and wherein the power cables extend from within the cavity through the power subassembly housing opening and into an inside cavity formed by the power subassembly housing to connect to the at least a first power outlet.

34. The furniture system of claim 32 wherein the body further includes first and second side members coupled to the crossbar, each side member extending forward from the crossbar and forming an upper surface, the worktop member coupled to the upper surface of each side member.

35. The furniture system of claim 34 wherein the first and second side members extend adjacent the first and second ends of the crossbar, respectively.

36. The furniture system of claim 34 wherein each of the first and second side members is at least partially hollow to form cavities that open into the cavity formed by the crossbar.

37. The furniture system of claim 24, wherein each of the first and second legs includes a height adjustment mechanism for adjusting a height of the elongated frame assembly relative to a vertical axis.

38. The furniture system of claim 37, wherein each height adjustment mechanism is positioned at an end of each of the first and second legs proximate the body and includes an outer leg portion and an inner leg portion telescopically received in the outer leg portion.

39. The furniture system of claim 24 wherein the lower surface of the body forms the first opening into the cavity.

40. The furniture assembly of claim 39 wherein the power cables extend through the first opening into the channel formed by the body and from the channel formed by the body into the power subassembly housing where the cables are coupled to the at least a first power outlet.

41. A furniture system comprising:

a worktop subassembly including a worktop member and an elongated frame assembly, the frame assembly including a body extending from a first end to a second end of the frame assembly, the body having an upper surface and a lower surface and forming an elongated cavity that extends along a longitudinal axis between first and second portions of the cavity that are adjacent the first end and the second end of the frame assembly, the body including a first side wall, a second side wall, and a width extending between the first side wall and the second side wall, the width being perpendicular to the longitudinal axis, the body forming first and second independent openings at misaligned locations along a length dimension of the cavity, the worktop member supported by the body so that an upper surface of the worktop is above the upper surface of the frame assembly;

a first leg having an upper end coupled to the body below the first portion of the cavity so that the upper surface of the body resides at a height above the upper end of the first leg and the first leg extends downward away from the first portion of the cavity so as to be vertically aligned below the first portion of the cavity;

a second leg having an upper end coupled to the body below the second portion of the cavity and spaced apart from the first leg so that the upper surface of the body resides at a height above the upper end of the second leg and the second leg extends downward away from the second portion of the cavity so as to be vertically aligned below the second portion of the cavity;

a power outlet supported by the worktop sub-assembly outside the cavity for access at a height below the cavity;

at least a first power cable positioned within the cavity and extending along at least a portion of the length of the cavity between the first and second openings and extending from the cavity through the first opening for connection to a power supply at a first end and through the second opening to the power outlet at a second end; and wherein the first leg has a width dimension that is substantially similar to the width of the body.

42. The furniture system of claim 41, wherein each of the first and second legs includes a height adjustment mechanism for adjusting a height of the frame assembly relative to a vertical axis.

43. The furniture system of claim 41, wherein each of the first and second legs includes a height adjustment mechanism for adjusting a height of the frame assembly relative to a vertical axis, wherein the height adjustment mechanism is positioned at an end of each of the first and second legs proximate the frame assembly and includes an outer leg portion and an inner leg portion telescopically received in the outer leg portion.

44. A furniture system comprising:
- a worktop subassembly including a worktop member and an elongated frame assembly, the elongated frame assembly including a body extending from a first end to a second end of the elongated assembly, the body having an upper surface and a lower surface, the body forming a cavity that extends along a longitudinal axis between first and second portions of the cavity that are located adjacent the first and second ends of the elongated assembly, respectively, the body having a first side wall that extends between the upper and lower surfaces, and a second side wall that extends between the upper and lower surfaces, the body having a length dimension parallel to the longitudinal axis, at least one wall of the body forming at least a first opening, the worktop member supported by the body so that an upper surface of the worktop is above the upper surface of the body;
- a first leg having an upper end coupled to the body so that the first leg extends downward away from and below the first portion of the cavity so as to be vertically aligned below the first portion of the cavity;
- a second leg having an upper end coupled to the body and spaced apart from the first leg so that the first second leg extends downward away from and below the second portion of the cavity so as to be vertically aligned below the second portion of the cavity;
- an elongated a housing supported by the worktop subassembly at a stationary location below the lower surface of the worktop member and outside the cavity so that the housing is not movable with respect to the body, the housing forming a housing cavity that resides at least in part below the lowest portion of the cavity formed by the body, the housing having a length dimension, a width dimension and a depth dimension wherein the length dimension is substantially longer than the width dimension and the depth dimension, the housing extending along a trajectory such that the length dimension of the housing is substantially parallel to the length dimension of the body;
- at least a first power outlet supported by the housing for access at a height below the cavity formed by the body; and
- power cables positioned within the cavity formed by the body, the power cables configured to connect to a power supply and to extend laterally along at least a portion of the length dimension of the body and from the cavity formed by the body through the at least a first opening defined by the at least one wall of the body into the housing cavity and coupled to the at least a first power outlet.

* * * * *

UNITED STATES PATENT AND TRADEMARK OFFICE
CERTIFICATE OF CORRECTION

| | | |
|---|---|---|
| PATENT NO. | : 12,376,677 B1 | Page 1 of 1 |
| APPLICATION NO. | : 17/063893 | |
| DATED | : August 5, 2025 | |
| INVENTOR(S) | : Jean-Paul Labrosse et al. | |

It is certified that error appears in the above-identified patent and that said Letters Patent is hereby corrected as shown below:

In the Specification

Column 2, Line 15, "b!ood" should be --blood--.

Signed and Sealed this
Seventh Day of October, 2025

John A. Squires
*Director of the United States Patent and Trademark Office*